United States Patent
Park et al.

(10) Patent No.: US 10,484,865 B2
(45) Date of Patent: Nov. 19, 2019

(54) METHOD AND DEVICE FOR TRANSMITTING AND RECEIVING PROFILE FOR PROVIDING COMMUNICATION SERVICE IN WIRELESS COMMUNICATION SYSTEM

(71) Applicant: Samsung Electronics Co., Ltd, Gyeonggi-do (KR)

(72) Inventors: Jong-Han Park, Seoul (KR); Duc-Key Lee, Seoul (KR); Sang-Soo Lee, Yongin-si (KR); Hye-Jin Lee, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 15/323,391

(22) PCT Filed: Jun. 30, 2015

(86) PCT No.: PCT/KR2015/006739
§ 371 (c)(1),
(2) Date: Dec. 30, 2016

(87) PCT Pub. No.: WO2016/003178
PCT Pub. Date: Jan. 7, 2016

(65) Prior Publication Data
US 2017/0156051 A1 Jun. 1, 2017

(30) Foreign Application Priority Data

Jun. 30, 2014 (KR) .................. 10-2014-0080672
Sep. 26, 2014 (KR) .................. 10-2014-0129621
(Continued)

(51) Int. Cl.
*H04W 8/20* (2009.01)
*H04W 4/14* (2009.01)
(Continued)

(52) U.S. Cl.
CPC .......... *H04W 8/205* (2013.01); *H04B 1/3816* (2013.01); *H04L 63/0428* (2013.01);
(Continued)

(58) Field of Classification Search
CPC ....... H04W 8/205; H04W 4/008; H04W 4/14; H04W 64/00; H04W 76/203; H04W 4/80;
(Continued)

(56) References Cited

U.S. PATENT DOCUMENTS 9,137,656 B2 * 9/2015 O'Leary ................. H04W 8/22
2011/0217995 A1 * 9/2011 Jimenez Aldama .... H04W 4/12
455/466
(Continued)

FOREIGN PATENT DOCUMENTS

KR  10-2013-0016152 A  2/2013
KR  10-2013-0108443 A  10/2013
(Continued)

OTHER PUBLICATIONS

Korean Intellectual Property Office, "International Search Report," Application No. PCT/KR2015/006739, dated Oct. 12, 2015, 14 pages, publisher KIPO, Seo-gu, Daejeon, Republic of Korea.

*Primary Examiner* — Wayne H Cai

(57) ABSTRACT

The present invention relates to a method and device for efficiently transmitting and receiving a profile for providing a communication service in a mobile communication system. A method for supporting remote reception of a profile in a wireless communication system according to an embodiment of the present invention comprises the steps of: receiving a second message including a first message for downloading the profile from a server managing the profile; and transferring the second message including the first
(Continued)

message to a plurality of UICCs on the basis of the second message, wherein the plurality of UICCs includes at least one eUICC.

10 Claims, 40 Drawing Sheets

(30) Foreign Application Priority Data

Jan. 5, 2015 (KR) ........................ 10-2015-0000907
Feb. 27, 2015 (KR) ........................ 10-2015-0028666

(51) Int. Cl.
| | | |
|---|---|---|
| *H04B 1/3816* | (2015.01) | |
| *H04W 64/00* | (2009.01) | |
| *H04L 29/06* | (2006.01) | |
| *H04L 29/08* | (2006.01) | |
| *H04W 76/14* | (2018.01) | |
| *H04W 4/80* | (2018.01) | |
| *H04W 12/02* | (2009.01) | |

(52) U.S. Cl.
CPC ............ *H04L 67/025* (2013.01); *H04L 67/22* (2013.01); *H04L 67/303* (2013.01); *H04L 69/22* (2013.01); *H04W 4/14* (2013.01); *H04W 4/80* (2018.02); *H04W 12/02* (2013.01); *H04W 64/00* (2013.01); *H04W 76/14* (2018.02)

(58) Field of Classification Search
CPC .. H04W 12/02; H04B 1/3816; H04L 63/0428; H04L 67/303; H04L 69/22; H04L 67/22; H04L 67/025
See application file for complete search history.

(56) References Cited

U.S. PATENT DOCUMENTS

| | | | |
|---|---|---|---|
| 2012/0172089 A1 | 7/2012 | Bae et al. | |
| 2012/0302224 A1* | 11/2012 | Schreiner | H04W 8/205 455/418 |
| 2013/0157673 A1* | 6/2013 | Brusilovsky | H04W 4/70 455/450 |
| 2014/0088731 A1 | 3/2014 | Von Hauck | |
| 2014/0141763 A1 | 5/2014 | Suh et al. | |
| 2014/0143826 A1* | 5/2014 | Sharp | G06F 21/604 726/1 |
| 2014/0308991 A1* | 10/2014 | Lee | H04W 8/183 455/558 |
| 2014/0329502 A1 | 11/2014 | Lee et al. | |
| 2015/0334584 A1* | 11/2015 | Sun | H04W 24/02 455/67.11 |

FOREIGN PATENT DOCUMENTS

| | | |
|---|---|---|
| WO | 2013-009059 A2 | 1/2013 |
| WO | 2013-036010 A1 | 3/2013 |
| WO | 2014-046421 A1 | 3/2014 |

* cited by examiner

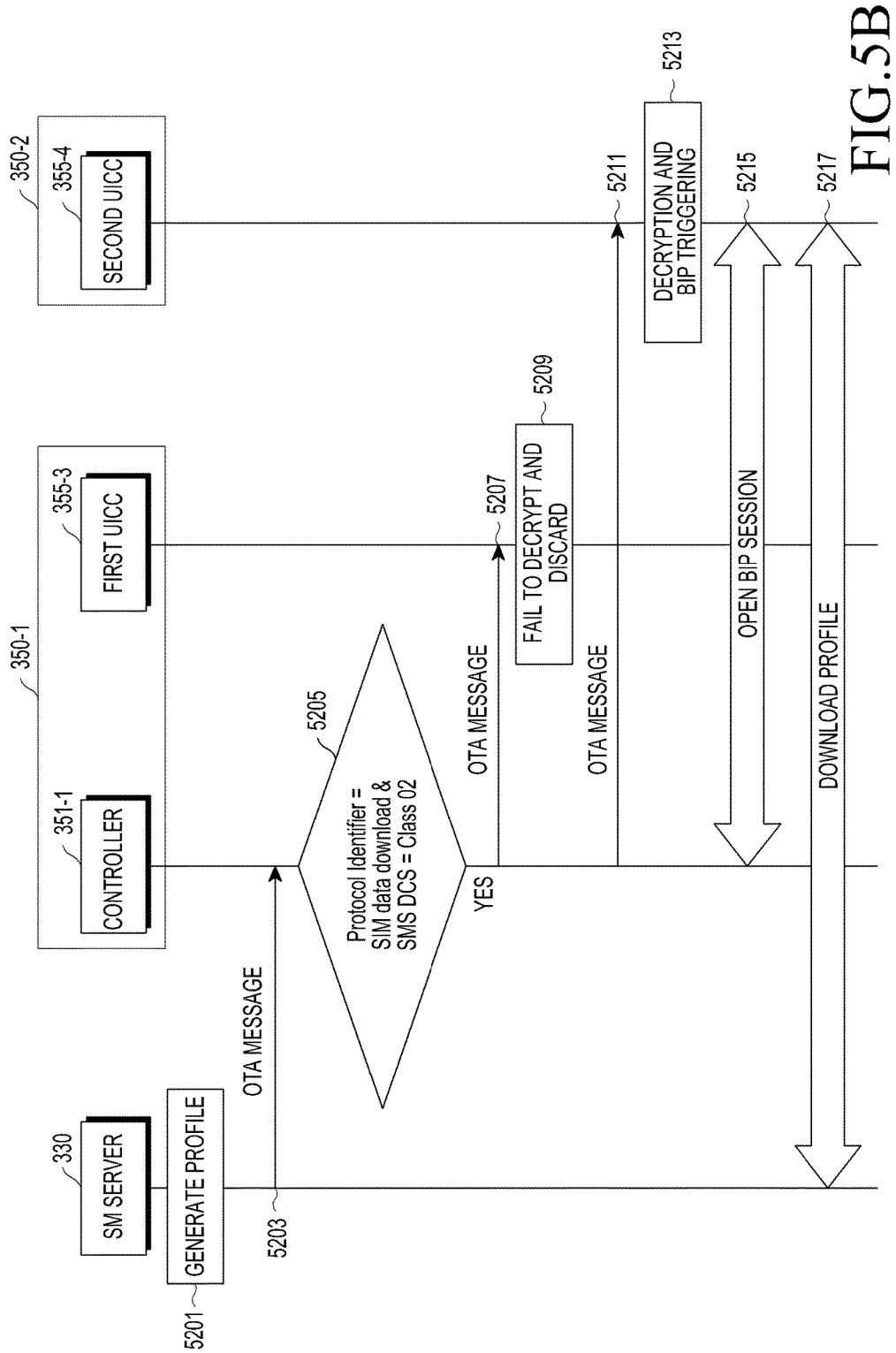

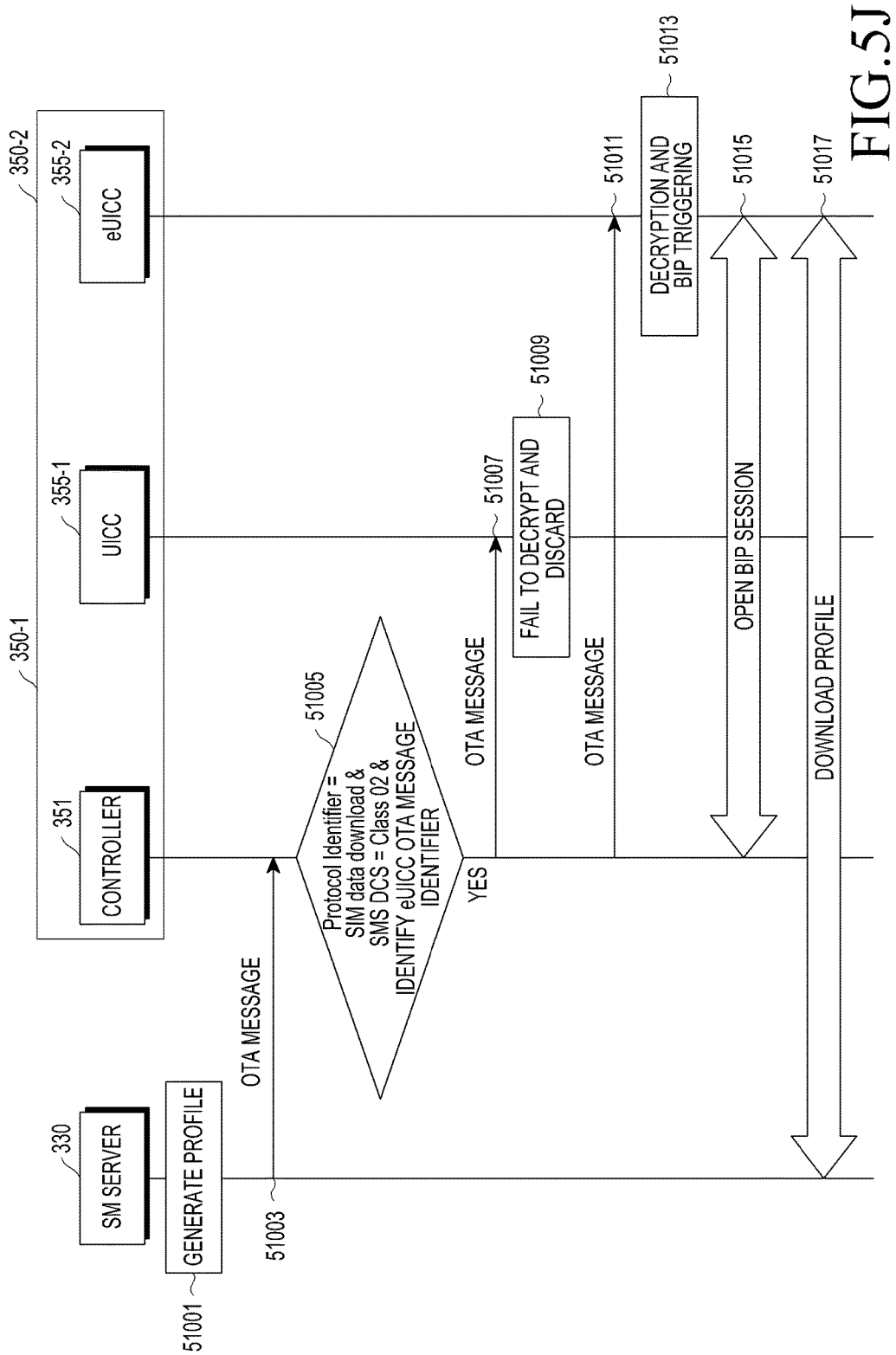

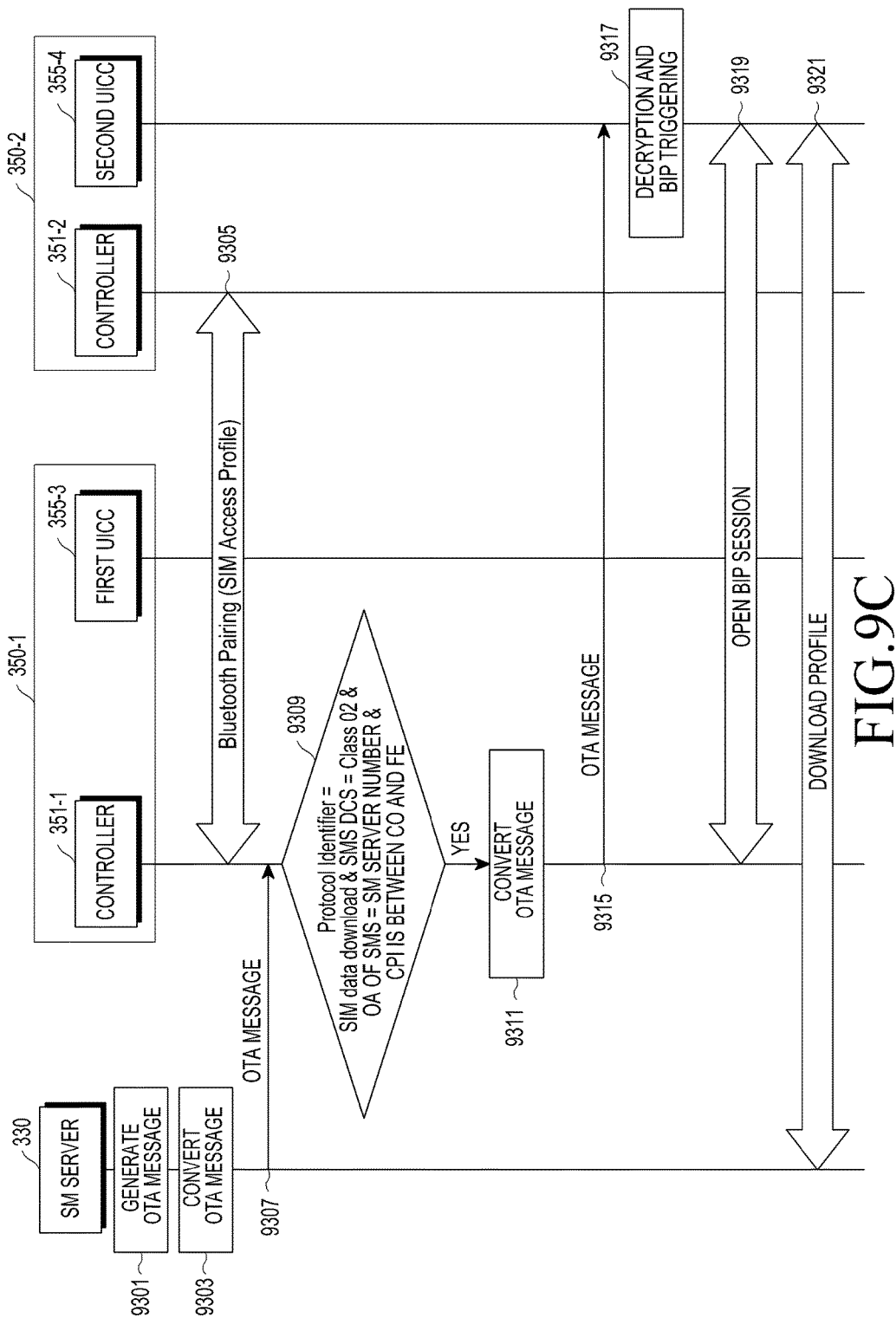

| CPI/RPI | C0 | C1 | C2 | C3 | ... |
|---|---|---|---|---|---|
| CPI'/RPI' CONVERTED VALUE | 70 | 71 | 70 | 71 | ... |
| euicc index | 0 | 0 | 1 | 1 | ... |

FIG.10

| CPI/RPI | C0 | C1 | C2 | C3 | C4 | C5 | ... |
|---|---|---|---|---|---|---|---|
| CPI/RPI CONVERTED VALUE | 70 | 71 | 70 | 71 | 70 | 71 | ... |
| euicc index | 0 | 0 | 1 | 1 | 2 | 2 | ... |

FIG.11

METHOD AND DEVICE FOR TRANSMITTING AND RECEIVING PROFILE FOR PROVIDING COMMUNICATION SERVICE IN WIRELESS COMMUNICATION SYSTEM

CROSS-REFERENCE TO RELATED APPLICATIONS AND CLAIM OF PRIORITY

The present application claims priority under 35 U.S.C. § 365 to International Patent Application No. PCT/KR2015/006739, which was filed on Jun. 30, 2015, and claims a priority to Korean Patent Application No. 10-2014-0080672, which was filed on Jun. 30, 2014, and claims a priority to Korean Patent Application No. 10-2014-0129621, which was filed on Sep. 26, 2014, and claims a priority to Korean Patent Application No. 10-2015-0000907, which was filed on Jan. 5, 2015, and claims a priority to Korean Patent Application No. 10-2015-0028666, which was filed on Feb. 27, 2015, each of which are incorporated herein by reference into the present disclosure as if fully set forth herein.

TECHNICAL FIELD

The present invention relates to a method and an apparatus for remotely controlling a profile for providing a communication service in a wireless communication system.

BACKGROUND ART

When a terminal accesses a wireless communication network, a mutual authentication process between the network and the terminal is needed. Through the mutual authentication process, a Mobile Network Operator (hereinafter, referred to as a network operator or an MNO) identifies a terminal which made a fair payment for subscription and provides a service. The corresponding terminal safely accesses the network and performs data and voice communication while maintaining security. The mutual authentication process between the wireless communication network and the terminal is performed using a subscriber identifier and an encryption key (for example, an encryption key (K) for the authentication). In most terminals, the encryption key is stored in a separate Universal Integrated Circuit Card (UICC) physically attachable to and detachable from the terminal. The UICC corresponds to a smart card which is installed within the terminal and can be used as a module for user authentication with the wireless communication network to which the user subscribes. That is, the UICC stores personal information of the wireless communication subscriber and, when the terminal accesses the wireless communication network, performs a subscriber authentication and generates traffic security key, thereby making wireless communication safely used.

The UICC may store network information (for example, an International Mobile Subscriber Identity (IMSI), a home Public Land Mobile Network (PLMN), and the like) of a network operator to which the user subscribes, user information (a short message service, and the like), a phonebook, and the like.

Further, the UICC is also called a Subscriber Identity Module (SIM) card in a Global System for Mobile communications (GSM) scheme, and a Universal Subscriber Identity Module (USIM) card in a Long Term Evolution (LTE) scheme.

When a card is manufactured, the UICC is manufactured as a card dedicated for the corresponding operator by a request from a particular wireless network operator, and authentication information for the access of the corresponding operator to the network, for example, a USIM application, an International Mobile Subscriber Identity (IMSI), a K value, and the like) is inserted into the UICC before the release thereof. Accordingly, the corresponding MNO receives the manufactured UICC and provides it to the subscriber, and thereafter performs the management, such as installation, modification, deletion, and the like, of an application within the UICC using technologies such as Over The Air (OTA) and the like when necessary.

The subscriber may insert the UICC into the mobile communication terminal of the subscriber to use the network and application services of the corresponding MNO, and, when replacing the terminal, the subscriber may insert the UICC extracted from the existing terminal into a new terminal to use the authentication information, the mobile communication phone numbers, the personal phonebook, and the like, which are stored in the UICC, in the new terminal as they are.

When an authentication between an authentication server of the wireless communication network and the UICC is performed in the mutual authentication process between the wireless communication network and the terminal, the terminal serves as a medium that transfers a corresponding authentication message. The UICC may not only identify the subscriber but also include relevant network company information even when the UICC is manufactured. Further, when the user uses a wireless communication network and then subscribes to a wireless communication network of another network operator through the same terminal, the user should use a UICC compatible with the wireless communication network of the corresponding network operator. That is, when network operators are different, the user can use the same terminal but should use the UICC compatible with the network operator to which the user newly subscribes.

Accordingly, since the existing UICC can be attached to and detached from the terminal, the existing UICC should be replaced with a new UICC when the user changes network operators, which inconveniences the user. Alternatively, in terms of a form factor that defines a physical phenomenon, from the most widely used mini-SIM to a micro-SIM and a recently used nano-SIM, the size of the UICC becomes smaller. Although it greatly contributes to the compactness of a mobile communication terminal, it is expected that a UICC smaller in size than a recently established nano-SIM is difficult to standardize because a user is likely to lose it. In addition, since the terminal requires a space for mounting a detachable slot due to a characteristic of the detachable UICC, further compactness is expected to be difficult. In order to solve the problem, research on an embedded UICC (eUICC) which can remotely install a profile for providing a communication service without replacing the UICC in spite of a change in a mobile network operator is being progressed. The eUICC provides a network access authentication function equally to the existing attachable and detachable UICC, but there are many issues such as eUICC opening/circulation/subscriber information security and preparation of a plan for the issues is needed. To this end, an international standardization institution such as a European Telecommunications Standards Institute (ETSI) proceeds with the standardization of the eUICC with relevant companies such as mobile network operators, terminal manufacturers, SIM vendors, and the like. In the ETSI, a Working Group (WG) for establishing the eUICC standard is working and the ETSI defines a module such as the profile for post personalization of an application for the network access authentication function of the mobile network operator in the eUICC and determines requirements for remotely installing and managing the profile. Further, a management policy and an application scheme of the profile has been discussed, but a detailed method has not yet been defined. As described above, since detailed matters about the management of the profile of the eUICC have not been defined, an eUICC manufacturer, a terminal manufacturer, and an eco-system operator have difficulty in developing and commercializing the eUICC.

The eUICC may be implemented as a pre-installed UICC by being fixed within the terminal, for example, in a chip type during a process of manufacturing the terminal. Accordingly, the eUICC may be used for various terminals which can have a structure in which physical attachment and detachment of the UICC is not easy such as a Machine to Machine (M2M) (or Device to Device (D2D)) terminal as well as a general wireless terminal such as a mobile phone.

By using the eUICC, the terminal may download the profile including a mobile network operator-specific subscriber identifier and an encryption key (K) from a remote server and install the profile in the eUICC. Accordingly, the user may receive a wireless communication service through a changed Mobile Network Operator (MNO) without installing a new UICC in the terminal even though the MMO is changed. The profile may include the subscriber identifier and the encryption key (K), and also include various pieces of information for a communication service provided by the corresponding MNO. That is, when the profile is remotely downloaded and installed in the eUICC from a network of the MNO, the subscriber identifier and the encryption key (K) is also stored in the eUICC.

Meanwhile, when the subscriber identifier and the encryption key are leaked in the process of remotely installing the profile in the eUICC, security of data and voice communication of the corresponding terminal are significantly threatened. Accordingly, in the process of remotely transferring the profile to the eUICC, a more rigid encryption process is required.

As described above, in order to remotely install the profile including the subscriber identifier and the encryption key in the eUICC within the terminal, the terminal having the eUICC installed therein should already be in a communicable state. To this end, the subscriber identifier and the encryption key (K) (or a provisioning profile) only for the remote installation of the profile may be installed in the eUICC in advance. In this case, only when the corresponding subscriber identifier and the encryption key (K) are stored in a wireless communication network using the provisioning profile installed in the terminal in advance, the terminal having the remotely installed profile therein may be recognized as a legitimate subscriber terminal. Accordingly, when the eUICC is used, a communication service usage fee for the installation of the provisioning profile may be included in the manufacturing costs. However, such a communication service is limited only to a communication service for the profile installation, so that the communication service usage fee may be relatively cheaper than a general communication service usage fee.

DETAILED DESCRIPTION OF THE INVENTION

Technical Problem

As described in the background art, infrastructure for remotely installing the profile in the corresponding MNO should be constructed to subscribe to a wireless communication service in a manner of remotely installing the subscriber identifier and the encryption key (K) in the terminal having the eUICC installed therein in a wireless communication network. However, before the terminal having the eUICC installed therein becomes command, most MNOs cannot help constructing the remote installation infrastructure and, in such a communication environment, it is expected to cause large inconvenience in using a wireless communication service (for example, an MNO change or the like) using the terminal having the eUICC installed therein.

When the provisioning profile including the subscriber identifier and the encryption key (K) is installed in advance and a communication service using the provisioning profile is performed, the corresponding terminal can be newly opened or changed only when the service is continuously provided until the corresponding terminal is discarded, which causes the manufacturing costs of the terminal to be high. Since whether the terminal is opened or not is determined according to a range geographically covered by the provisioning profile, the coverage in which the provisioning profile can be used should be maximally widen, which results in even higher manufacturing costs for the use of the provisioning profile. When the range of the coverage is properly determined, the corresponding terminal can be opened and used only within the corresponding coverage, which gives difficulty in circulating the terminal and managing distribution thereof.

Accordingly, an embodiment of the present invention provides a method and an apparatus for efficiently transmitting and receiving a profile for providing a communication service in a wireless communication system.

Another embodiment of the present invention provides an apparatus and a method for allowing a terminal user to receive a service of a wireless MNO in a wireless communication system.

Another embodiment of the present invention provides an apparatus and a method for automatically selecting and providing a profile based on location information of the terminal in a wireless communication system.

Another embodiment of the present invention provides an apparatus and a method for determining a server that provides a profile based on information on the terminal in a wireless communication system.

Technical Solution

According to an embodiment of the present invention, a method of supporting remote reception of a profile in a wireless communication system is provided. The method includes: receiving a second message including a first message for downloading the profile from a server for managing the profile; and transferring the second message including the first message to a plurality of Universal Integrated Circuit Card (UICC)s based on the second message, wherein the plurality of UICCs include at least one embedded UICC (eUICC).

According to an embodiment of the present invention, a terminal for supporting remote reception of a profile in a wireless communication system is provided. The terminal includes: a transceiver configured to transmit and received data through a wireless network; and a controller configured to receive a second message including a first message for downloading the profile from a server for managing the profile and to transfer the second message including the first message to a plurality of Universal Integrated Circuit Cards (UICCs) based on the second message, wherein the plurality of UICCs include at least one embedded UICC (eUICC).

According to an embodiment of the present invention, a method of supporting remote reception of a profile in a wireless communication system is provided. The method includes: receiving a request for opening a communication service from a terminal using an embedded Universal Integrated Circuit Card (eUICC); and transmitting communication service information for remote reception of the profile to the terminal in response to the request for opening the communication service.

According to an embodiment of the present invention, a server for controlling remote reception of a profile in a wireless communication system is provided. The server includes: a communication interface for data communication with at least one network entity; and a controller configured to make a control to receive a request for opening a communication service from a terminal using an embedded Universal Integrated Circuit Card (eUICC) and to transmit communication service information for remote reception of the profile to the terminal in response to the request for opening the communication service.

According to an embodiment of the present invention, a method of applying a profile by a terminal using an embedded Universal Integrated Circuit Card (eUICC) in a wireless communication system is provided. The method includes: searching for at least one mobile network operator for providing a communication service; displaying a list of the discovered mobile network operators; and applying a profile selected using the list among at least one profile installed in the eUICC.

According to an embodiment of the present invention, a terminal using an embedded Universal Integrated Circuit Card (eUICC) in a wireless communication system is provided. The terminal includes: a transceiver configured to transmit and receive data through a wireless network; a display unit; and a controller configured to search for at least one mobile network operator for providing a communication service, to display a list of the found mobile network operators on the display unit, and to make a control to apply a profile selected using the list among at least one profile installed in the eUICC.

According to an embodiment of the present invention, a method of applying a profile by a terminal using an embedded Universal Integrated Circuit Card (eUICC) in a wireless communication system is provided. The method includes: searching for at least one mobile network operator for providing a communication service; and making a control to apply a selected profile according to preferences of the terminal among at least one profile of the found mobile network operator, wherein the eUICC includes at least one profile provided from the at least one mobile network operator.

According to an embodiment of the present invention, a terminal using an embedded Universal Integrated Circuit Card (eUICC) in a wireless communication system is provided. The terminal includes: a transceiver configured to transmit and receive data through a wireless network; and a controller configured to search for at least one mobile network operator for providing a communication service and to apply a selected profile according to preferences of the terminal among at least one profile of the found mobile network operator, wherein the eUICC includes at least one profile provided from the at least one mobile network operator.

BRIEF DESCRIPTION OF THE DRAWINGS

FIGS. 10 and 11 illustrate an example a code conversion between an SM server and a terminal when a terminal having a plurality of UICCs installed therein or connected thereto remotely receives a profile according to an embodiment of the present invention;

MODE FOR CARRYING OUT THE INVENTION

Figure 1:
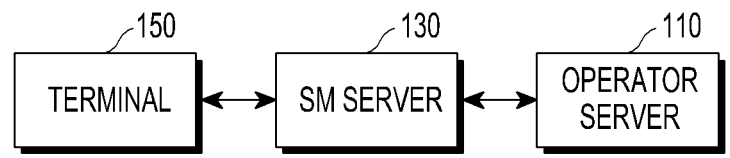
FIG. 1 illustrates an example of a configuration of a wireless communication system for remotely transmitting and receiving a profile for providing a communication service according to an embodiment of the present invention.

In describing the present invention below, a detailed description of related known configurations or functions incorporated herein will be omitted when it is determined that the detailed description thereof may unnecessarily obscure the subject matter of the present invention. Hereinafter, exemplary embodiments of the present invention will be described in detail with reference to the accompanying drawings.

First, the terms used in this specification will be defined.

A UICC in this specification is a smart card inserted into a mobile communication terminal and means a chip that stores personal information of a mobile communication subscriber, such as network access authentication information, a phone number list, and an SMS, and performs subscriber authentication and traffic security key generation when a connection is made to a mobile communication network, such as GSM, WCDMA, LTE, etc., thereby making it possible to stably use mobile communication. The UICC may be embedded with a communication application, such as a subscriber identification module (SIM), a universal SIM (USIM), an IP multimedia SIM (ISIM), etc. according to the type of a mobile communication network to which a subscriber connects, and may provide a higher level security function for loading various applications, such as an electronic wallet, ticketing, an electronic passport, etc.

An embedded UICC (eUICC) in this specification is a security module in the shape of a chip embedded in a terminal, but not a detachable module that can be inserted into and detached from a terminal. The eUICC may be installed by downloading a profile using over the air (OTA) technology.

The term "UICC" in this specification may be used interchangeably with the term "SIM," and the term "eUICC" may be used interchangeably with the term "eSIM."

A profile in this specification may mean a thing in which an application, a file system, an authentication key, etc. to be stored in a UICC are packaged in a software format.

A USIM profile in this specification may have the same meaning as a profile, or may mean a thing in which information incorporated in a USIM application in a profile is packaged in a software format.

An operational profile in this specification may mean a thing in which subscription information of a mobile network operator to which a terminal user has subscribed is packaged in a software format.

A provisioning profile in this specification may mean a previously embedded profile in an eUICC, which a terminal requires in order to connect to an arbitrary mobile communication network in an arbitrary country before a user subscribes to a specific mobile communication operator.

A profile providing server in this specification may be represented as a subscription manager data preparation (SM-DP), an off-card entity in the profile domain, a profile encryption server, a profile generation server, a profile provisioner or a profile provider, etc.

A subscription manager secure routing (SM-SR) in this specification may be represented as a profile management server, an off-card entity of eUICC profile manager, or a profile manager.

The term "terminal" used in this specification may be referred to as a mobile station (MS), user equipment (UE), a user terminal (UT), a wireless terminal, an access terminal (AT), a terminal, a subscriber unit, a subscriber station (SS), a wireless device, a wireless communication device, a wireless transmission/reception unit (WTRU), a moving node, a mobile, or other terms. Various embodiments of a terminal may include a cellular phone, a smart phone having a wireless communication function, a personal digital assistant (PDA) having a wireless communication function, a wireless modem, a portable computer having a wireless communication function, a photographing device, such as a digital camera, having a wireless communication function, a gaming device having a wireless communication function, a home appliance for storing and reproducing music that has a wireless communication function, an Internet home appliance capable of performing wireless Internet access and browsing, and portable units or terminals having integrated combinations of the functions thereof.

Furthermore, a terminal may include, but is not limited to a machine to machine (M2M) terminal and a machine type communication (MTC) terminal/device.

Herein, a profile identifier may, for example, be designated by a factor that is matched to a profile ID, an integrated circuit card ID (ICCID), or an issuer security domain-profile (ISD-P). A profile ID may represent a unique identifier of each profile. An eUICC ID in this specification may be a unique identifier of an eUICC embedded in a terminal and may be referred to as an EID. Further, when a provisioning profile is already loaded in an eUICC, an eUICC ID may be a profile ID of the corresponding provisioning profile. Further, when a terminal and an eUICC (or an eSIM) are not separated from each other as in embodiments of the present invention, an eUICC ID may be a terminal ID. In addition, an eUICC may also refer to a specific secure domain of an eSIM chip.

FIG. 1 illustrates an example of a configuration of a wireless communication system for remotely transmitting and receiving a profile for providing a communication service according to an embodiment of the present invention.

Referring to FIG. 1, the system of FIG. 1 includes an operator server 110 of a Mobile Network Operator (MNO) for providing a communication service to a subscriber, a Subscriber Manager (SM) server 130 for generating a profile for providing a communication service to a terminal 150 according to a request of the operator server 110 and supporting a remote installation of the generated profile, and the terminal 150 for receiving a message for downloading the profile from the SM server 130, downloading the profile from the SM server 130 based on the received message, and installing the downloaded profile in an internal eUICC. The profile may include a subscriber identifier (for example, an International Mobile Subscriber Identity (IMSI)) of the terminal 150, an encryption key (K) for an authentication, and various types of information for the communication service provided by the corresponding mobile network operator.

Figure 2:
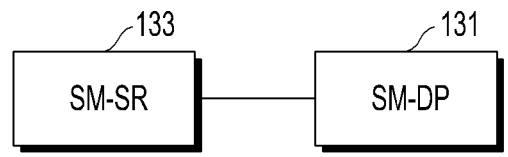
FIG. 2 illustrates a configuration of an SM server according to an embodiment of the present invention.

FIG. 2 illustrates a configuration of the SM server 130 according to an embodiment of the present invention.

Referring to FIG. 2, the SM server 130 includes a Subscription Manager Data Preparation (SM-DP) server 131 and a Subscription Manager Secure Routing (SM-SR) server 133. When a request for initiating the terminal 150 is transferred to the SM server 130 through the operator server 110, the SM-DP server 131 generates a profile suitable for the corresponding MNO and transfers the generated profile to the SM-SR server 133. The SM-DP server 131 may be referred to as a profile providing server that generates the profile. Further, the SM-DP server 131 may encrypt the generated profile and transfer the encrypted profile to the SM-SR server 133. The SM-SR server 133 transmits the profile to the eUICC based on an Over-The-Air (OTA) technology using a Short Message Service (SMS). The OTA message includes the profile and is encrypted using an OTA encryption key, and the encrypted OTA message is inserted into data of an SMS message and then transmitted. The SM-SR server 133 may be referred to as a profile managing server that manages remote transmission of the profile.

The SMS message is transmitted to an MSISDN (Mobile Subscriber International ISDN (Integrated Services Digital Network) Number) which is the phone number of the terminal 150 through the SMS. Further, in FIG. 1, the terminal 150 receives the SMS message including the OTA message and identifies a header of the SMS message. When a value of a protocol identifier included in the header is, for example, a value corresponding to "SIM data download" and a Data Coding Scheme (DCS) value, which is included in the header and indicates a category of the terminal, for example, a value corresponding to "Class 2", the terminal 150 transfers the received SMS message to the eUICC installed within or connected to the terminal 150. The eUICC having received the SMS message acquires the OTA message from the SMS message, decrypts the OTA message by using the OTA encryption key, and then acquires a profile through an additional process using decrypted information. Further, the eUICC installs the profile.

In the embodiment of FIG. 1, the terminal 150 stores the phone number information (MSISDN) dedicated for reception of the SMS message that has been already opened for the reception of the SMS message including the OTA message from the SM server 130 and, for example, an OTA key as an encryption key for decrypting the transmitted encrypted OTA message in the eUICC in advance. One eUICC or a plurality of eUICCs may be installed in or connected to the terminal 150. When the number of eUICCs is plural, the plurality of eUICCs may store in advance and use different MSISDNs and OTA keys. However, in this case, every eUICCs may have different subscription costs for remotely downloading the profile.

Figure 3:
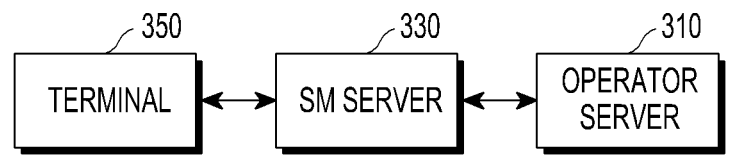
FIG. 3 illustrates an example of a configuration of a wireless communication system for remotely transmitting and receiving a profile for providing a communication service according to an embodiment of the present invention.

FIG. 3 illustrates an example of a configuration of a wireless communication system for remotely transmitting and receiving a profile for providing a communication service according to an embodiment of the present invention.

The system of FIG. 3 includes an operator server 310 of an MNO for providing a communication service to a subscriber, an SM server 330 for generating a profile for providing the communication service to a terminal 350 according to a request of the operator server 310 and supporting a remote installation of the generated profile, and the terminal 350 for receiving an OTA message for downloading the profile from the SM server 330, downloading the profile based on the OTA messages, and installing the profile in a plurality of UICCs, for example, a first UICC or a second UICC installed in or connected to the terminal 350. The profile may include a subscriber identifier (for example, an IMSI) of the terminal 350, an encryption key (K) for an authentication, and various pieces of information for the communication service provided by the corresponding MNO.

Further, according to the present embodiment, the terminal 350 includes a plurality of UICCs.

The plurality of UICCs may be installed within or connected to the terminal 350, and at least one of the first UICC and the second UICC corresponds to an eUICC. For example, the existing attachable and detachable UICC may be installed as the first UICC, and the eUICC may be installed within or connected to the terminal 350 as the second UICC. Here, the connection of the UICC to the terminal 350 may mean that a controller within the terminal is connected to the UICC through International Organization for Standardization (ISO) 7816, which is the standard related to, for example, a smart card, or mean that the controller is connected to a UICC installed within another terminal through a wireless connection or a Universal Serial Bus (USB) based on a scheme such as Bluetooth SIM access profile, Wi-Fi, Near Field Communication (NFC), or the like. According to another embodiment, both the first and second UICCs may be the eUICCs. Further, although it is illustrated in the present embodiment that two UICCs are installed in or connected to the terminal 350 for the convenience of description, two or more UICCs may be installed in or connected to the terminal 350.

Figure 4A:
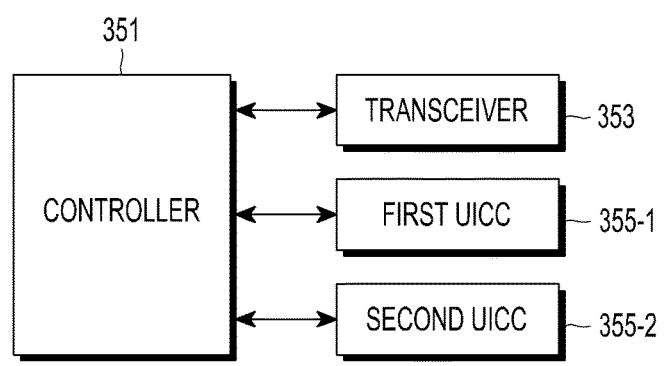
FIGS. 4A and 4B illustrate an example of a configuration of a terminal that remotely receives a profile for providing a communication service according to an embodiment of the present invention.

FIG. 4A illustrates an example of a configuration of the terminal 350 that remotely receives a profile for providing a communication service, which correspond to an example of a configuration of the terminal 350 having a plurality of UICCs installed therein or connected thereto according to an embodiment of the present invention.

Referring to FIG. 4A, the terminal 350 may include a controller 351 and a transceiver 353, and the terminal 350 may also include first and second UICCs 355-1 and 355-2 or may be connected to at least one of the first and second UICCs 355-1 and 355-2. The controller 351 controls the general operation for receiving an OTA message for downloading a profile from the SM server 330 through an SMS, downloading the profile based on the OTA message, and installing the profile in at least one of the first and second UICCs 355-1 and 355-2. The transceiver 353 transmits and receives data through a wireless network. Further, according to the present embodiment, the terminal 350 may include, for example, the first and second UICCs 355-1 and 355-2 as a plurality of UICCs in which the profile is installed, or may be connected to at least one of the first and second UICCs 355-1 and 355-2 in the way described in the embodiment of FIG. 3. When the above connection type is used, at least one of the first and second UICCs 355-1 and 355-2 may not be directly installed within the terminal 350. In the embodiment of FIG. 4A, it is assumed that at least one of the first and second UICCs 355-1 and 355-2 is the eUICC.

According to the present embodiment, the phone number information (MSISDN-P1) dedicated for reception of the SMS message, which has been opened already for the reception of the SMS message including the OTA message and the OTA key as the encryption key for decrypting the encrypted and transmitted OTA message in at least one of the first and second UICCs 355-1 and 355-2. For example, first phone number information (MSISDN-P1) for receiving the SMS message for downloading the profile may be stored only in the first UICC 355-1 between the first UICC 355-1 and the second UICC 355-2, and corresponding second phone number information (MSISDN-P2) may not be stored in the second UICC 355-2.

In this case, the profile to be installed in the second UICC 355-2 may be received using the first phone number information.

Figure 4B:
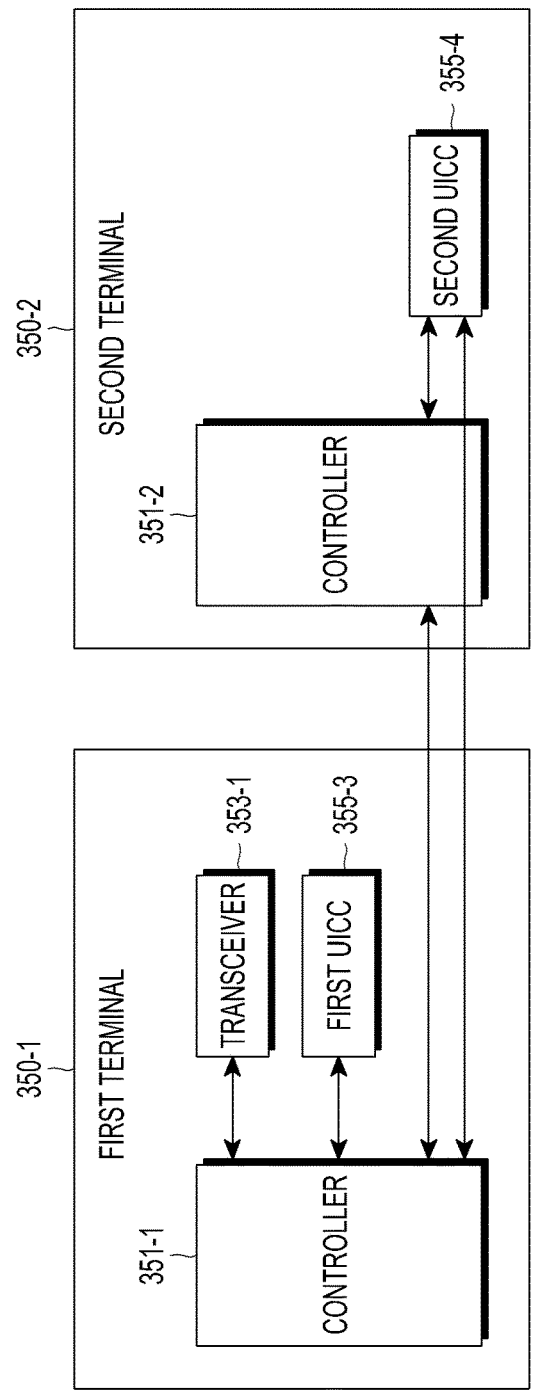

FIG. 4B illustrates an example of another configuration of the terminal that remotely receives the profile for providing the communication service according to an embodiment of the present invention, and the present embodiment illustrates an example in which a first UICC 355-3 is installed within a first terminal 350-1 and a second UICC 355-4 is not installed within the first terminal 350-1 and is connected to a second terminal 350-2 through a controller.

Referring to FIG. 4B, the first terminal 350-1 includes a controller 351-1, a transceiver 353-1, and the first UICC 355-3. The first UICC 355-3 may be the eUICC or the existing UICC installed within the first terminal 350-1. The second terminal 350-2 includes a controller 351-2 and the second UICC 355-4. The second UICC 355-4 may be the existing UICC or use the eUICC. As described in the embodiment of FIG. 3, the second UICC 355-4 may be connected to the first terminal 350-1 wirelessly or through a Universal Serial Bus (USB) through a communication scheme such as Bluetooth SIM access profile, Wi-Fi, Near Field Communication (NFC), or the like. Although not illustrated, the second terminal 350-2 may include a transceiver or a communication interface to use the communication scheme. As described above, the connection between the controller 351-1 of the first terminal 350-1 and the second UICC 355-4 of the second terminal 350-2 may be made using various communication methods such as the aforementioned ISO-7816, Bluetooth, Wi-Fi, NFC, USB, and the like.

When the connection between the controller 351-1 of the first terminal 350-1 and the second UICC 355-4 of the second terminal 350-2 is made using another communication method other than the aforementioned communication methods, the profile downloading method proposed by the embodiment of the present invention, for example, the method by which the controller 351-1 of the first terminal 350-1 determines the SMS message including the OTA message transferred to the first terminal 350-1 based on a phone number or an International Mobile Subscriber Identity (IMSI) assigned to (or stored in) the first UICC 355-3 and transfers the SMS message including the OTA message to the second UICC 355-4 of the second terminal 350-2, and installs the profile in the second UICC 355-4 may be equally applied. When it is assumed that both the first and second UICCs are installed within the terminal according to the following embodiments of the present invention, profile downloading methods may be also applied to the embodiment of FIG. 4B. In an exemplary embodiment with reference to FIGS. 3, 4A, and 4B, it is first assumed that the first UICC 355-1 using the existing attachable and detachable UICC and the second UICC 355-2 using the eUICC are installed in or connected to the terminal 350. Further, an already opened profile is installed in the first UICC 355-1 and it is assumed that a phone number of the profile corresponds to MSISDN-P1 for the convenience of description. In addition, it is assumed that an EID (that is, an eUICC identifier) of the second UICC 355-2 is EID2 and an OTA encryption key stored in the second UICC 355-2 is OTA key 2. Then, when a profile of a new MNO is installed in the second UICC 355-2 corresponding to the eUICC, the operator server 310 makes a request for opening the terminal 350 to the SM server 330. At this time, the operator server 310 makes a request for installing the profile in the second UICC 355-2 corresponding to EID2 to the SM server 330. Then, the SM server 330 generates an OTA message for installing the profile and, at this time, encrypts the OTA message for downloading the profile based on, for example, OTA key2 which is the OTA encryption key of EID2. Further, the SM server 330 transfers the OTA message to the terminal 350 through an SMS and, at this time, transfers an SMS message including the OTA message to, for example, an MSISDN-P1 number which is an opened phone number of the first UICC 355-1 of the terminal 350.

Hereafter, various embodiments in which the terminal 350 having a plurality of UICCs including one eUICC or a plurality of eUICCs therein according to the present invention receives the OTA message and remotely receives a profile from the SM server 330 will be described. Further, although flowcharts according to the following various embodiments illustrate and describe the OTA message for convenience of the description, the OTA message is inserted into the SMS message and transferred. Accordingly, the OTA message described (illustrated) in the flowcharts related to the following detailed description may be understood as the SMS message including the OTA message. According to another embodiment, the controller of the terminal may extract the OTA message from the SMS message and transfer the extracted OTA message to the plurality of UICCs.

Figure 5A:
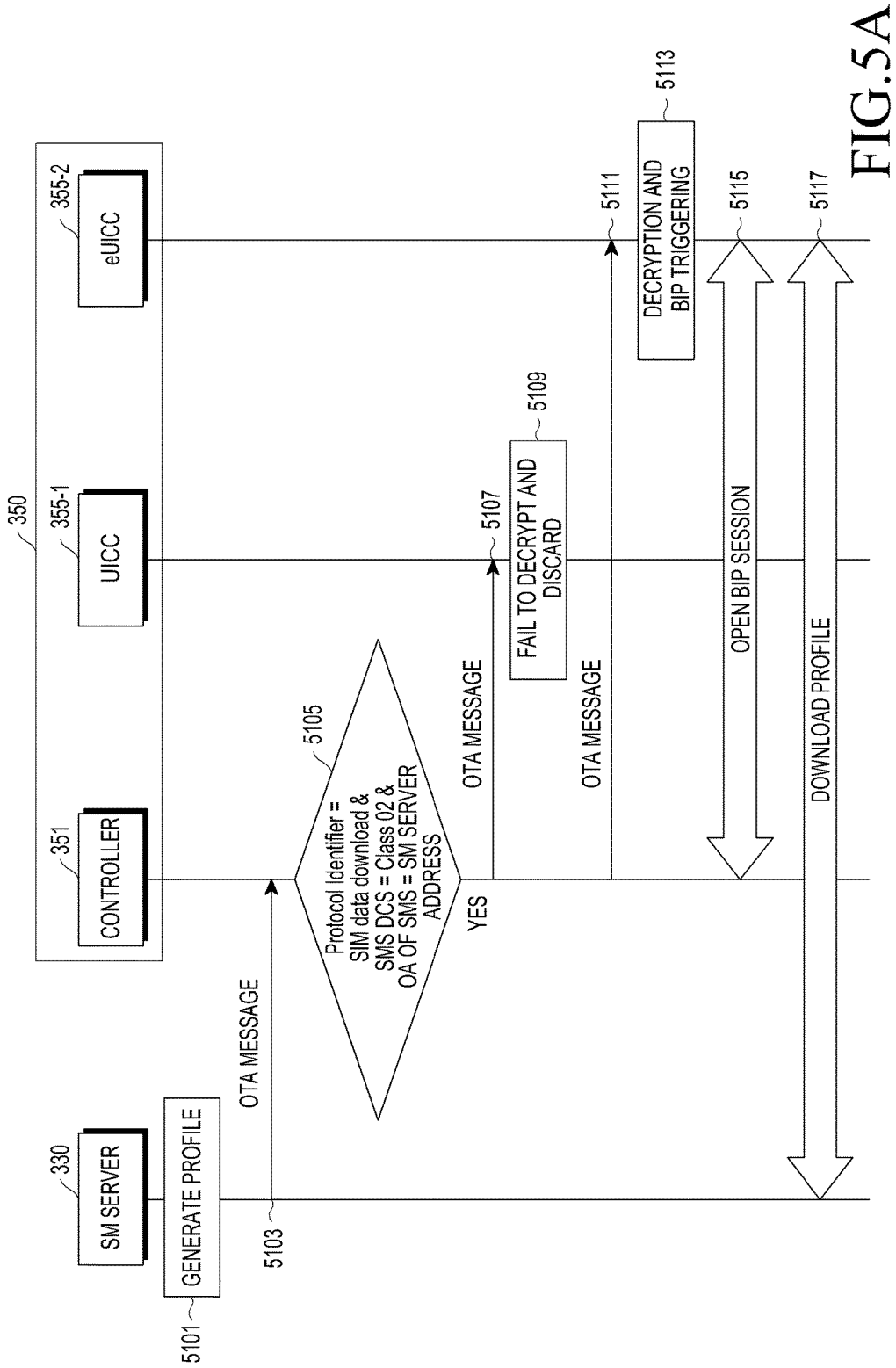
FIGS. 5A to 9D are flowcharts illustrating a method by which a terminal having a plurality of UICCs installed therein or connected thereto remotely receives a profile according to an embodiment of the present invention.

FIG. 5A is a flowchart illustrating an example of a method by which the terminal having a plurality of UICCs installed therein or connected thereto remotely receives a profile according to an embodiment of the present invention. The embodiment of FIG. 5A is described with reference to FIG. 4A.

In the embodiment of FIG. 5A, it is assumed that the second UICC 355-2 is the eUICC. Further, it is assumed that the SM server 330 encrypts and transmits the OTA message for downloading the profile through, for example, OTA key2 which is the OTA encryption key of EID2 in the embodiment of FIG. 5.

Referring to FIG. 5A, the SM server 330 generates a profile in step 5101, and the terminal 350 receives an SMS message including an OTA message from the SM server 330 in step 5103. Then, the controller 351 of the terminal 350 identifies the header part of the SMS message in step 5105. When a value of a protocol identifier field is, for example, "SIM data download", a DCS value is "Class 02", and further an Originator Address (OA) value of the SMS message is an SM server address, the controller 351 transfers the OTA message for downloading the profile to the UICC 355-1 and the eUICC 355-2 in steps 5107 and 5111, respectively. Meanwhile, although not illustrated, when the conditions given in step 5105 are not met, the terminal 350 performs a predetermined general process or terminates a remote reception process of the profile. In step 5109, the UICC 355-1 having received the OTA message from the controller 351 cannot decrypt the OTA message with the encryption OTA key which the UICC 355-1 has, so that the corresponding OTA message is discarded without more processing. In contrast, the eUICC 355-2 can decrypt the OTA message with OTA key2 which the eUICC 355-2 has. Accordingly, in step 5113, the eUICC 355-2 decrypts the OTA message through OTA key2 and triggers Bearer Independent Protocol (BIP) communication. Thereafter, a BIP session is opened for BIP communication between the controller 351 and the eUICC 355-2 in step 5115, and a profile download is performed between the SM server 330 and the eUICC 355-2 through the generated BIP session.

Hereinafter, other embodiments of the method by which the terminal having a plurality of UICCs installed therein or connected thereto remotely receives a profile according to FIGS. 5B to 5K will be described with reference to FIG. 4B.

Matters in common between the embodiments of FIGS. 5B to 5K are that the first UICC 355-3 may be the existing UICC or the eUICC and the second UICC 355-4 may be the existing UICC or the eUICC. Further, the first UICC 355-3 or the second UICC 355-4 may be installed in or connected to the first terminal 350-1 or the second terminal 350-2. For convenience of the description, it is assumed that the second UICC 355-4 is the eUICC. Further, like the embodiment FIG. 4B, when the second UICC 355-4 is not installed in the first terminal 350-1 but may be connected to the first terminal 350-1, the second UICC 355-4 may be a UICC included in the second terminal 350-2 and, in this case, a linkage between the first terminal 350-1 and the second terminal 350-2 may be made wirelessly based on a scheme such as Bluetooth, Wi-Fi, NFC, or the like or through a USB. For example, through a Bluetooth connection, the first terminal 350-1 may logically equally access and use the second UICC 355-4 connected to the second terminal 350-2 based on a Bluetooth SIM access profile as if the second UICC 355-4 is the UICC connected to the first terminal 350-1. Further, in the embodiments of FIGS. 5B to 5K, it is assumed that, when the second UICC 355-4 is the eUICC, the SM server 330 encrypts and transmits the OTA message for downloading the profile based on, for example, OTA key2 which is the OTA encryption key of the corresponding eUICC.

Figure 5C:
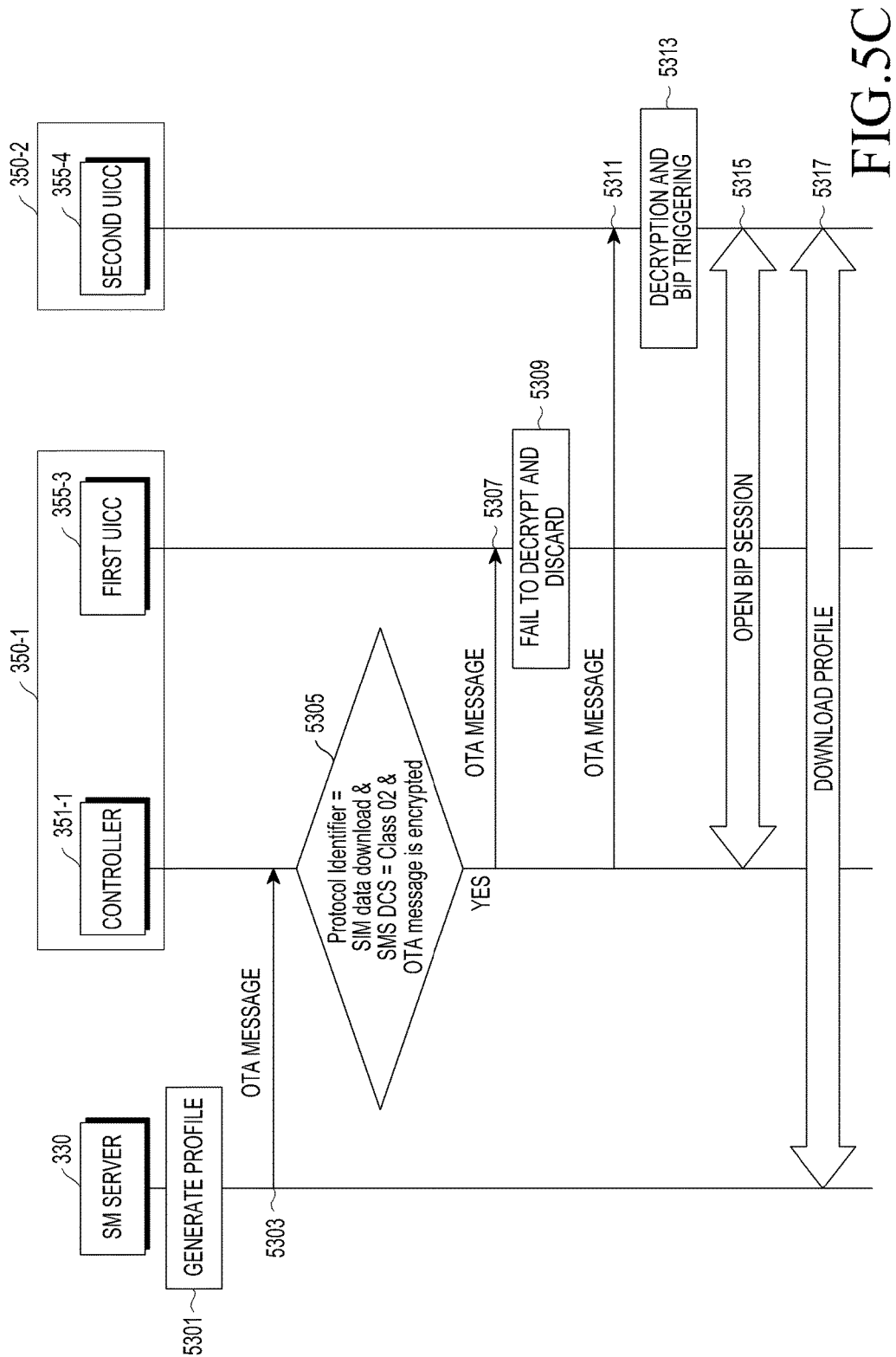
Figure 5D:
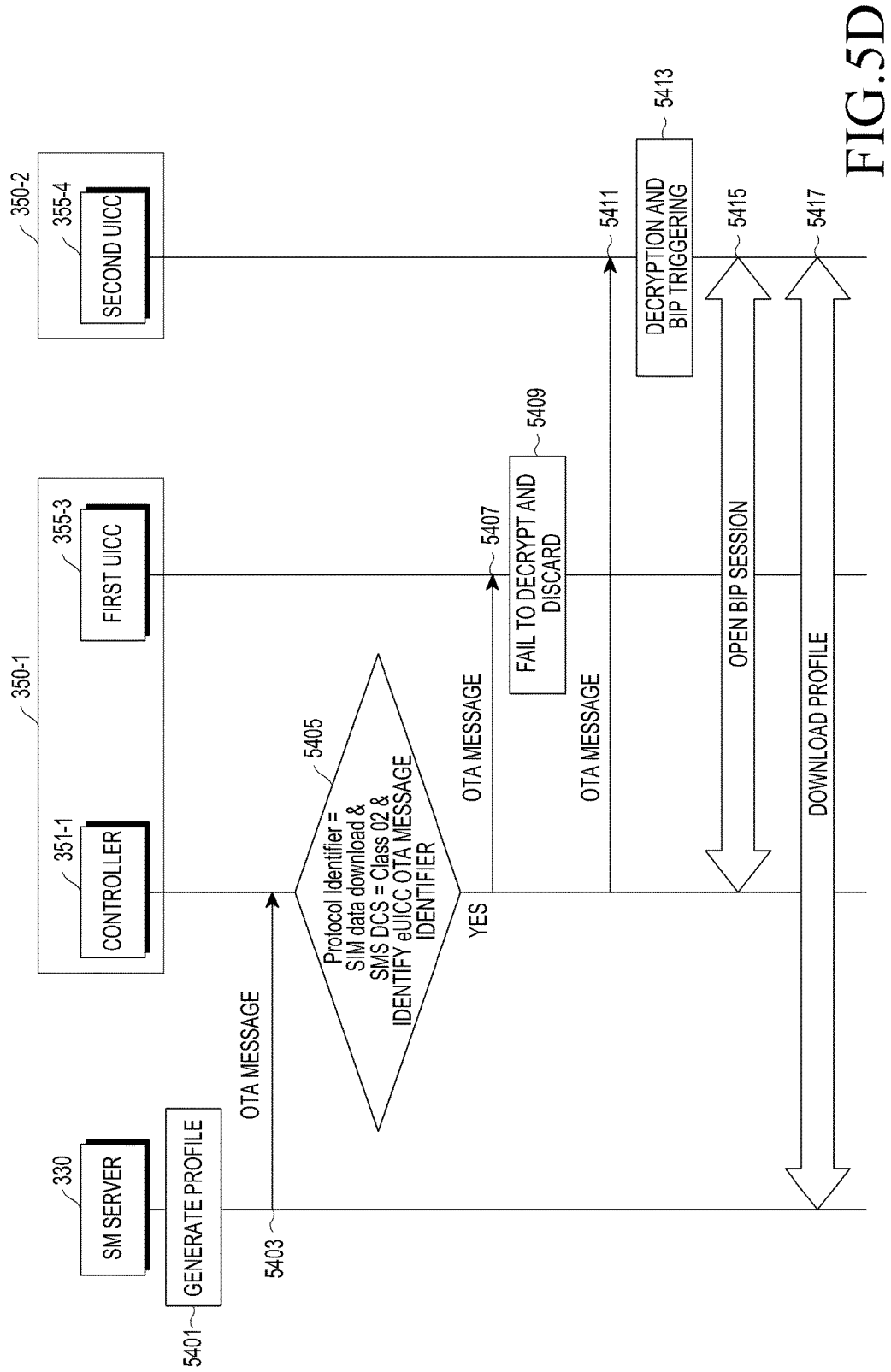
Figure 5E:
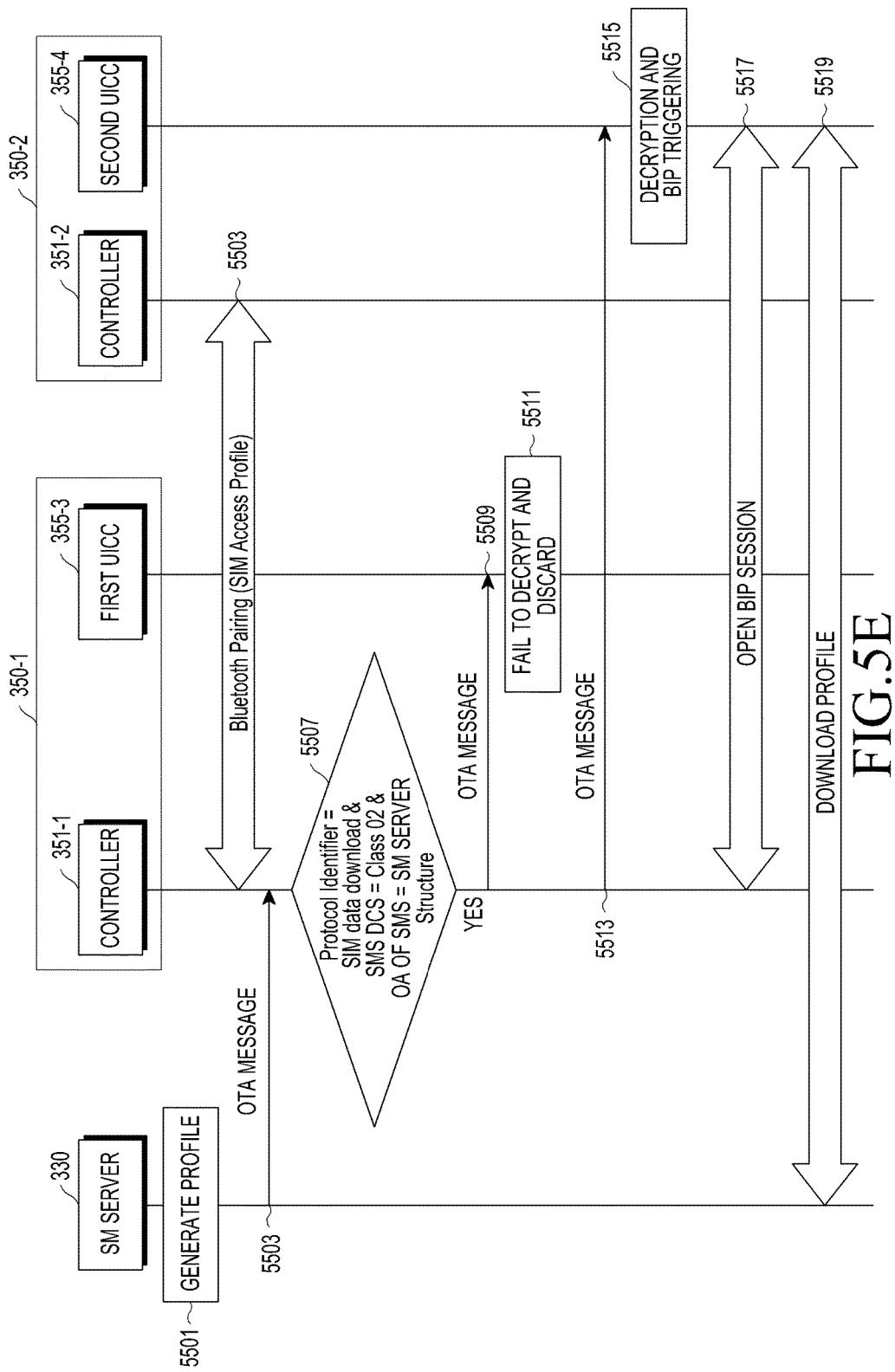

FIG. 5E is a flowchart illustrating another example of the method by which the terminal having a plurality of UICCs installed therein or connected thereto remotely receives a profile according to an embodiment of the present invention. The embodiment of FIG. 5E is another embodiment of the embodiment of FIG. 5A, and corresponds to an embodiment in which a plurality of terminals are involved in the profile download.

Steps 5501 to 5519 of FIG. 5E correspond to a process in which the controller 351 of the first terminal 350-1 and the controller 351-2 of the second terminal 350-2 are paired through Bluetooth and then the second UICC 355-4 inserted into or fixed to be installed in the second terminal 350-2 downloads the profile through the controller 351 of the first terminal 350-1. In steps 5501 to 5519 of FIG. 5E, since operations of the remaining steps except for the Bluetooth pairing (step 5503) are equal or similar to the operations of the corresponding steps in the embodiment of FIG. 5A except only for some changes of the subject that performs the operations into the second terminal 350-2, a detailed description will be omitted.

Figure 5F:
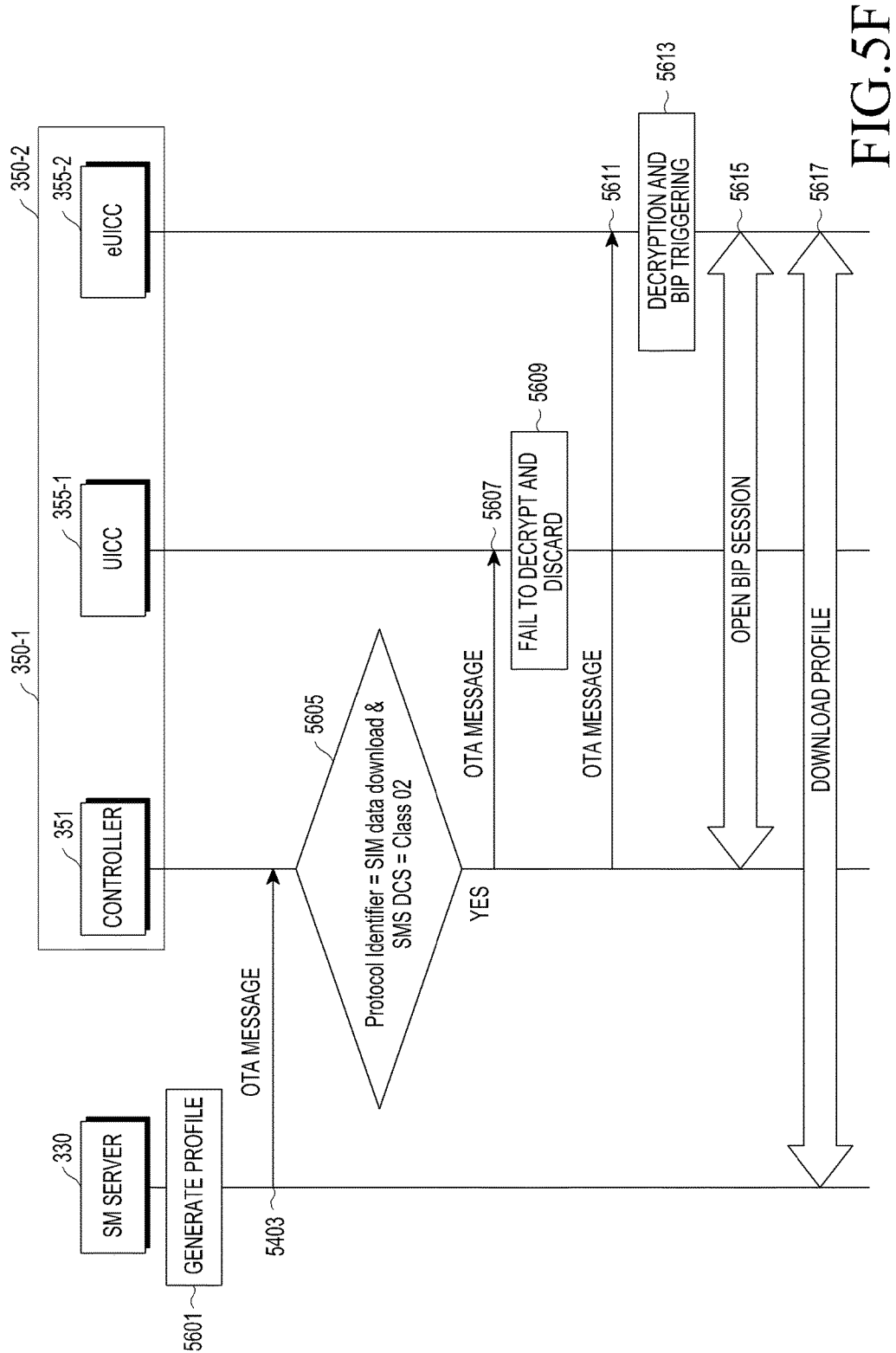

FIG. 5F is a flowchart illustrating another example of the method by which the terminal having a plurality of UICCs installed therein or connected thereto remotely receives a profile according to an embodiment of the present invention. The embodiment of FIG. 5F is another embodiment of the embodiment of FIG. 5B and corresponds to an embodiment in which one terminal is involved in the profile download.

Steps 5601 to 5617 of FIG. 5F corresponds to a process for transferring the profile to the eUICC 355-2 by transferring the OTA message to both the UICC 355-1 and the eUICC 355-2 installed in the terminal 350. Since operation of steps 5601 to 5617 of FIG. 5F are equal or similar to the operations of the corresponding steps in the embodiment of FIG. 5B, a detailed description will be omitted.

FIG. 5B is a flowchart illustrating another example of the method by which the terminal having a plurality of UICCs installed therein or connected thereto remotely receives a profile according to an embodiment of the present invention.

Referring to FIG. 5B, the SM server 330 generates a profile in step 5201, and the terminal 350 receives an SMS message including an OTA message from the SM server 330 in step 5203. Then, the controller 351-1 of the first second terminal 350-2 are paired through Bluetooth and then the second UICC 355-4 inserted into or fixed to be installed terminal 350-1 identifies the header part of the SMS message in step 2505. When a value of a protocol identifier field is, for example, "SIM data download" and a DCS value is "Class 02", the controller 351-1 transfers the OTA message for downloading the profile to the UICC 355-3 and the eUICC 355-4 in steps 5207 and 5211, respectively. Although not illustrated, when the conditions given in step 5205 are not met, the terminal 350 performs a predetermined general process or terminates a remote reception process of the profile. In step 5209, the UICC 355-3 having received the OTA message from the controller 351-1 cannot decrypt the OTA message with the encryption OTA key which the UICC 355-3 has, so that the corresponding OTA message is discarded without more processing. In contrast, the second UICC 355-4 can decrypt the OTA message with OTA key2 which the eUICC 355-4 has. Accordingly, in step 5213, the second UICC 355-4 decrypts the OTA message through OTA key2 and triggers Bearer Independent Protocol (BIP) communication. Thereafter, a BIP session is opened for BIP communication between the controller 351-1 of the first terminal 350-1 and the second UICC 355-4 of the second terminal 350-2 in step 5215, and the profile download is performed between the SM server 330 and the second UICC 355-4 through the generated BIP session.

Figure 5G:
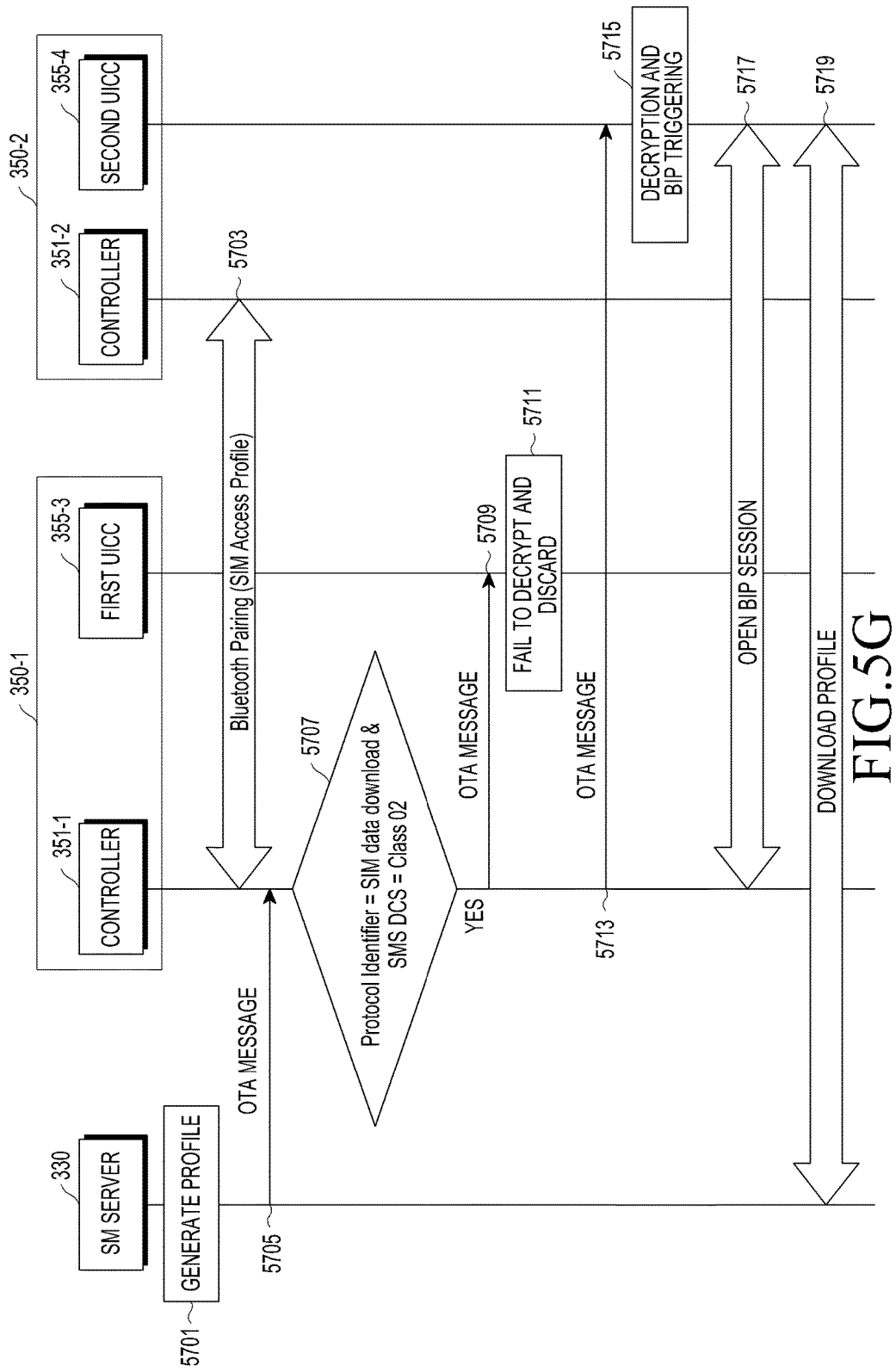

FIG. 5G is a flowchart illustrating another example of the method by which the terminal having a plurality of UICCs installed therein or connected thereto remotely receives a profile according to an embodiment of the present invention. The embodiment of FIG. 5G is another embodiment of the embodiment of FIG. 5B and corresponds to an embodiment for downloading a profile through Bluetooth pairing.

Steps 5701 to 5719 of FIG. 5G correspond to a process in which the controller 351 of the first terminal 350-1 and the controller 351-2 of the second terminal 350-2 are paired through Bluetooth and then the second UICC 355-4 inserted into or fixed to be installed in the second terminal 350-2 downloads the profile through the controller 351 of the first terminal 350-1. In operation of steps 5701 to 5719 of FIG. 5G, since the remaining steps except for Bluetooth pairing (step 5703) are equal or similar to the operations of the corresponding steps in the embodiment of FIG. 5B, a detailed description will be omitted. It is noted that the OTA determination conditions (step 5707) in the embodiment of FIG. 5G are different from the OTA determination conditions (step 5507) in the embodiment of FIG. 5E.

Figure 5H:
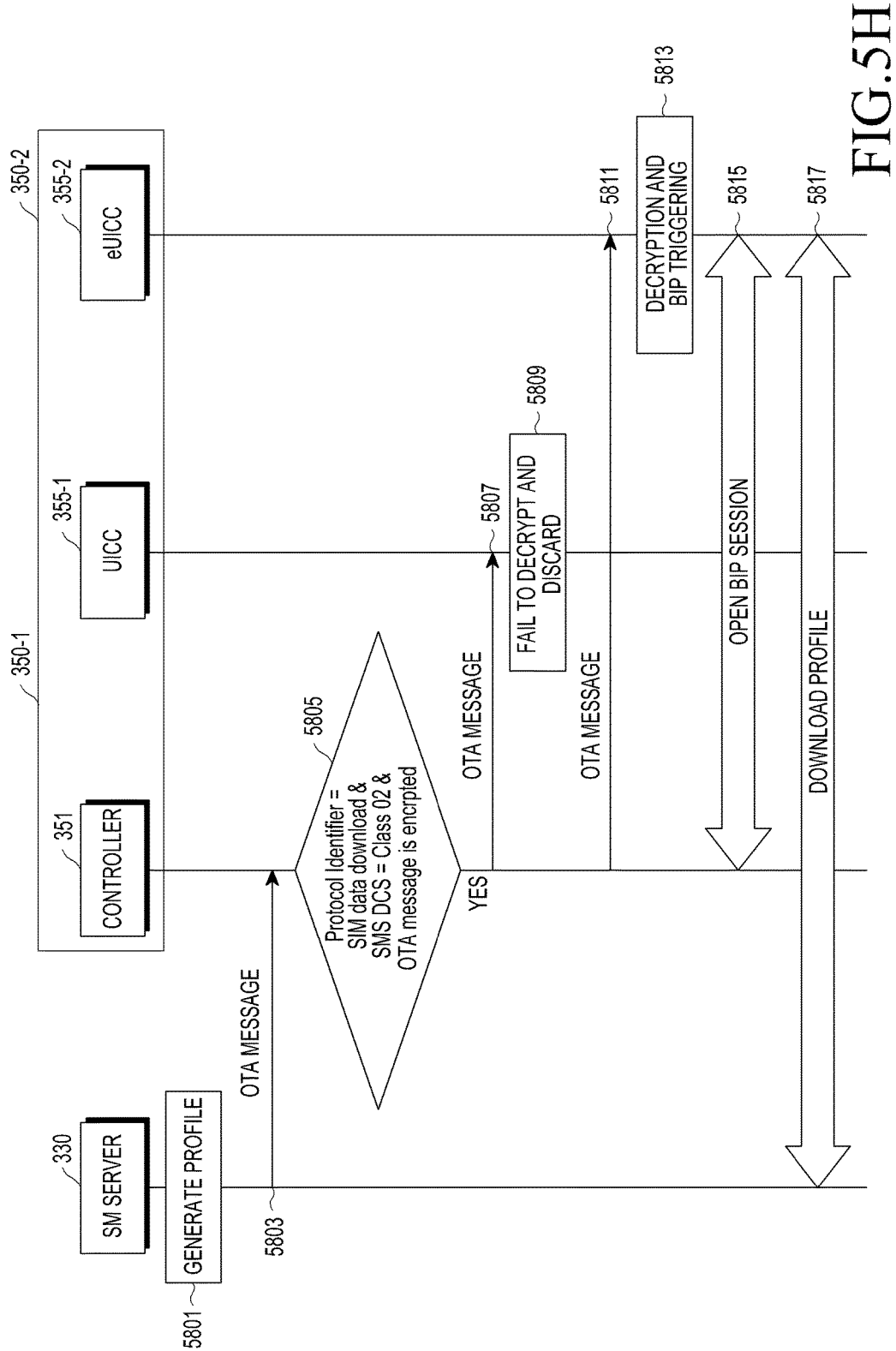

FIG. 5H is a flowchart illustrating another example of the method by which the terminal having a plurality of UICCs installed therein or connected thereto remotely receives a profile according to an embodiment of the present invention. The embodiment of FIG. 5H is another embodiment of the embodiment of FIG. 5C and corresponds to an embodiment in which one terminal is involved in the profile download.

Steps 5801 to 5817 of FIG. 5H correspond to a process for transferring the profile to the eUICC 355-2 by transferring the OTA message to both the UICC 355-1 and the eUICC 355-2 installed in the terminal 350. Since operations 5801 to 5817 of FIG. 5H are equal or similar to the operations of the corresponding steps in the embodiment of FIG. 5C, a detailed description will be omitted. Further, it is noted that the OTA determination conditions (step 5805) in the embodiment of 5H are different from the OTA determination conditions (steps 5105 and 5605) in the embodiments of FIGS. 5A and 5F in which one terminal is involved.

FIG. 5C is a flowchart illustrating another example of the method by which the terminal having a plurality of UICCs installed therein or connected thereto remotely receives a profile according to an embodiment of the present invention.

Referring to FIG. 5C, the SM server 330 generates a profile in step 5301, and the terminal 350 receives an SMS message including an OTA message from the SM server 330 in step 5303. Then, the controller 351-1 of the first terminal 350-1 identifies the header part of the SMS message in step 5305. When a value of a protocol identifier field is, for example, "SIM data download", a DCS value is "Class 02", and the OTA message is transferred to all the connected UICCs 355-3 and 355-4 as illustrated in the embodiment of FIG. 5B, there is no problem if the OTA message is encrypted. However, the OTA message is not encrypted, the message transferred to a particular UICC between the first UICC 355-3 and the second UICC 355-4 may be transferred to all the UICCs 355-3 and 355-4, so the security may not be tight. Although not illustrated, when the conditions given in step 5305 are not met, the terminal 350 performs a predetermined general process or terminates a remote reception process of the profile.

Accordingly, according to the present embodiment, the controller 351-1 of the first terminal 350-1 identifies the header part of the SMS message. When the value of the protocol identifier field is, for example, "SIM data download", the DCS value is "Class 02", and further the OTA message within the SMS message is encrypted in step 5305, it is preferable that the controller 351 transfers the OTA message for downloading the profile to the first UICC 355-3 and the second UICC 355-4 in step 5307 and step 5311, respectively, and the UICC having no suitable OTA key cannot identify the OTA message. At this time, a method of identifying whether the OTA message is encrypted may include a method of identifying, for example, Security Parameters Indication (SPI) data in a command packet field of a European Telecommunications Standards Institute (ETSI) TS 102.255 standard within an SMA message. For example, the SPI may be 2 byte data. For example, when a b3 bit of the first byte is "0", it may be determined that the OTA message is not encrypted. When the b3 bit of the first byte of the SPI data is "1", it may be determined that the OTA message is encrypted. Further, a Key and algorithm Identifier for ciphering a (KIc) value and a Key and algorithm Identifier for RC/CC/DS (KID) value in the command packet field are additionally identified. When only a particular encryption algorithm (for example, an Advanced Encryption Standard (AES)) is used, the OTA message may be transferred to all the UICCs 355-3 and 355-4. Thereafter, in step 5309, the first UICC 355-3 having received the OTA message from the controller 351 of the first terminal 350-1 cannot decrypt the OTA message with the encryption OTA key which the first UICC 355-3 has, so that the corresponding OTA message is discarded without more processing. In contrast, the second UICC 355-4 corresponding to the eUICC can decrypt the OTA message with OTA key2. Accordingly, in step 5313, the second UICC 355-4 decrypts the OTA message through OTA key2 and triggers Bearer independent Protocol (BIP) communication. Thereafter, a BIP session is opened for BIP communication between the controller 351-1 and the second UICC 355-4 in step 5315, and a profile download is performed between the SM server 330 and the second UICC 355-4 through the generated BIP session in step 5317.

Figure 5I:
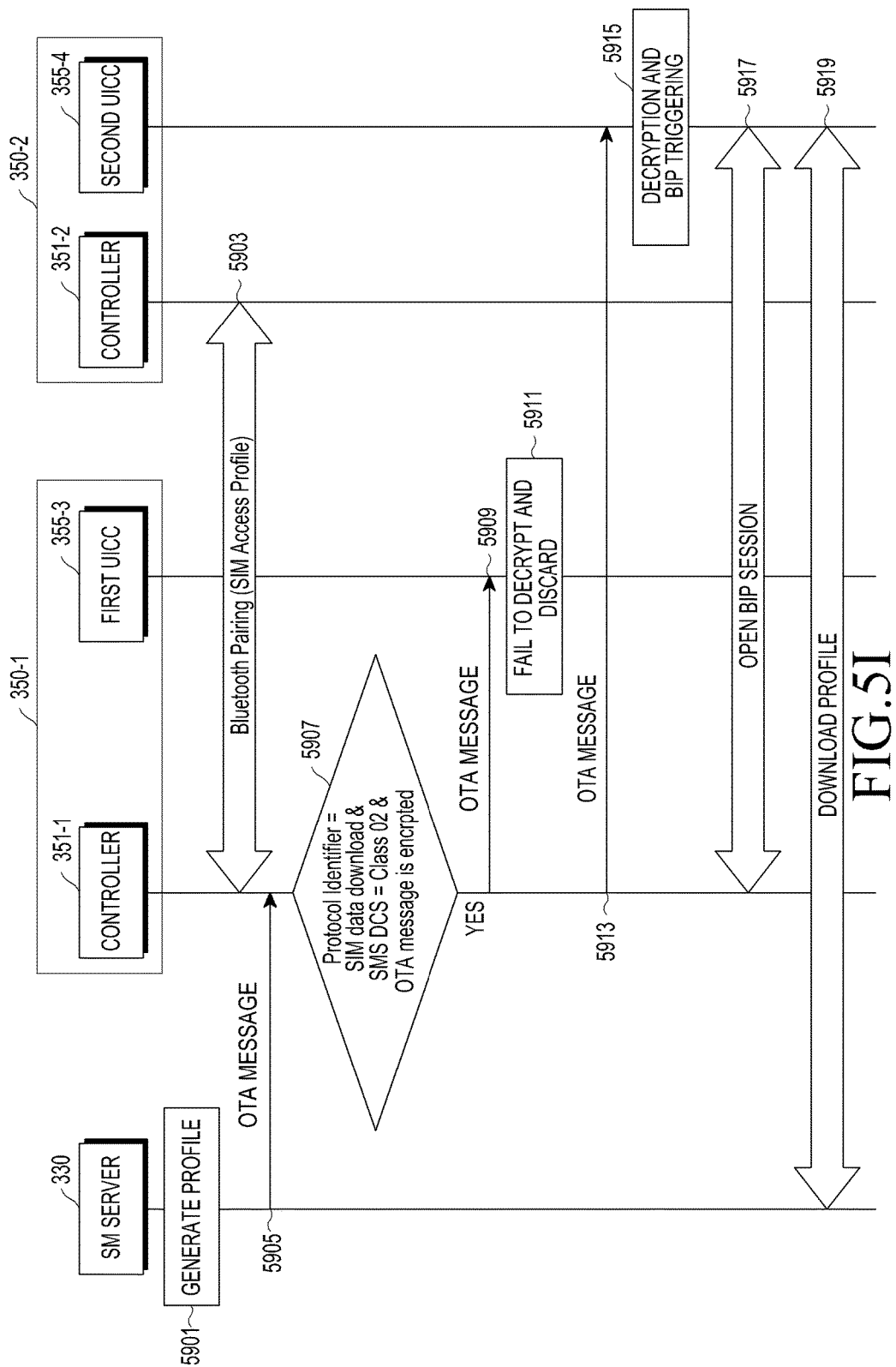

FIG. 5I is a flowchart illustrating another example of the method by which the terminal having a plurality of UICCs installed therein or connected thereto remotely receives a profile according to an embodiment of the present invention. The embodiment of FIG. 5I is another embodiment of the embodiment of FIG. 5C and corresponds to an embodiment for downloading a profile through Bluetooth pairing.

Steps 5901 to 5919 of FIG. 5I correspond to a process in which the controller 351 of the first terminal 350-1 and the controller 351-2 of the second terminal 350-2 are paired through Bluetooth and then the second UICC 355-4 inserted into or fixed to be installed in the second terminal 350-2 downloads the profile through the controller 351 of the first terminal 350-1. In operation of steps 5901 to 5919 of FIG. 5G, since the remaining steps except for Bluetooth pairing (step 5903) are equal or similar to the operations of the corresponding steps in the embodiment of FIG. 5B, a detailed description will be omitted. Further, it is noted that the OTA determination conditions (step 5907) in the embodiment of FIG. 5I are different from the OTA determination conditions (steps 5507 and 5707) in the embodiments of FIGS. 5E and 5G in which a plurality of terminals are involved.

FIG. 5J is a flowchart illustrating another example of the method by which the terminal having a plurality of UICCs installed therein or connected thereto remotely receives a profile according to an embodiment of the present invention. The embodiment of FIG. 5J is another embodiment of the embodiment of FIG. 5D and corresponds to an embodiment in which one terminal is involved in the profile download.

Steps 51001 to 51017 of FIG. 5J correspond to a process for transferring the profile to the eUICC 355-2 by transferring the OTA message to both the UICC 355-1 and the eUICC 355-2 installed in the terminal 350. Since operations 51001 to 51017 of FIG. 5J are equal or similar to the operations of the corresponding steps in the embodiment of FIG. 5D, a detailed description will be omitted. Further, it is noted that the OTA determination conditions (step 51005) in the embodiment of 5J are different from the OTA determination conditions (steps 5105 and 5605) in the embodiments of FIGS. 5A, 5F, and 5H in which one terminal is involved.

FIG. 5D is a flowchart illustrating another example of the method by which the terminal having a plurality of UICCs installed therein or connected thereto remotely receives a profile according to an embodiment of the present invention.

Referring to FIG. 5D, in step 5401, the SM server 330 generates a profile. In step 5403, the first terminal 350-1 receives an SMS message including an OTA message from the SM server 330. The OTA message may be the type of a command packet of an ETSI TS 102.225 standard. At this time, for example, b6, b7, and b8 bits of the first byte part of the SPI data part in the OTA message generally have values of 0, 0, and 0, and the values are not used. However, in the present embodiment, the values use values which are not 0, 0, and 0. For example, the b6, b7, and b8 bits may be 1, 1, and 1, respectively. At this time, calculation of a Redundancy Check (RC)/Cryptographic Checksum (CC)/Digital Signature (DS) part of the command packet may be performed using the following methods 1) and 2).

Method 1) calculate RC/CC/DS by substituting 0, 0, and 0 for b6; b7, and b8

Method 2) calculate RC/CC/DS while maintaining b6, b7, and b8 as the used values (1, 1, and 1 in the above description), which are not 0, 0, and 0.

The calculation of methods 1) and 2) may be performed by the SM server 330.

Then, the controller 351-1 of the first terminal 350-1 identifies the header part of the SMS message in step 5405. When a value of a protocol identifier field is, for example, "SIM data download", a DCS value is "Class 02", and additionally data values of b6, b7, and b8 bits of SPI data in the OTA message within the SMS message are particular values (for example, 1, 1, and 1), which are not 0, 0, and 0, determined in the above example, the controller 351-1 transfers the OTA message for downloading the profile to the first UICC 355-3 and the second UICC 355-4 in step 5407 and step 5411, respectively. At this time, before transferring the OTA message, the controller 351-1 may process b6, b7, and b8 of the first byte of the SPI data in the command packet according to method 1) or 2) and then transfer the OTA message to the first UICC 355-3 and the second UICC 355-4. Accordingly, when method 1) is used, the controller 351-1 transfers the OTA message in which b6, b7, and b8 are substituted by 0, 0, and 0 to the first UICC 355-3 and the second UICC 355-4. When method 2) is used, the controller 351-1 transfers the OTA message to the first UICC 355-3 and the second UICC 355-4 without substituting b6, b7, and b8. Although not illustrated, when the conditions given in step 5405 are not met, the terminal 350 performs a predetermined general process or terminates a remote reception process of the profile.

Thereafter, in step 5409, the first UICC 355-3 having received the OTA message from the controller 351-1 cannot decrypt the OTA message with the encryption OTA key which the first UICC 355-3 has, so that the corresponding OTA message is discarded without more processing. In contrast, the second UICC 355-4 corresponding to the eUICC can decrypt the OTA message with OTA key2. Accordingly, in step 5413, the second UICC 355-4 decrypts the OTA message through OTA key2 and triggers Bearer Independent Protocol (BIP) communication. Thereafter, a BIP session is opened for BIP communication between the controller 351-1 and the second UICC 355-4 in step 5415, and a profile download is performed between the SM server 330 and the second UICC 355-4 through the generated BIP session in step 5417.

Figure 5K:
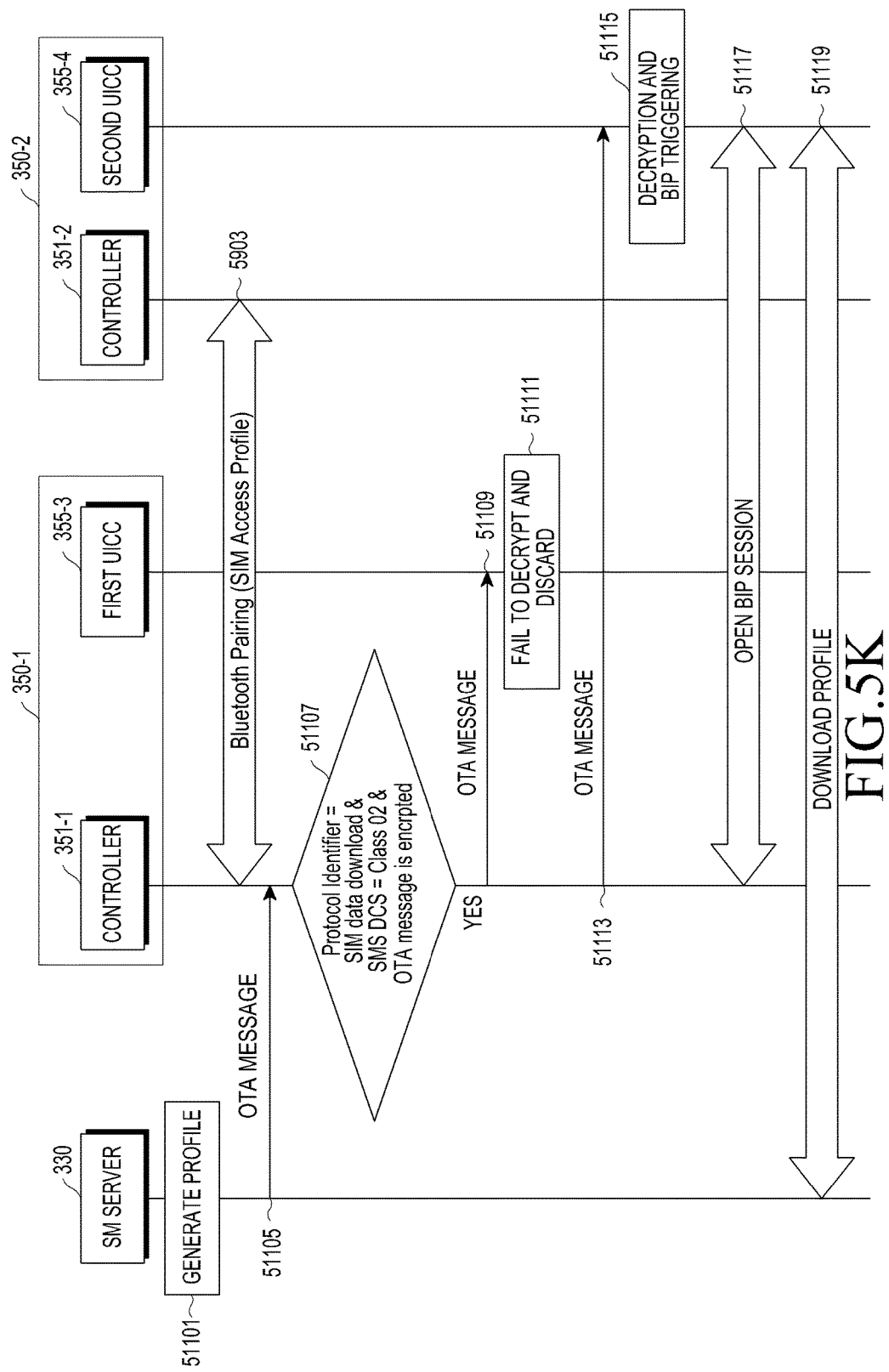

FIG. 5K is a flowchart illustrating another example of the method by which the terminal having a plurality of UICCs installed therein or connected thereto remotely receives a profile according to an embodiment of the present invention. The embodiment of FIG. 5K is another embodiment of the embodiment of FIG. 5D and corresponds to an embodiment for downloading a profile through Bluetooth pairing.

Steps 51101 to 51119 of FIG. 5K correspond to a process in which the controller 351 of the first terminal 350-1 and the controller 351-2 of the second terminal 350-2 are paired through Bluetooth and then the second UICC 355-4 inserted into or fixed to be installed in the second terminal 350-2 downloads the profile through the controller 351 of the first terminal 350-1. Since the remaining steps except for Bluetooth pairing (step 51103) in operations of steps 51101 to 51119 of FIG. 5K are equal or similar to the operations of the corresponding steps in the embodiment of FIG. 5D, a detailed description will be omitted. Further, it is noted that the OTA determination conditions (step 51107) in the embodiment of FIG. 5K are different from the OTA determination conditions (steps 5507, 5707, and 5907) in the embodiments of FIGS. 5E, 5G, and 5I in which a plurality of terminal are involved.

Figure 6A:
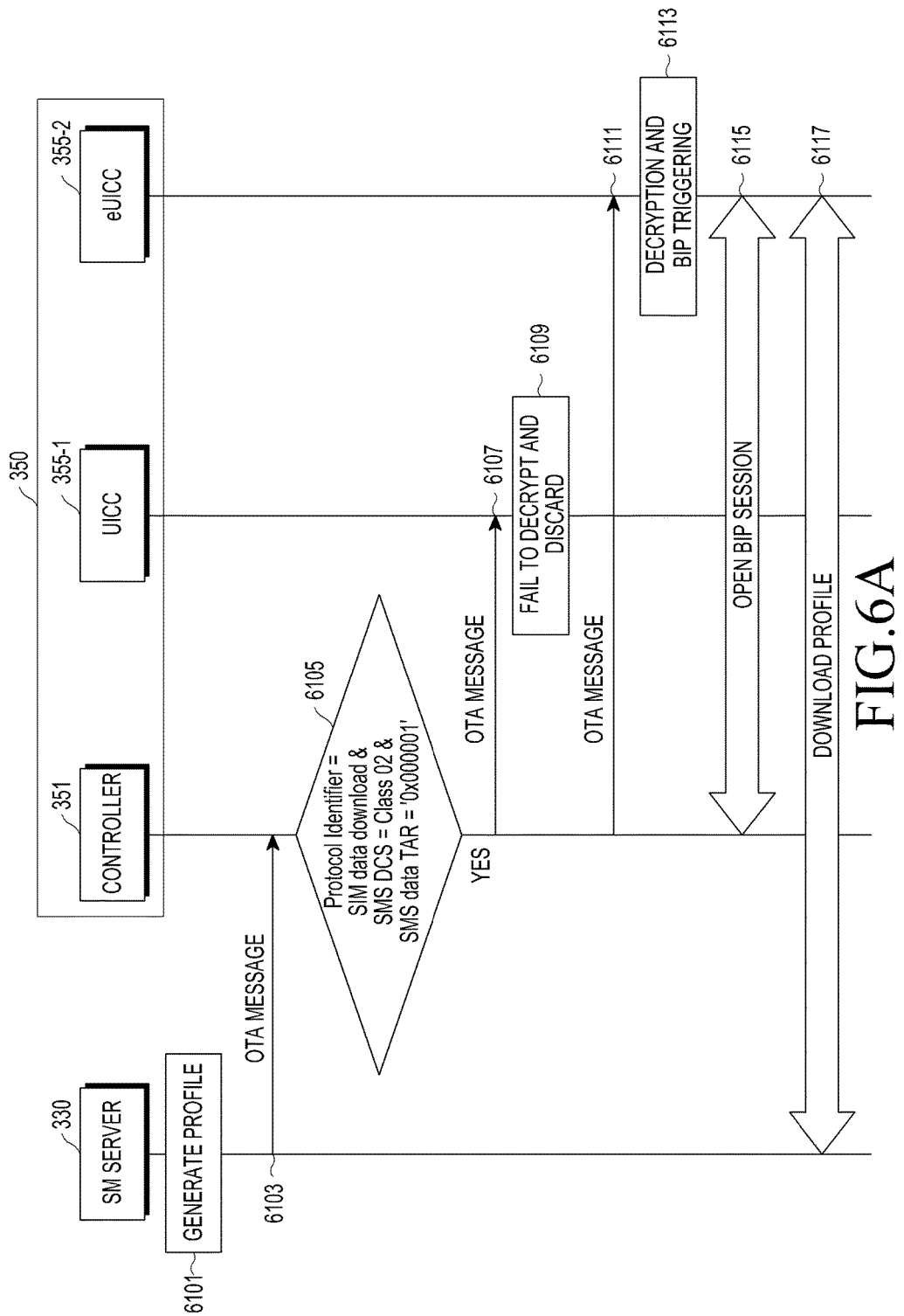

FIG. 6A is a flowchart illustrating a method by which the terminal having a plurality of UICCs installed therein or connected thereto remotely receives a profile according to an embodiment of the present invention. In the embodiment of FIG. 6A, it is assumed that the first UICC 351-1 is the existing attachable and detachable UICC or the eUICC and the second UICC 355-2 is the UICC or the eUICC. Further, in the embodiment of FIG. 6A, it is assumed that the SM server 330 encrypts and transmits the OTA message for downloading the profile through, for example, OTA key2 which is the OTA encryption key of EID2.

Referring to FIG. 6A, the SM server 330 generates a profile in step 6101, and the terminal 350 receives an SMS message including an OTA message from the SM server 330 in step 6103. Then, the controller 351 of the terminal 350 identifies the header part of the SMS message in step 6105. When a value of a protocol identifier field is, for example, "SIM data download", a DCS value is "Class 02", and further a Toolkit Application Reference (TAR) value included in an area which is not encrypted in the encrypted data part of the SMS is, for example, "0x000001", the controller 351 transfers the OTA message for downloading the profile to the UICC 355-1 and the eUICC 355-2 in steps 6107 and 6111, respectively. The TAR value is an identifier for identifying an application of the eUICC 355-2 that processes the OTA message for installing the eUICC-related profile, and the controller 351 may determine whether the corresponding OTA message should be transferred to the eUICC 355-2 by checking the TAR value. According to another embodiment, the controller 351 may determine the OTA for installing the eUICC-related profile based on another value as well as the above TAR value. Meanwhile, in step 6109, the UICC 355-1 having received the OTA message cannot decrypt the OTA message with the OTA key which the UICC 355-1 possesses, so that the corresponding OTA message is discarded without more processing. In contrast, the eUICC 355-2 can decrypt the OTA message with OTA key2 which the eUICC 355-2 possesses. Accordingly, in step 6113, the eUICC 355-2 decrypts the OTA message through OTA key2 and triggers BIP communication. Thereafter, a BIP session is opened for BIP communication between the controller 351 and the eUICC 355-2 in step 6115, and a profile download is performed between the SM server 330 and the eUICC 355-2 through the generated BIP session in step 6117. Meanwhile, although not illustrated, when the conditions given in step 6105 are not met, the terminal 350 performs a predetermined general process or terminates a remote reception process of the profile.

Figure 6B:
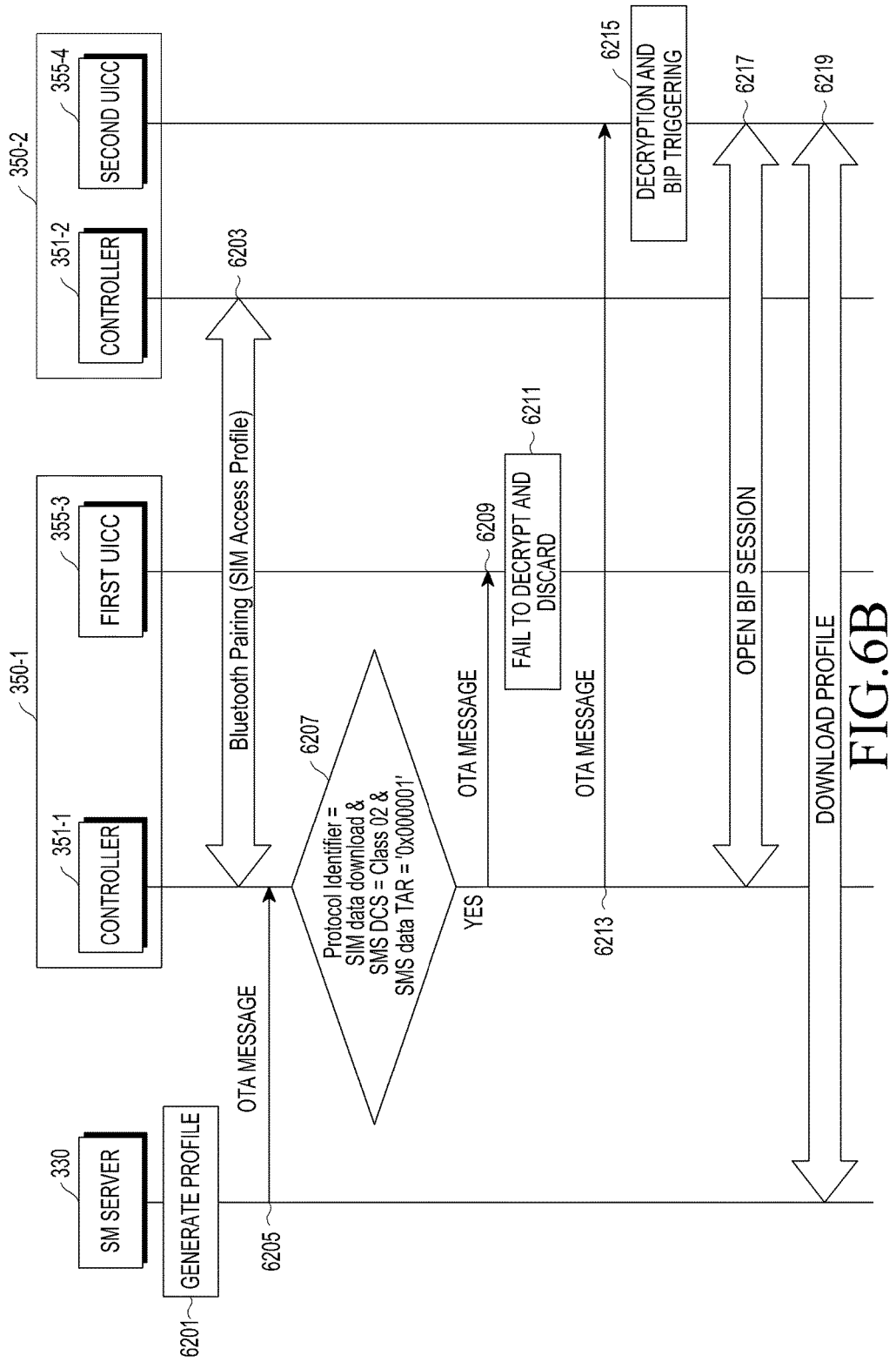

FIG. 6B is a flowchart illustrating another example of the method by which the terminal having a plurality of UICCs installed therein or connected thereto remotely receives a profile according to an embodiment of the present invention. The embodiment of FIG. 6B is another embodiment of the embodiment of FIG. 6A and corresponds to an embodiment in which a plurality of terminals are involved in the profile download and download the profile through Bluetooth pairing.

Steps 6201 to 6219 of FIG. 6B correspond to a process in which the controller 351 of the first terminal 350-1 and the controller 351-2 of the second terminal 350-2 are paired through Bluetooth and then the second UICC 355-4 inserted into or fixed to be installed in the second terminal 350-2 downloads the profile through the controller 351 of the first terminal 350-1. Since the remaining steps except for Bluetooth pairing (step 6203) in operations of steps 6201 to 6219 of FIG. 6B are equal or similar to the operations of the corresponding steps in the embodiment of FIG. 6A, a detailed description will be omitted. Further, it is noted that the OTA determination conditions (step 6105) in the embodiment of FIG. 6B are different from the OTA determination conditions (steps 5507, 5707, 5907, and 51107) in the embodiments of FIGS. 5E, 5G, 5I, and 5K in which a plurality of terminal are involved.

Figure 7A:
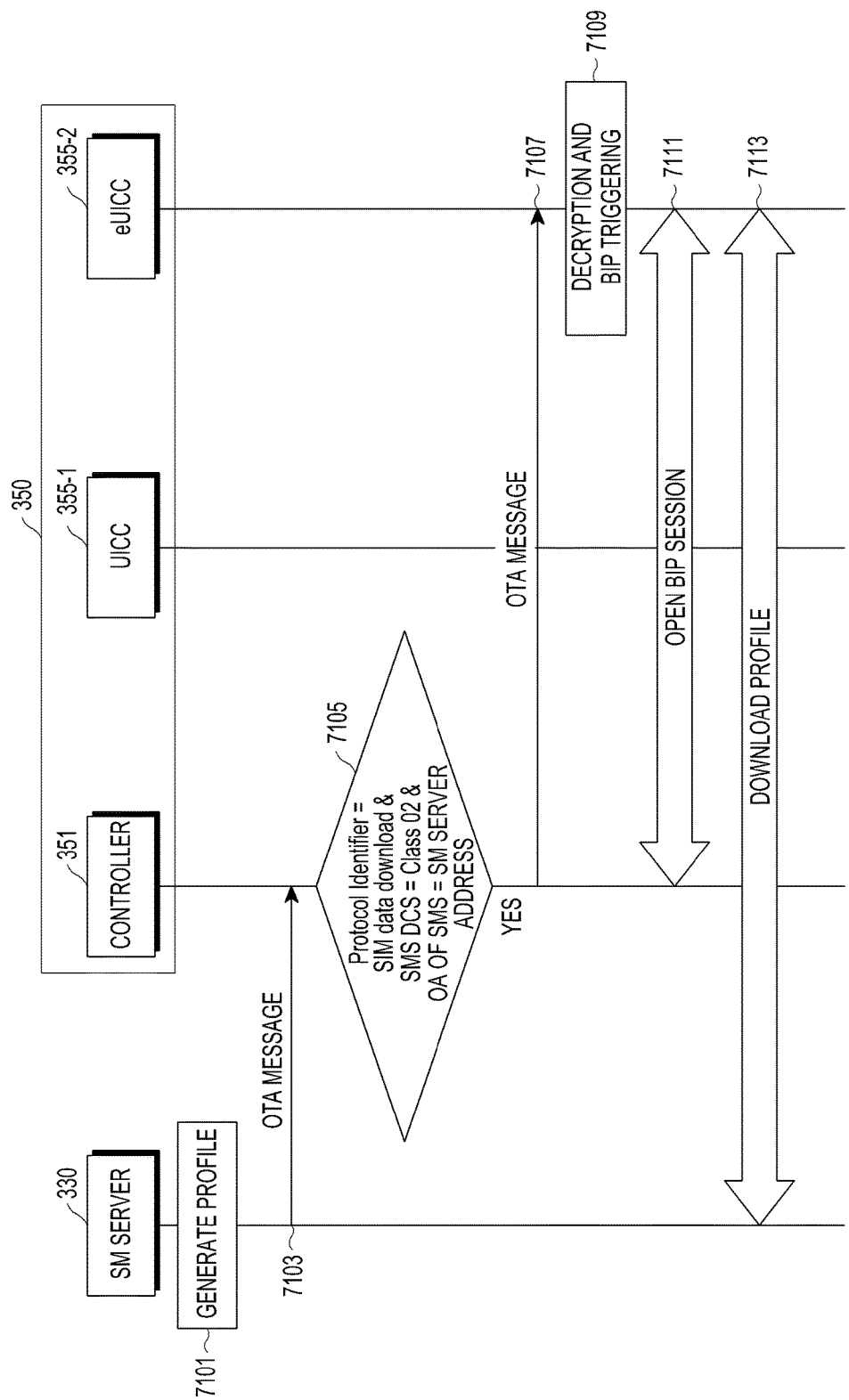

FIG. 7A is a flowchart illustrating a method by which the terminal having a plurality of UICCs installed therein or connected thereto remotely receives a profile according to an embodiment of the present invention. In the embodiment of FIG. 7A, it is assumed that the first UICC 351-1 is the existing attachable and detachable UICC or the eUICC and the second UICC 355-2 is the UICC or the eUICC. Further, in the embodiment of FIG. 7A, it is assumed that the SM server 330 encrypts and transmits the OTA message for downloading the profile through, for example, OTA key2 which is the OTA encryption key of EID2.

Referring to FIG. 7A, the SM server 330 generates a profile in step 7101, and the terminal 350 receives an SMS message including an OTA message from the SM server 330 in step 7103. Then, the controller 351 of the terminal 350 identifies the header part of the SMS message in step 7105. When a value of a protocol identifier is "SIM data download", a DCS value is "Class 02", and further an OA value of the SMS is an SM server address, the controller 351 determines that the UICC (that is, the UICC in which the profile to be downloaded from the SM server will be installed) connected to the controller 351 is the eUICC 355-2 instead of transferring the OTA message to all the UICC 355-1 and the eUICC 355-2 as described in the above embodiment. Accordingly, in step 7107, the controller 351 transfers the OTA message only to the eUICC 355-2. Of course, since the UICC complying with the normal standard specification cannot decrypt the OTA message with the OTA key which the UICC has even though the OTA message is transferred to the UICC 355-1, the UICC 355-1 discards the corresponding OTA message without more processing. However, it is preferable that the method proposed by the present embodiment is used in a case of a UICC which does not comply with the standard specification. Thereafter, in step 7109, the eUICC 355-2 decrypts the OTA message through OTA key2 and triggers BIP communication. Further, a BIP session is opened for BIP communication between the controller 351 and the eUICC 355-2 in step 7111, and a profile download is performed between the SM server 330 and the eUICC 355-2 through the generated BIP session in step 7113. Meanwhile, although not illustrated, when the conditions given in step 7105 are not met, the terminal 350 performs a predetermined general process or terminates a remote reception process of the profile.

Figure 7B:
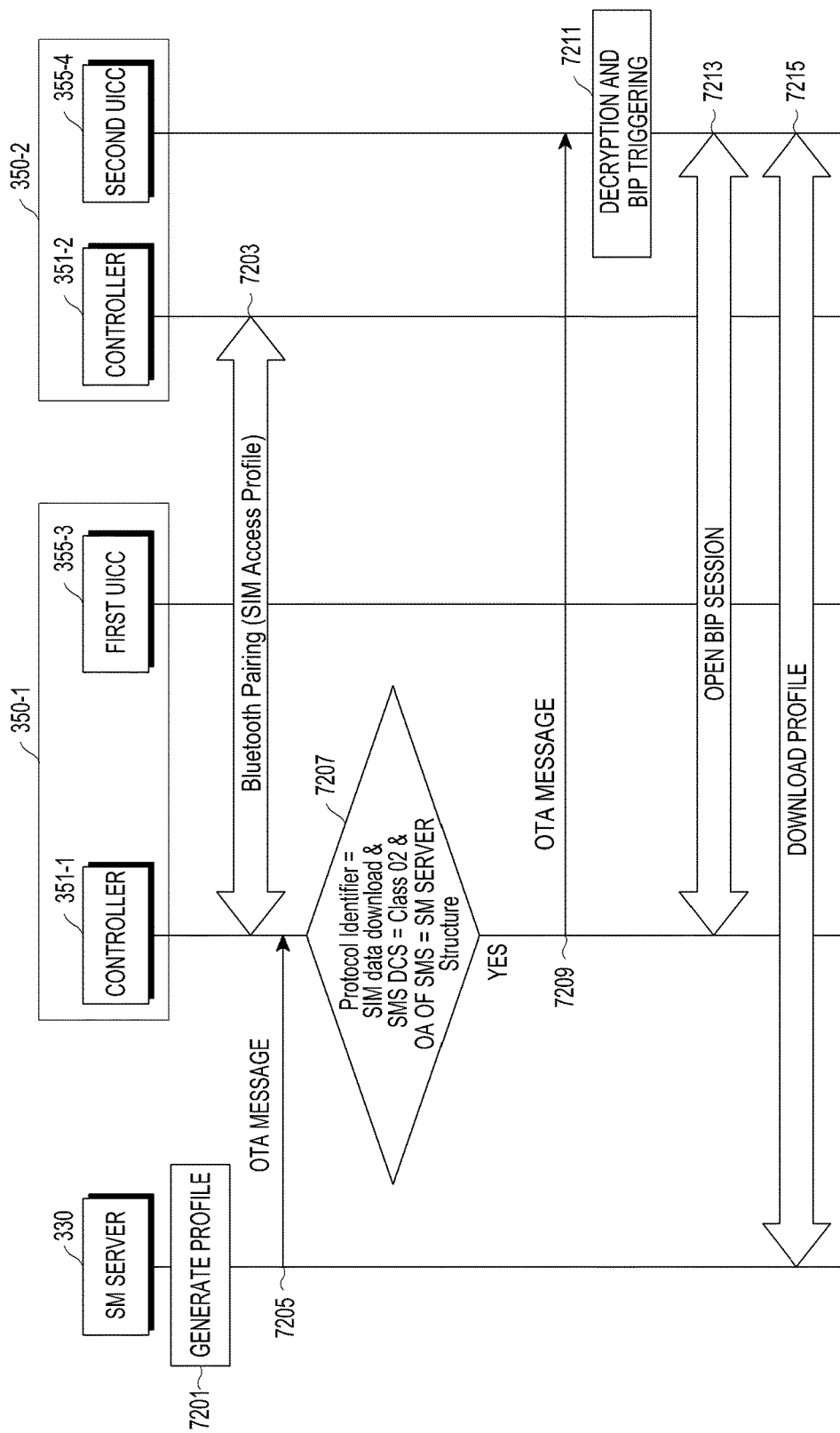

FIG. 7B is a flowchart illustrating another example of the method by which the terminal having a plurality of UICCs installed therein or connected thereto remotely receives a profile according to an embodiment of the present invention. The embodiment of FIG. 7B is another embodiment of the embodiment of FIG. 7A and corresponds to an embodiment in which a plurality of terminals are involved in the profile download and download the profile through Bluetooth pairing.

Steps 7201 to 7215 of FIG. 7B correspond to a process in which the controller 351 of the first terminal 350-1 and the controller 351-2 of the second terminal 350-2 are paired through Bluetooth and then the second UICC 355-4 inserted into or fixed to be installed in the second terminal 350-2 downloads the profile through the controller 351 of the first terminal 350-1. Since the remaining steps except for Bluetooth pairing (step 7207) in operations of steps 7201 to 7215 of FIG. 7B are equal or similar to the operations of the corresponding steps in the embodiment of FIG. 7A, a detailed description will be omitted. Further, the embodiment of FIG. 7B is different from the embodiment of FIG. 5E in that the OTA message is also transferred to the first UICC 355-3 of the first terminal 350-1 in step 5509 according to the embodiment of FIG. 5E but the OTA message is transferred only to the second UICC 355-4 of the second terminal 350-2 without being transferred to the first UICC 355-3 of the first terminal 350-1 in the embodiment of FIG. 7B. That is, the embodiment of FIG. 7B has the difference in that the OTA message can be transferred only to a preset UICC.

Figure 8A:
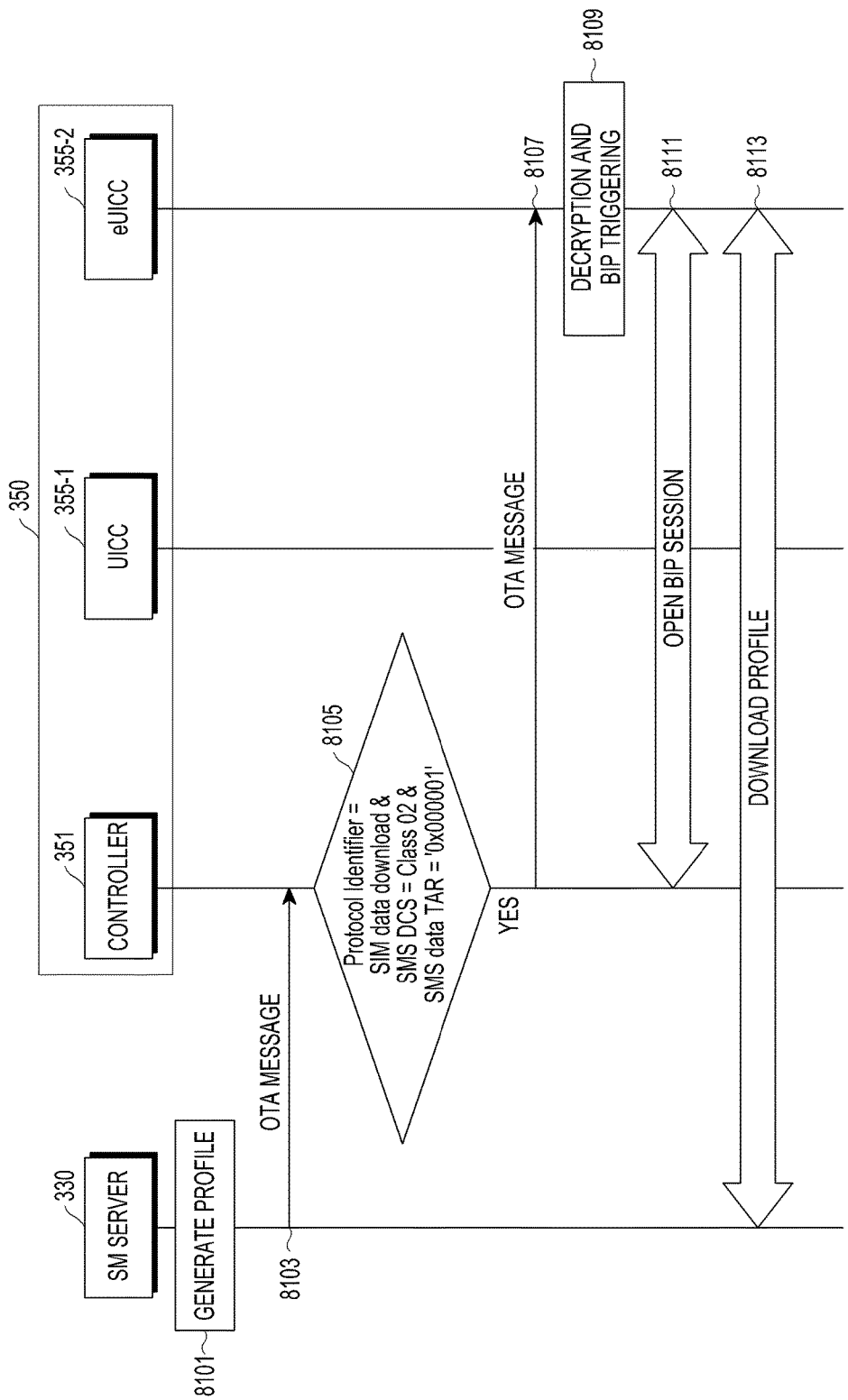

FIG. 8A is a flowchart illustrating a method by which the terminal having a plurality of UICCs installed therein or connected thereto remotely receives a profile according to an embodiment of the present invention. In the embodiment of FIG. 8A, it is assumed that the first UICC 351-1 is the existing attachable and detachable UICC or the eUICC and the second UICC 355-2 is the UICC or the eUICC. Further, in the embodiment of FIG. 8A, it is assumed that the SM server 330 encrypts and transmits the OTA message for downloading the profile through, for example, OTA key2 which is the OTA encryption key of EID2.

Referring to FIG. 8A, the SM server 330 generates a profile in step 8101, and the terminal 350 receives an SMS message including an OTA message from the SM server 330 in step 8103. Then, the controller 351 of the terminal 350 identifies the header part of the SMS message in step 8105. When a value of a protocol identifier field is "SIM data download", a DCS value is "Class 02", and further a TAR value included in an area which is not encrypted in the encrypted data part of the SMS message is, for example, "0x000001", the controller 351 determines that the connected UICC (that is, the UICC in which the profile downloaded from the SM server is installed) is the eUICC 355-2. Accordingly, in step 8107, the controller 351 transfers the OTA message only to the eUICC 355-2. The TAR value is an identifier for identifying an application of the eUICC that processes the OTA message for installing the eUICC-related profile, and the controller 351 may determine whether the corresponding OTA message should be transferred to the eUICC by checking the TAR value according to the present embodiment. According to another embodiment, the controller 351 may determine the OTA message for installing the eUICC-related profile based on another value as well as the above TAR value. Thereafter, in step 8109, the eUICC 355-2 decrypts the OTA message through OTA key2 and triggers BIP communication. Further, a BIP session is opened for BIP communication between the controller 351 and the eUICC 355-2 in step 8111, and a profile download is performed between the SM server 330 and the eUICC 355-2 through the generated BIP session in step 8113. Meanwhile, although not illustrated, when the conditions given in step 8105 are not met, the terminal 350 performs a predetermined general process or terminates a remote reception process of the profile.

Figure 8B:
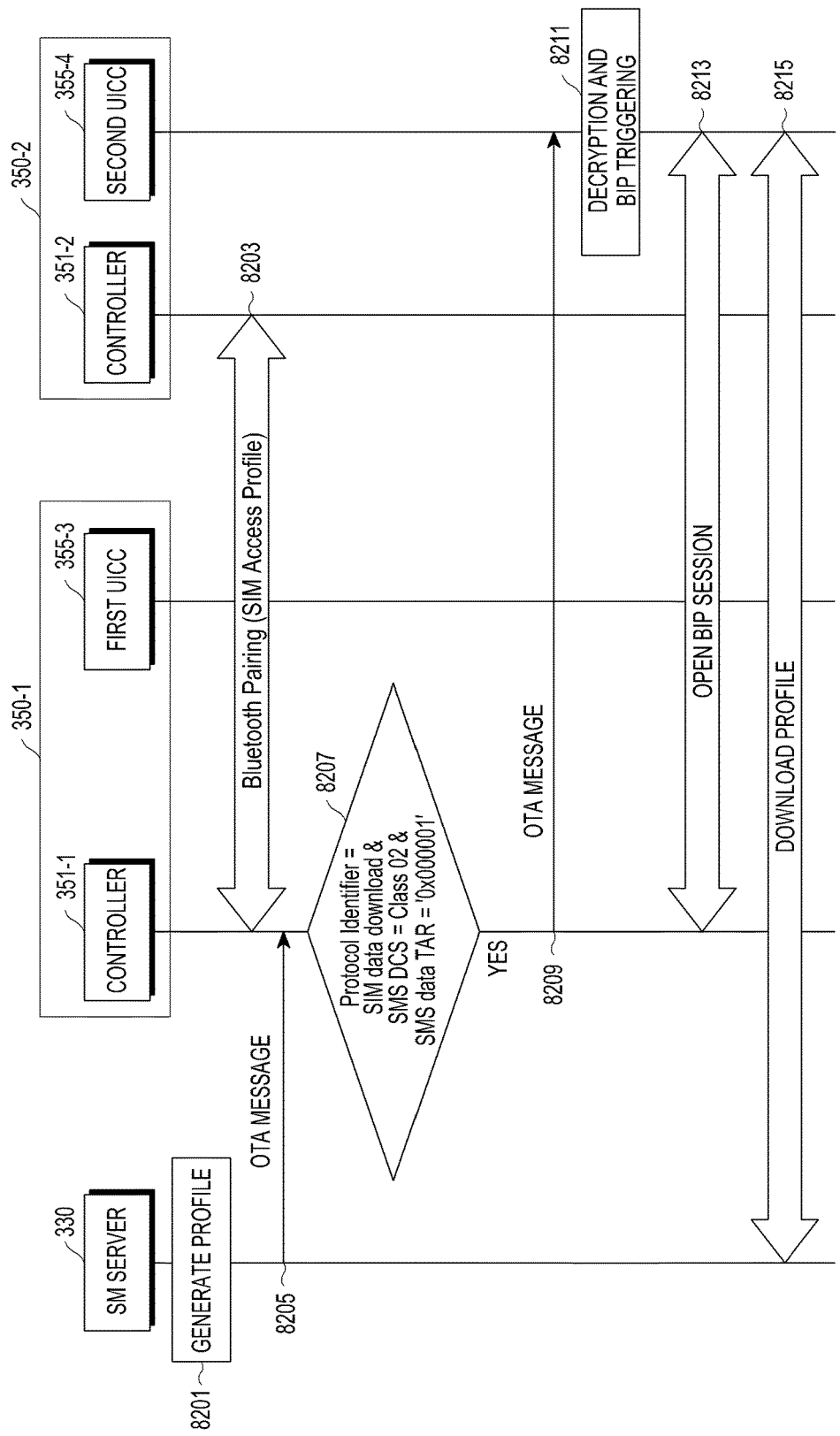

FIG. 8B is a flowchart illustrating another example of the method by which the terminal having a plurality of UICCs installed therein or connected thereto remotely receives a profile according to an embodiment of the present invention. The embodiment of FIG. 8B is another embodiment of the embodiment of FIG. 8A and corresponds to an embodiment in which a plurality of terminal are involved in the profile download and download the profile through Bluetooth pairing.

Steps 8201 to 8215 of FIG. 8B correspond to a process in which the controller 351 of the first terminal 350-1 and the controller 351-2 of the second terminal 350-2 are paired through Bluetooth and then the second UICC 355-4 inserted into or fixed to be installed in the second terminal 350-2 downloads the profile through the controller 351 of the first terminal 350-1. Since the remaining steps except for Bluetooth pairing (step 8207) in operations of steps 8201 to 8215 of FIG. 8B are equal or similar to the operations of the corresponding steps in the embodiment of FIG. 8A, a detailed description will be omitted. Further, the embodiment of FIG. 8B is different from the embodiment of FIG. 6B in that the OTA message is also transferred to the first UICC 355-3 of the first terminal 350-1 in step 6209 according to the embodiment of FIG. 6B but the OTA message is transferred only to the second UICC 355-4 of the second terminal 350-2 without being transferred to the first UICC 355-3 of the first terminal 350-1 in the embodiment of FIG. 8B. That is, the embodiment of FIG. 8B has the difference in that the OTA message can be transferred only to a preset UICC.

Figure 9A:
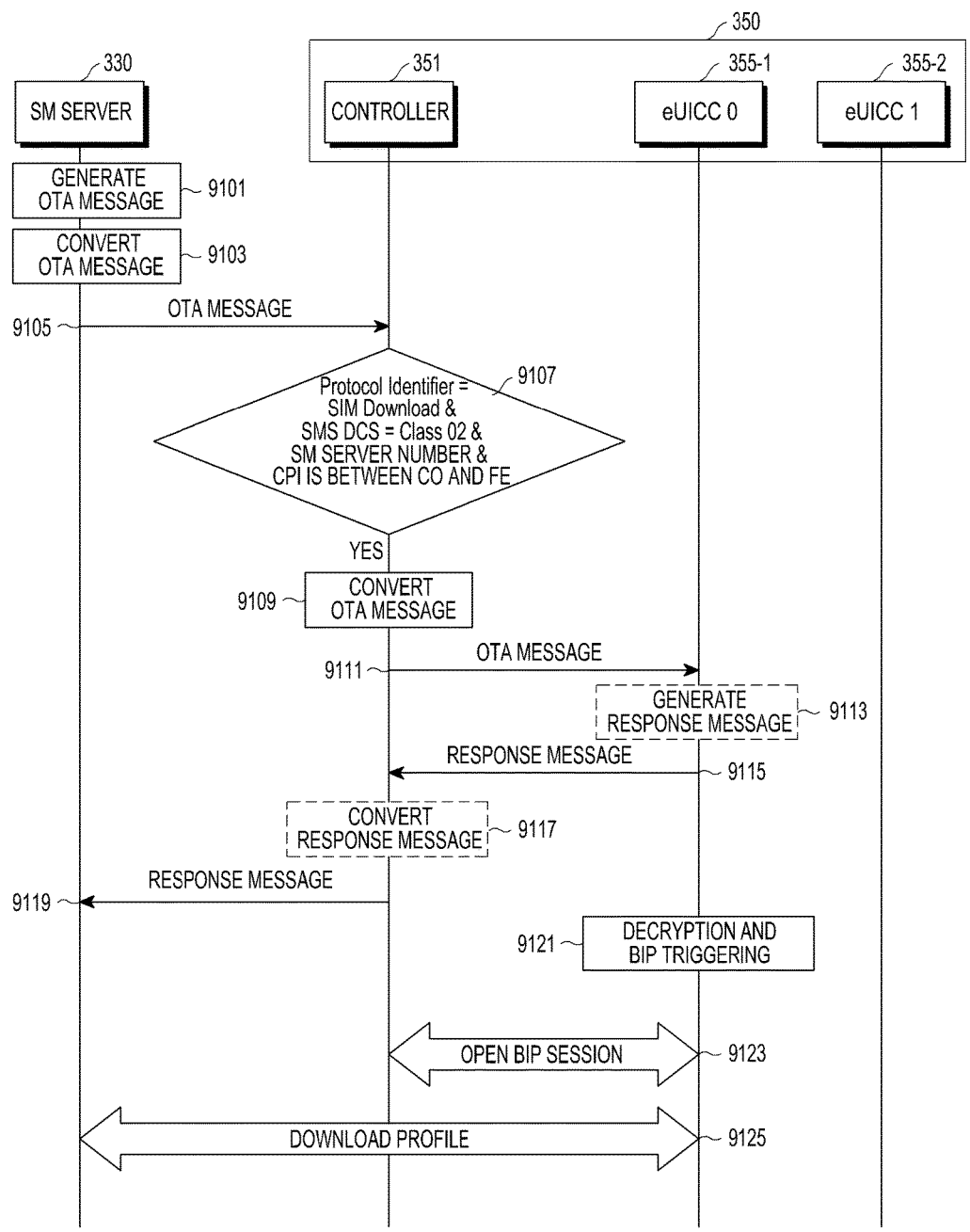

FIG. 9A is a flowchart illustrating a method by which the terminal having a plurality of UICCs installed therein or connected thereto remotely receives a profile according to a fifth embodiment of the present invention. According to the present embodiment, it is assumed that all the first UICC 351-1 and the second UICC 355-2 are eUICCs. Further, the first UICC 351-1 is called eUICC0 and the second UICC 355-2 is called eUICC1 for convenience, and it is assumed that the terminal 350 manages eUICC0 355-1 and eUICC1 355-2 through index0 and index1, respectively. Further, according to the present embodiment, it is assumed that the SM server 330 transmits the OTA message to eUICC0.

Referring to FIG. 9A, in step 9101, the SM server 330 generates "70" corresponding to a standard value as a Command Packet Identifier (CPI) value used when the OTA message is encrypted and then coverts the CPI value into, for example, "C0" before a step of transmitting the OTA message. For convenience, it is assumed that the converted CPI value is CPI'. Thereafter, in step 9105, the terminal 350 receives an SMS message including the OTA message from the SM server 330. Then, the controller 351 of the terminal 350 identifies the header part of the SMS message in step 9107. When a value of a protocol identifier is "SIM data download", a DCS value is "Class 02", and further the CPI value included in an area which is not encrypted in the encrypted data part of the SMS message is, for example, "C0", the controller 350 determines that the received OTA message is the OTA message which should be transferred to eUICC0 355-1. In this case, the controller 351 determines that the CPI value included in the OTA message is CPI', converts the value of CPI' into "70" in step 9109, and transfers the encrypted OTA message to eUICC0 355-1 in step 9111. At this time, when a response to the SM server 330 through the SMS is needed, eUICC0 355-1 generates a response message through OTA key2 and transfers the response message to the controller 351 in step 9113 and step 9115. At this time, "71" corresponding to the standard value is generated as a Response Packet Identifier (RPI) value in the data part of the SMS message including the OTA message, and the response message includes the RPI value of "71".

Thereafter, when the response message is transferred to the controller 351, the controller 351 converts the RPI value of the response message into "C1" and transfers "C1" to the SM server 330 in steps 9117 and 9119. For convenience, the converted RPI value is indicated by RPI'. Another value as well as the above value (that is, "C1") may be used as the converted RPI value in the same way. For example, FIG. 10 illustrates an example of the converted RPI value when the number of eUICCs installed in the terminal is two. In the example of FIG. 10, a case where the CPI' value converted by the SM server 330 is C2 and the RPI' value converted by the controller 351 is C3 corresponds to a case where the OTA message should be transferred to eUICC1 355-2 in the embodiment of FIG. 9A. FIG. 11 illustrates an example of a CPI' value and a converted RPI' value which can be used when the number of eUICCs are three through an expansion of the method.

Referring back to FIG. 9A, in step 9121, eUICC0 355-1 decrypts the OTA message by using OTA key 1 and triggers BIP communication. Further, a BIP session is opened for BIP communication between the controller 351 and eUICC0 355-1 in step 9123, and a profile download is performed between the SM server 330 and eUICC0 355-1 through the generated BIP session in step 9125. Meanwhile, although not illustrated, when the conditions given in step 9107 are not met, the terminal 350 performs a predetermined general process or terminates a remote reception process of the profile.

Figure 9B:
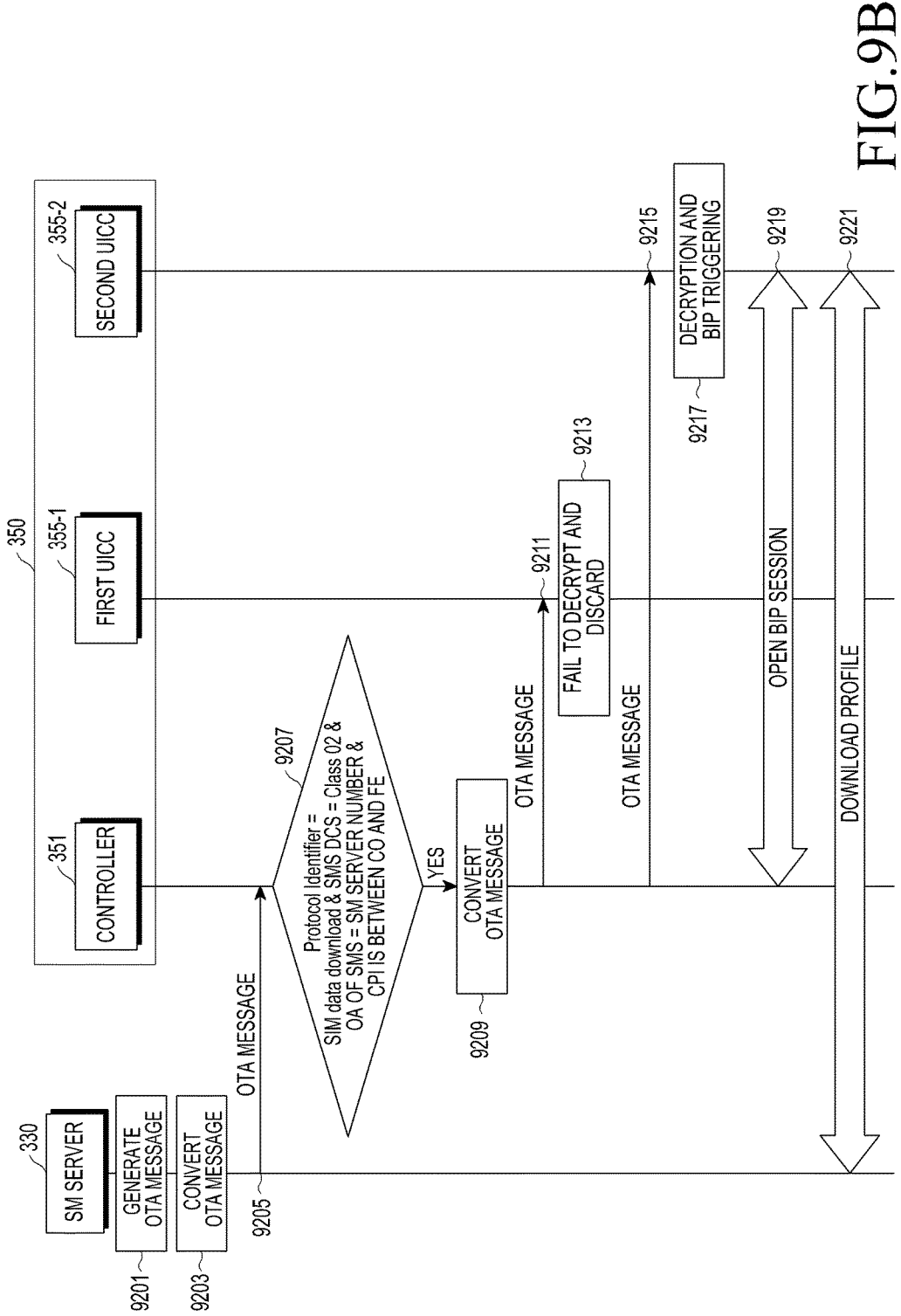

FIG. 9B is a flowchart illustrating another example of the method by which the terminal having a plurality of UICCs installed therein or connected thereto remotely receives a profile according to an embodiment of the present invention. The embodiment of FIG. 9B corresponds to a process for transferring the profile to the second UICC 355-2 which is the eUICC by transferring to the OTA message to both the first UICC 355-1 and the second UICC 355-2. The embodiment of FIG. 9B is different from the embodiment of FIG. 9A in that the OTA message is transferred to all UICCs instead of a particular UICC after OTA determination (step 9207). Since the remaining operations of steps 9201 to 9221 of FIG. 9B are equal or similar to the operations of the corresponding steps in the embodiment of FIG. 9A, a detailed description will be omitted.

FIG. 9C is a flowchart illustrating another example of the method by which the terminal having a plurality of UICCs installed therein or connected thereto remotely receives a profile according to an embodiment of the present invention. The embodiment of FIG. 9C is another embodiment of the embodiment of FIG. 9A and corresponds to an embodiment in which a plurality of terminals are involved in the profile download and download the profile through Bluetooth pairing.

Steps 9301 to 9319 of FIG. 9C correspond to a process in which the controller 351 of the first terminal 350-1 and the controller 351-2 of the second terminal 350-2 are paired through Bluetooth and then the second UICC 355-4 inserted into or fixed to be installed in the second terminal 350-2 downloads the profile through the controller 351 of the first terminal 350-1. Since the remaining operations except for Bluetooth pairing (step 8207) and involvement of a plurality of terminals in the profile download in steps 9301 to 9319 of FIG. 9B are equal or similar to the operations of the corresponding steps in the embodiments of FIGS. 9A and 9B, a detailed description will be omitted.

Figure 9D:
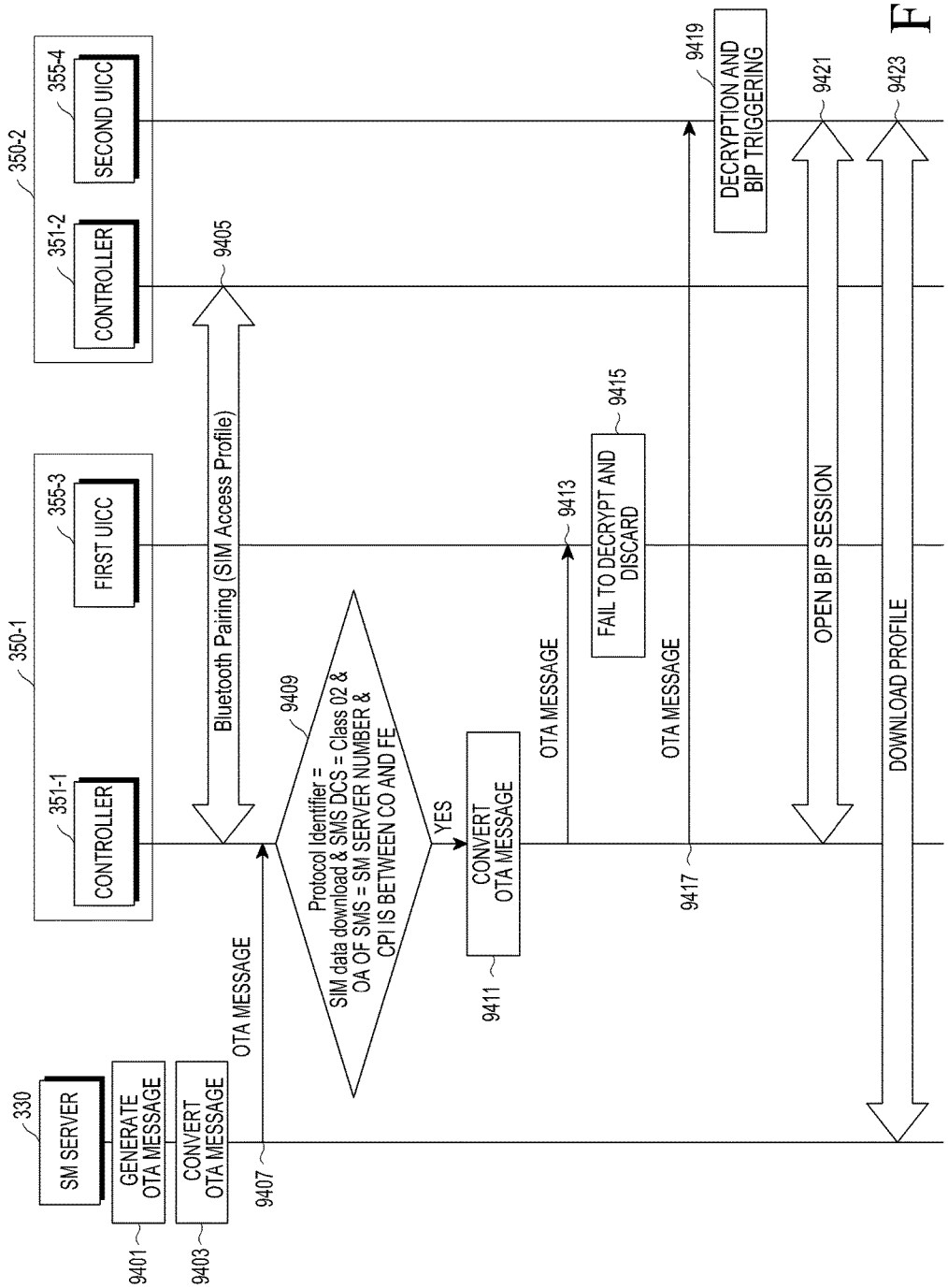

FIG. 9D is a flowchart illustrating another example of the method by which the terminal having a plurality of UICCs installed therein or connected thereto remotely receives a profile according to an embodiment of the present invention. The embodiment of FIG. 9D is another embodiment of the embodiment of FIG. 9A and corresponds to an embodiment in which a plurality of terminal are involved in the profile download and download the profile through Bluetooth pairing.

Steps 9401 to 9421 of FIG. 9D correspond to a process in which the controller 351 of the first terminal 350-1 and the controller 351-2 of the second terminal 350-2 are paired through Bluetooth and then the second UICC 355-4 inserted into or fixed to be installed in the second terminal 350-2 downloads the profile through the controller 351 of the first terminal 350-1. The embodiment of FIG. 9D is different from the embodiment of FIG. 9C in that the OTA message is transferred to all UICCs instead of a particular UICC after OTA determination (step 9407). Since the remaining operations of steps 9401 to 9421 of FIG. 9D are equal or similar to the operations of the corresponding steps in the embodiment of FIG. 9A, a detailed description will be omitted.

According to the above described embodiment of the present invention, the terminal having both the UICC and the eUICC installed therein can subscribe to a wireless communication network through the UICC or the eUICC, so that the terminal can be applied in a network of an MNO which does not construct remote installation infrastructure. For example, while the terminal uses the wireless communication network after subscribing to the corresponding wireless communication network through the UICC, the terminal may change the operator to another wireless communication network in which eUICC remote installation infrastructure is constructed.

Further, according to an embodiment of the present invention, after subscribing to a wireless communication network through the UICC, the terminal may install a profile in the eUICC and use it at a local low rate instead of paying expensive roaming charges abroad.

According to an embodiment of the present invention, in order to install a new profile in the eUICC while the UICC is installed in the terminal and the terminal uses a wireless communication network through the UICC, a process for first activating a provisioning profile in the eUICC, accessing the wireless communication network through the corresponding profile, and installing a new profile is needed.

According to an embodiment of the present invention, when the terminal subscribes to a wireless communication service through the UICC and then remotely installs a profile in the eUICC and changes an MNO, the profile can be installed in the eUICC in a state where the existing UICC is activated without any provisioning profile of the eUICC.

According to an embodiment of the present invention, when the user goes abroad after subscribing to a wireless communication network through the UICC, the user installs a profile of a local mobile network operator in an eUICC while a wireless communication function of the UICC is activated and then activates and uses the local profile, so that the user can use a wireless communication service without paying an expensive roaming fee.

According to an embodiment of the present invention, since an eUICC does not need a provisioning profile when the terminal is newly opened, an agency, which deals with the terminal, may allow the terminal to subscribe to a wireless communication network by temporarily installing a UICC only for the opening, accessing the wireless communication network through the temporarily installed UICC to install a profile in the eUICC, and then removing the UICC. Thereafter, when the terminal moves to a new mobile network operator, a new profile may be installed using the profile of the used eUICC.

According to an embodiment of the present invention, with respect to all the above embodiments, a profile can be installed in a UICC or an eUICC installed in a second terminal connected to a corresponding first terminal through the terminal having an already opened UICC installed therein.

Figure 12:
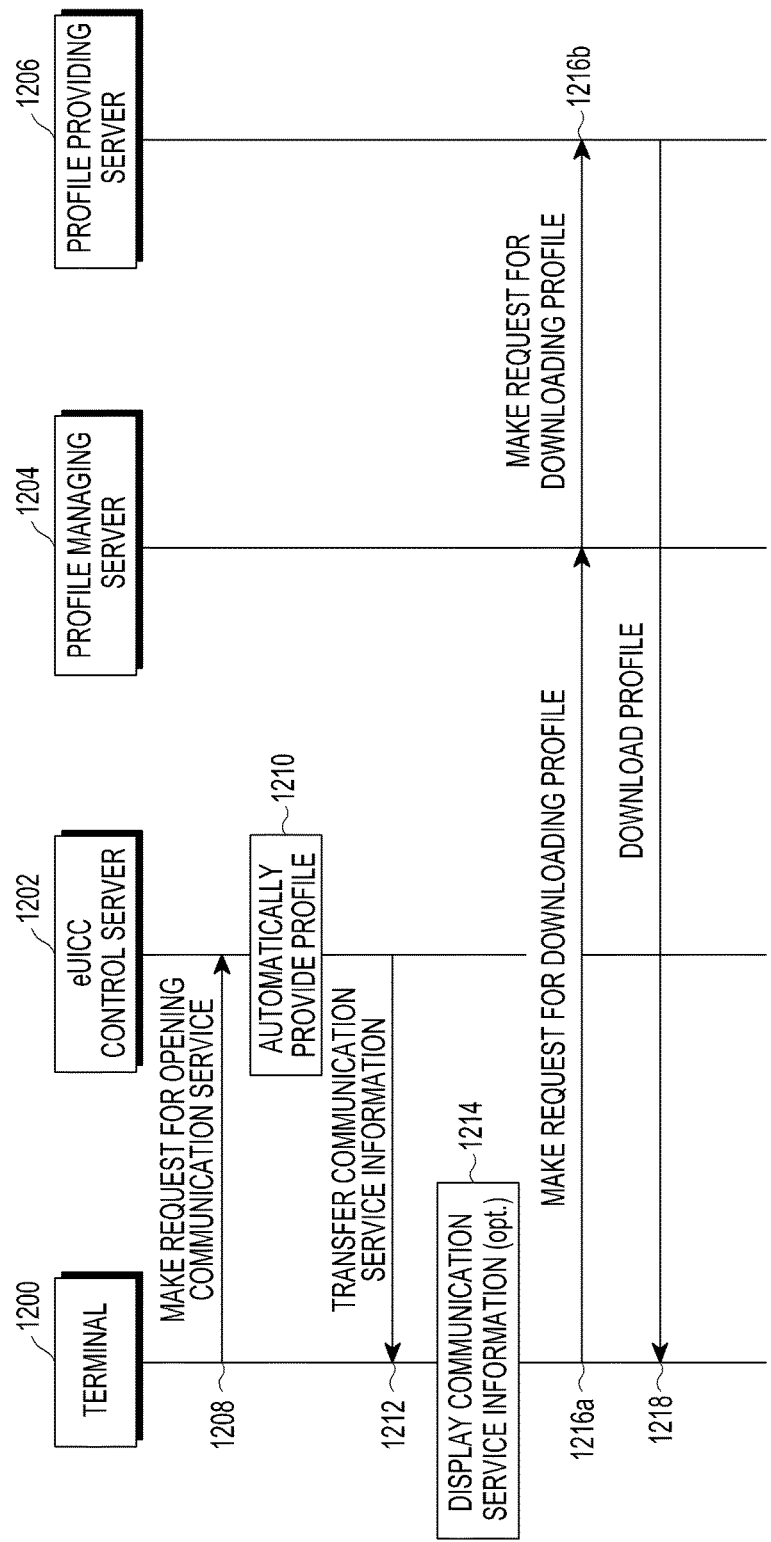
FIG. 12 is a flowchart illustrating a method of supporting remote reception of a profile in a wireless communication system according to an embodiment of the present invention.

FIG. 12 is a flowchart illustrating a method of supporting remote reception of a profile in a wireless communication system according to an embodiment of the present invention.

Referring to FIG. 12, in step 1208, a terminal 1200 may transfer a request for opening a communication service to an eUICC control server 1202. The request for opening the communication service may include an eUICC ID and one or more PLMN IDs, and further at least one of the following pieces of information 1) to 6) on the terminal 1200. The eUICC ID is identification information of the eUICC, and the PLMN ID is identification information of a MNO (that is, a mobile service provider).

1) IP information
2) GPS coordinate information
3) text or a number code value indicating a location
4) information for identifying an eUICC manufacturer
5) information for identifying a terminal manufacturer
6) complete or partial information on a currently used phone number When receiving information on the request for opening the communication service, the eUICC control server 1202 may automatically select a profile in step 1210. The automatic profile selection may use a method of selecting values corresponding to mobile service providers registered in the eUICC control server 1202 from the PLMN ID values included in the information on the request for opening the communication service and automatically selecting one of the mobile service providers to install a profile of the mobile service provider. Here, as the method of automatically selecting the mobile service provider, at least one of the following methods 1) to 5) may be used.

1) method of, when the eUICC control server 1202 can select and install a profile that matches the last four numbers of the user's phone number among the selected mobile service providers, selecting the corresponding mobile service provider
2) user manually selects one of a plurality of mobile service provider candidates
3) automatically select a mobile service provider and a profile having the lowest cost in profile installation and communication service usage fare
4) automatically select a profile of which a communication service quality is higher than or equal to a predetermined reference
5) automatically select a mobile service provider and a profile based on various statistical data Meanwhile, the method by which the user manually selects the mobile service provider from a plurality of mobile service providers is described below.

The eUICC control server 1202 may map a profile identifier corresponding to the selected profile and information on the eUICC ID received from the terminal 1200 and transfer the mapped profile identifier and eUICC ID information to a profile providing server 1206. Then, the profile providing server 1206 may transfer the mapping information between the profile identifier and the eUICC ID to a profile managing server 1204. Then, the profile managing server 1204 may store the corresponding mapping information.

Further, the terminal 1200 may receive a mobile service provider list from the eUICC control server 1202 in the form of a PLMN ID list, display the PLMN ID list on a display unit of the terminal 1200, and display mobile service provider or profile information directly selected by the user from the displayed lists, selected based on a user preference, or automatically selected by the eUICC control server 1202 on the display unit of the terminal 1200. The user preference may be set through a checklist in a contract with the mobile service provider or preferences may be set through a UI of the terminal 1200.

Further, in step 1212 of FIG. 12, the terminal 1200 may receive communication service information including mobile service provider or profile information automatically or manually selected through the eUICC control server 1202. The communication service information may include information on a phone number allocated to the terminal 1200.

In step 1214, the terminal 1200 may display all or some of the communication service information on the terminal.

In step 1216*a*, the terminal 1200 may transfer a profile download request to the profile managing server 1204. At this time, a profile download request message may include an eUICC ID.

When receiving the profile download request message and the eUICC ID from the terminal 1200, the profile managing server 1204 finds the profile identifier based on the mapping information between the profile identifier and the eUICC ID received from the profile providing server 1206, and transfers the profile download request to the profile providing server 1206 having transferred the profile identifier in step 1216*b*.

In step 1218, the profile providing server 1206 allows the terminal 1200 to download the profile corresponding to the profile identifier based on information (that is, the profile identifier) received from the profile managing server 1204.

Figure 13:
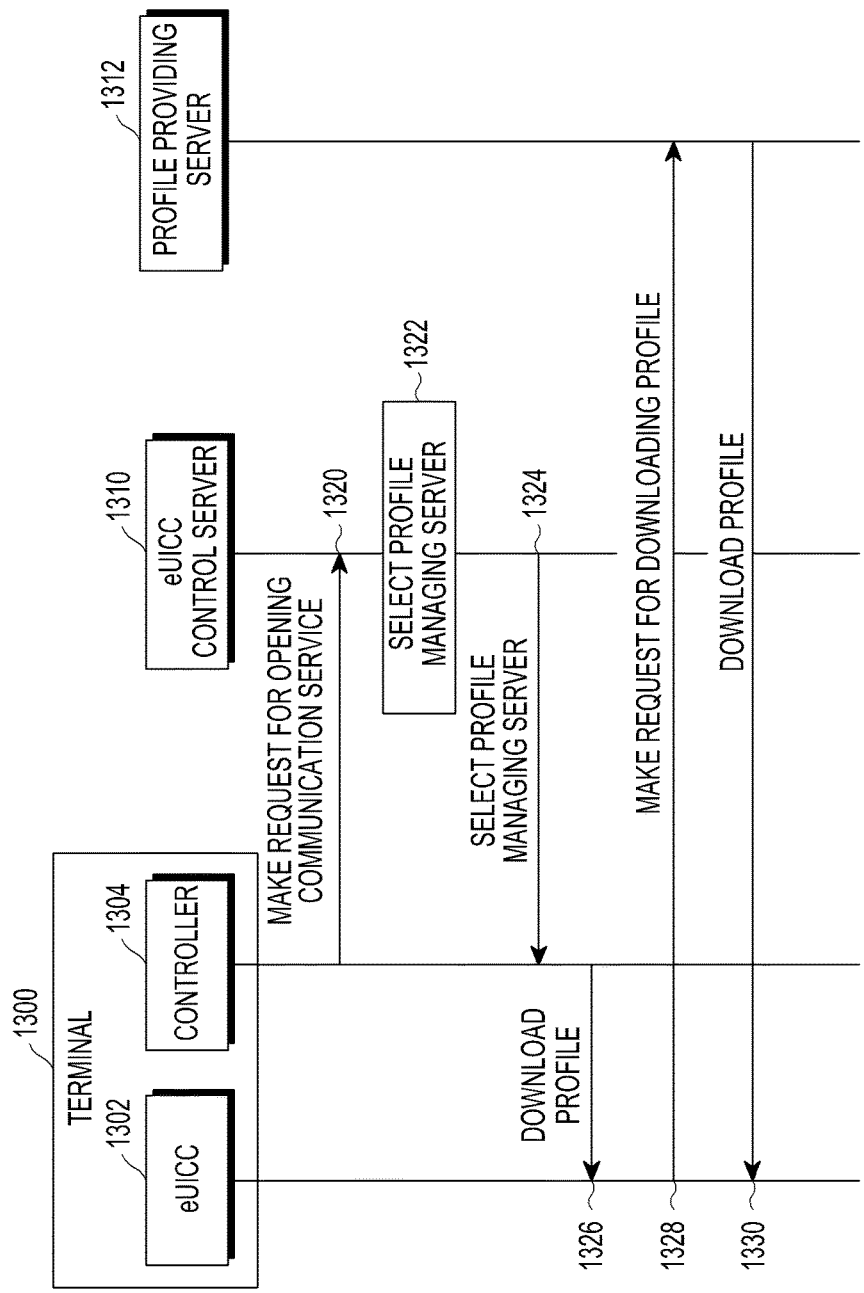
FIG. 13 is a flowchart illustrating an embodiment for automatically selecting a profile managing server in a wireless communication network according to an embodiment of the present invention.

FIG. 13 is a flowchart illustrating an embodiment for automatically selecting a profile managing server in a wireless communication network according to an embodiment of the present invention.

Referring to FIG. 13, in step 1320, a request for opening a communication service may be transferred to the eUICC control server 310 through a controller of a terminal 1300.

The request for opening the communication service may include an eUICC ID and one or more PLMN IDs, and further at least one of the following pieces of information 1) to 6).

1) IP information
2) GPS coordinate information
3) text or a number code value indicating a location
4) information for identifying eUICC manufacturer
5) information for identifying a terminal manufacturer
6) complete or partial information on a currently used phone number The eUICC control sever 1310 selects a profile managing server to process the profile download of the terminal 300 based on information included in the request for opening the communication service in step 1322 and may inform a controller 1304 of the terminal 1300 of information on a profile managing server 1312 in step 1324. The information on the profile managing server 1312 may be, for example, a URI value. As a method by which the eUICC control server 1310 selects the profile managing server 1312 to process the profile download of the terminal 1300, the following methods 1) and 2) may be used.

1) The eUICC control server 1310 stores a URI address of the profile managing server 1312 in a storage unit according to each eUICC ID and identifies whether the eUICC ID included when receiving the request for opening the communication service from the terminal 1300 is included in the eUICC ID list stored in the storage unit. When the eUICC ID is included in the eUICC ID list, the eUICC control server 1310 may transfer a URI address of the profile managing server 1312 corresponding to the corresponding eUICC ID to the terminal 1300. The eUICC control server 1310 may change and store the URI address of the profile managing server 1312 stored in the storage unit.

2) The eUICC control server 1310 stores the URI address of the profile managing server 1312 in the storage unit according to each prefix value rather than all contents of the eUICC ID and, when there is a value that matches a part of the eUICC ID received from the terminal 1300 among the eUICC prefix values stored in the storage unit of the eUICC control server 1310 when receiving the request for opening the communication service from the terminal 1300, transfers the URI address of the profile managing server corresponding to the corresponding eUICC prefix value to the terminal 1300. The prefix may indicate a value of some of the entire area of the eUICC ID value. The eUICC control server 1310 may change and store the URI address of the profile managing server 1312 stored in the storage unit.

Thereafter, after receiving profile managing server selection information from the profile managing server 1312 in step 1324, the controller 1304 of the terminal 1300 may make a request for downloading the profile to the eUICC 1302 of the terminal 1300 in step 1326. The request for downloading the profile may include URI information of the profile managing server 1312.

When the eUICC 1302 receives a profile download request including the URI information of the profile managing server 1312 from the controller 1304, the eUICC 1302 may transfer a profile download request message to the profile managing server 1312 corresponding to the URI of the profile managing server 1312 in step 1328.

Thereafter, similar to steps 1216*a* to 1218 of FIG. 12, the terminal 1300 downloads the profile through the profile managing server 1312 in step 1330.

Figure 14:
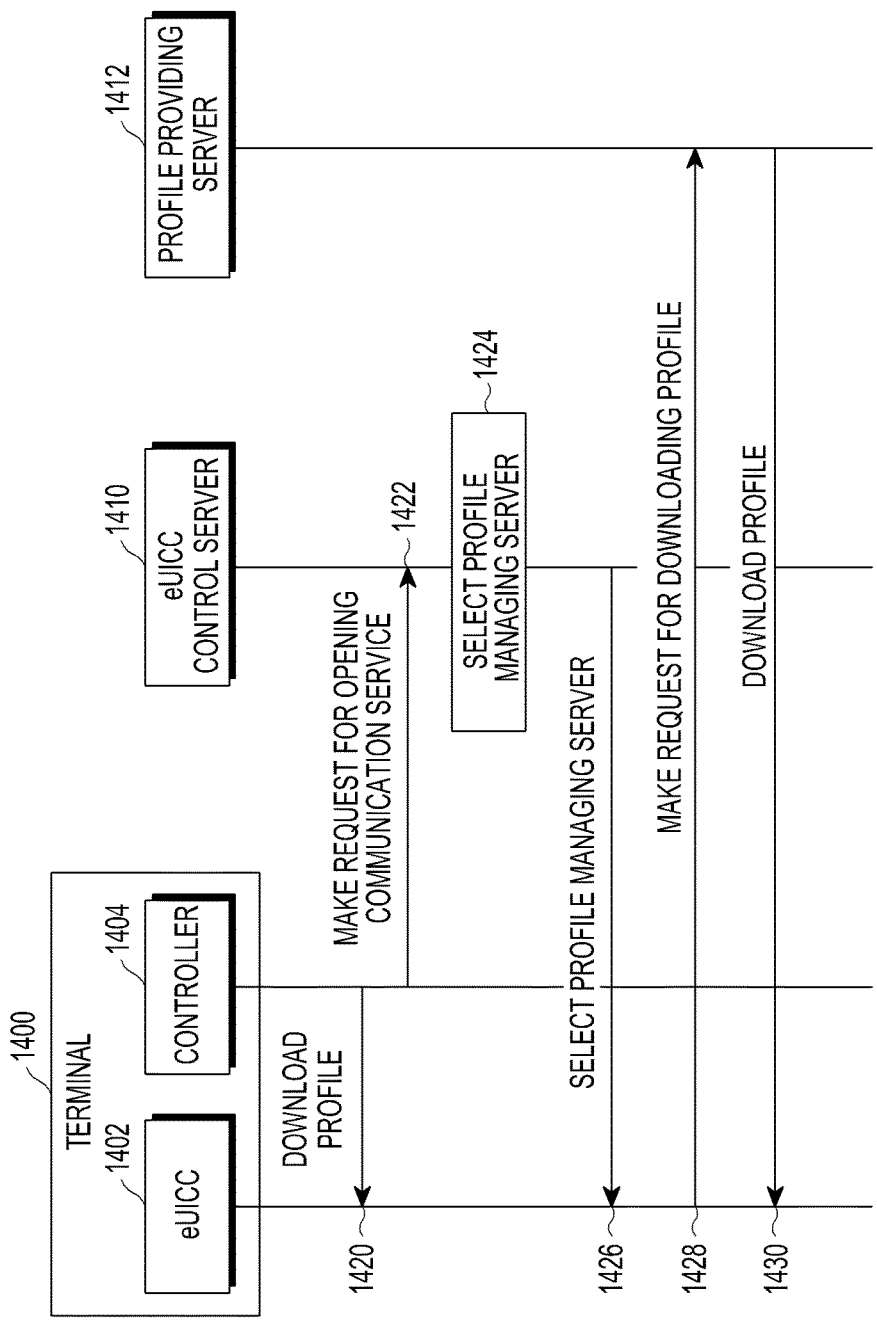
FIG. 14 is a flowchart illustrating another embodiment for automatically selecting a profile managing server in a wireless communication network according to an embodiment of the present invention.

FIG. 14 is a flowchart illustrating another embodiment for automatically selecting a profile managing server in a wireless communication network according to an embodiment of the present invention.

Referring to FIG. 14, in step 1420, a controller 1404 of a terminal 1400 may make a request for downloading a profile to an eUICC 1402 of the terminal 1400.

In step 1422, the eUICC 4102 may transfer a request for opening a communication service to an eUICC control server 1410.

The request for opening the communication service may include an eUICC ID and one or more PLMN IDs, and further at least one of the following pieces of information 1) to 6).

1) IP information
2) GPS coordinate information
3) text or a number code value indicating a location
4) information for identifying eUICC manufacturer
5) information for identifying a terminal manufacturer
6) complete or partial information on a currently used phone number The eUICC control sever 1410 selects a profile managing server to process the profile download of the terminal based on information included in the request for opening the communication service in step 1424 and may inform the eUICC 1402 of the terminal 1400 of information on the profile managing server 1412 in step 1426. The information on the profile managing server 1412 may be a URI value. As a method by which the eUICC control server 1410 selects the profile managing server 1412 to process the profile download of the terminal 1400, the following methods 1) and 2) may be used.

1) The eUICC control server 1410 stores a URI address of the profile managing server 1412 in a storage unit according to each eUICC ID and identifies whether the eUICC ID included when receiving the request for opening the communication service from the terminal 1400 is included in the eUICC ID list stored in the storage unit. When the eUICC ID is included in the eUICC ID list, the eUICC control server 1410 may transfer a URI address of the profile managing server 1412 corresponding to the corresponding eUICC ID to the terminal 1400. The eUICC control server 1410 may change and store the URI address of the profile managing server 1412 stored in the storage unit.

2) The eUICC control server 1410 stores the URI address of the profile managing server 1412 in the storage unit according to each prefix value rather than all contents of the eUICC ID and, when there is a value that matches a part of the eUICC ID received from the terminal 1400 among the eUICC prefix values stored in the storage unit of the eUICC control server 1410 when receiving the request for opening the communication service from the terminal 1400, transfers the URI address of the profile managing server corresponding to the corresponding eUICC prefix value to the terminal 1400. The prefix may indicate a value of some of the entire area of the eUICC ID value. The eUICC control server 1410 may change and store the URI address of the profile managing server 1412 stored in the storage unit.

Thereafter, in step 1428, the eUICC 1402 may transfer a profile download request message to the profile managing server 1412 corresponding to the URI of the profile managing server 1412. Thereafter, similar to steps 1216a to 1218 of FIG. 12, the terminal 1400 downloads the profile through the profile managing server 1412 in step 1430.

Figure 15:
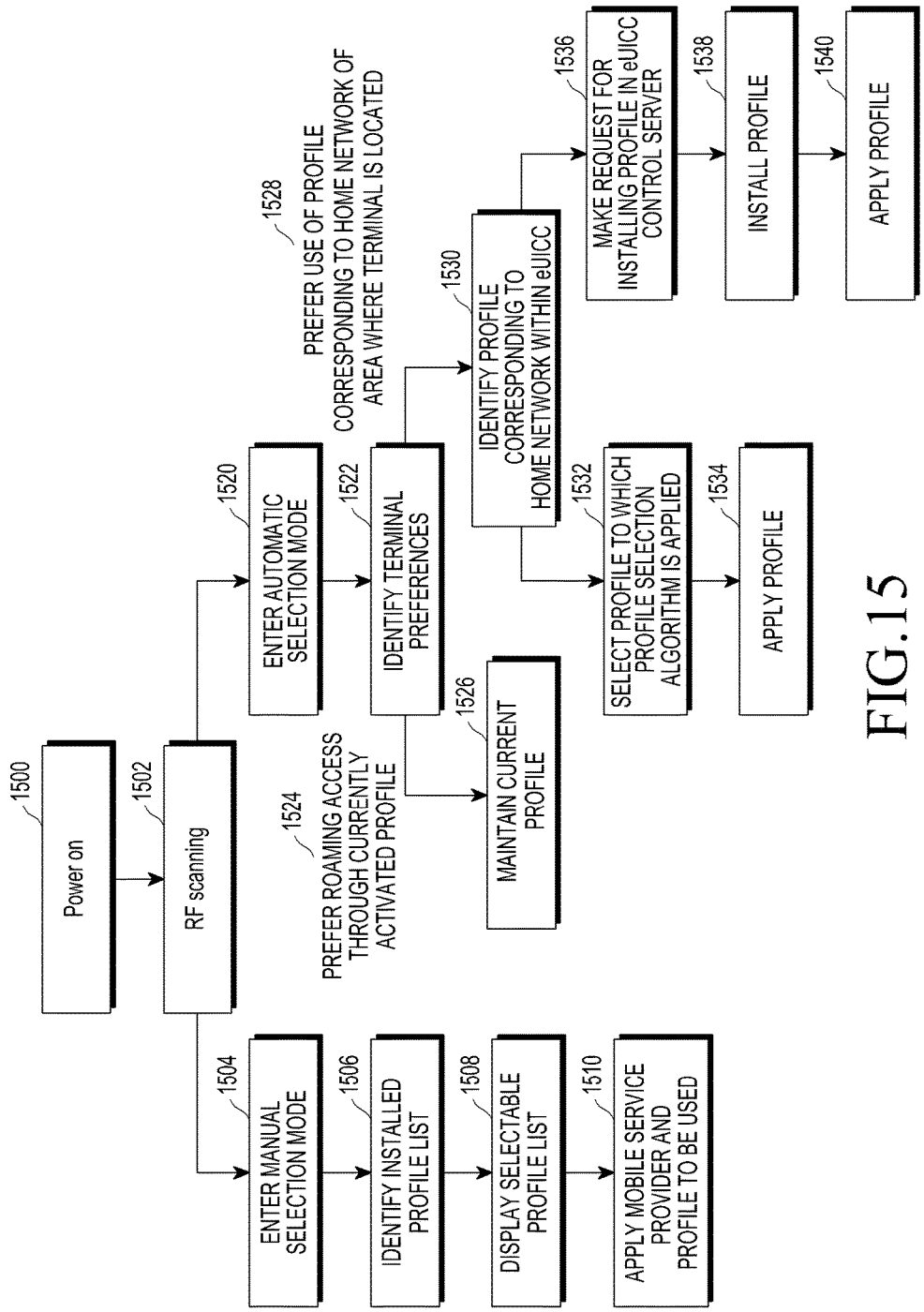
FIG. 15 is a flowchart illustrating an embodiment for receiving a profile based on a selection of a terminal having an eUICC installed therein according to an embodiment of the present invention.

FIG. 15 is a flowchart illustrating an embodiment for receiving a profile based on a selection of a terminal having an eUICC installed therein according to an embodiment of the present invention.

Referring to FIG. 15, in step 1500, the terminal may be turned on.

Thereafter, in step 1502, the terminal may search for a frequency through RF scanning and store PLMN ID values among wireless communication service signal information found at a current location of the terminal. Thereafter, for convenience of the description, the stored PLMN ID values according to the RF scanning are referred to as a "a frequency-found PLMN ID list in the terminal".

Then, the terminal may selectively operate in an "automatic profile selection mode" or a "manual profile selection mode" or operate in one of the two modes.

First, when the terminal enters the manual profile selection mode in step 1504, the terminal may identify a profile list installed in the terminal in step 1506. When the controller of the terminal makes a request for information on the installed profile list to the eUICC in an operation of identifying the profile list, the eUICC having received the request may transfer the information on the profile list installed in the eUICC to the controller of the terminal and the controller of the terminal may identify the information of the profile list installed in the eUICC. The profile list information may include, for example, PLMN ID values included according to each profile.

In step 1508, the terminal displays a mobile service provider list which can be selected on the display unit of the terminal. The displaying of the mobile service provider list which can be selected may be performed in at least one of the following schemes 1) to 3).

1) display a mobile service provider that supports roaming at a current location among profiles installed within the eUICC 2) display a mobile service provider list that supports a home network at a current location among profiles installed within the eUICC 3) display whether the profile is activated or not when the mobile service provider list is displayed Thereafter, when the user selects a mobile service provider and a profile list corresponding to the mobile service provider to select a profile, the terminal activates the selected profile among the profiles installed within the eUICC and uses a mobile service provider corresponding to the profile in step 1510.

Meanwhile, when the terminal enters the automatic selection mode in step 1520 of FIG. 15, the terminal first identifies terminal preferences in step 1522. The terminal preferences may be identified by the following methods 1) and 2).

1) The terminal preferences are identified through a checklist or a UI screen of the terminal in a contract with a particular mobile service provider (further the preferences may be stored in advance).

2) The terminal preferences may be input through a UI whenever the terminal is turned on or when a location of the terminal is changed in a power on state.

When the terminal is set such that a roaming access using a currently activated profile is preferred like step 1524 based on the identification of the terminal preferences through the above method, the terminal may maintain the current profile even when the location of the terminal is changed in step 1526.

Meanwhile, when the terminal is set such that using a profile corresponding to a home network in an area where the terminal is currently located is preferred like step 1528 based on the identification of the terminal preferences in step 1522, the terminal may first identify whether there is a profile corresponding to the home network in the profiles installed in the eUICC in step 1530. At this time, when there is the profile corresponding to the home network, the terminal may select a profile to be applied through a profile selection algorithm in step 1532. The profile selection may use at least one of the following methods 1) to 3). In step 1534, the terminal may apply the selected profile.

1) When the number of profiles among the profiles installed in the eUICC corresponding to the home network is one, the corresponding profile may be selected.

2) When the number of profiles among the profiles installed in the eUICC corresponding to the home network is plural, a profile may be randomly selected.

3) When the number of profiles among the profiles installed in the eUICC corresponding to the home network is plural, a profile may be selected by assigning a preference order to a profile group according to the same country. In the method of assigning the preference order, the preference order is input by the user in advance through the terminal UE or the preference order is assigned in an order of lower cost in another example. To this end, rate information may be stored in the terminal as metadata according to each profile.

Meanwhile, after it is identified whether there is the profile corresponding to the home network among the profiles installed in the eUICC in step 1530, when the profile corresponding to the home network is not installed in the eUICC, the terminal may transfer a profile installation request to the eUICC control server in order to newly install a profile which can be used in the home network in step 1536. Since the profile installation in step 1538 and the profile application process in step 1540 are similar to the profile installation processes in FIGS. 12, 13, and 14, a detailed description will be omitted.

Figure 16:
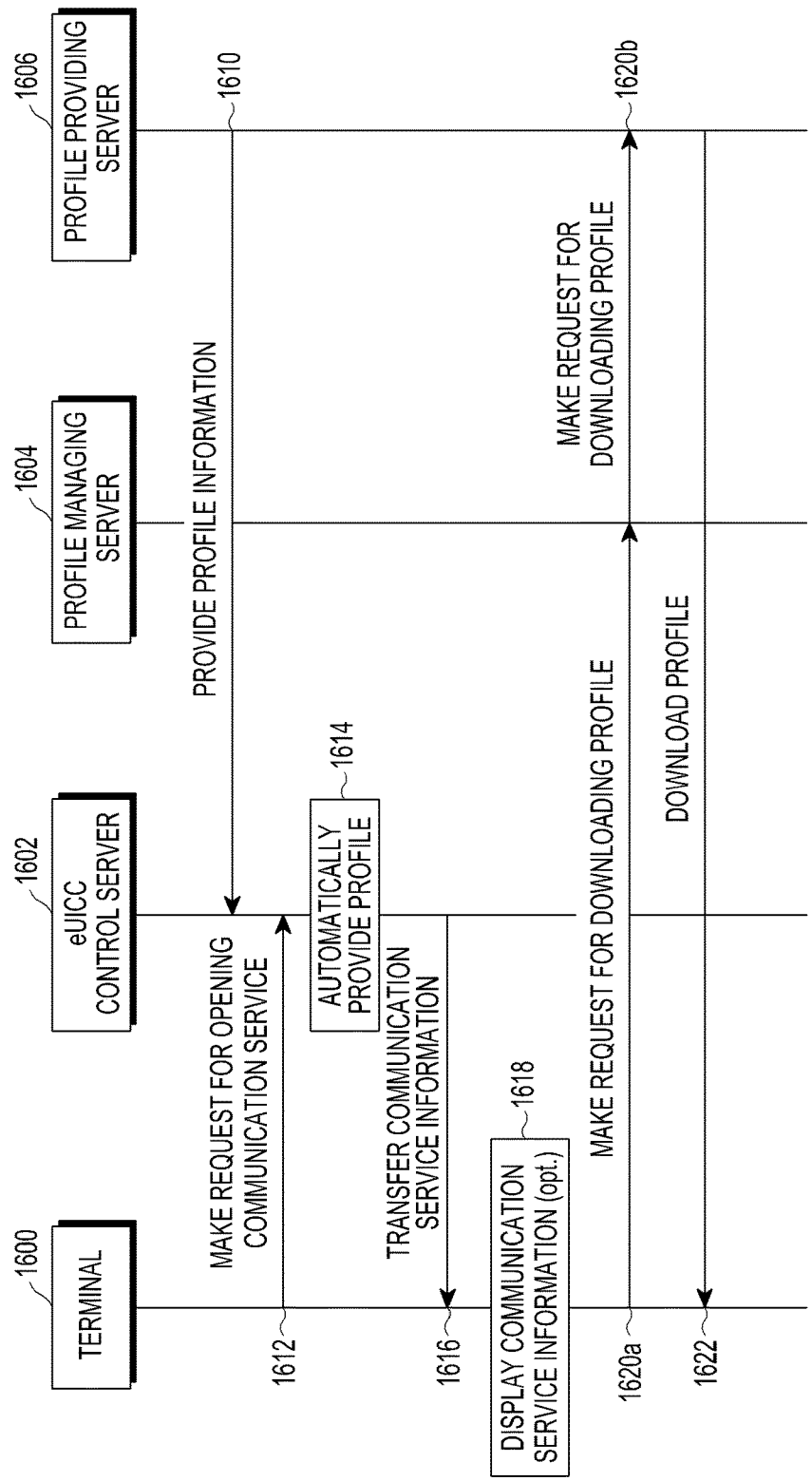
FIG. 16 is a flowchart illustrating an embodiment for selecting and installing a profile based on information stored in a profile providing server when a service is automatically selected and provided in a wireless communication network according to an embodiment of the present invention.

FIG. 16 is a flowchart illustrating an embodiment for selecting and installing a profile based on information stored in a profile providing server when a service is automatically selected and provided in a wireless communication network according to an embodiment of the present invention.

Referring to FIG. 16, in step 1610, an eUICC control server 1606 may receive profile information required for automatically selecting a profile from a profile providing server 1606 like in the embodiment of FIG. 12. The profile information may include a profile ID, an IMSI value or a PLMN IN, an MSISDN or phone number information corresponding to the MSISDN, rate information corresponding to call charges or data charges, and the like. Accordingly, since operations after the request for opening the communication service of the terminal in steps 1612 to 1622 are similar to the operations described in the embodiment of FIG. 12, a detailed description will be omitted.

Figure 17:
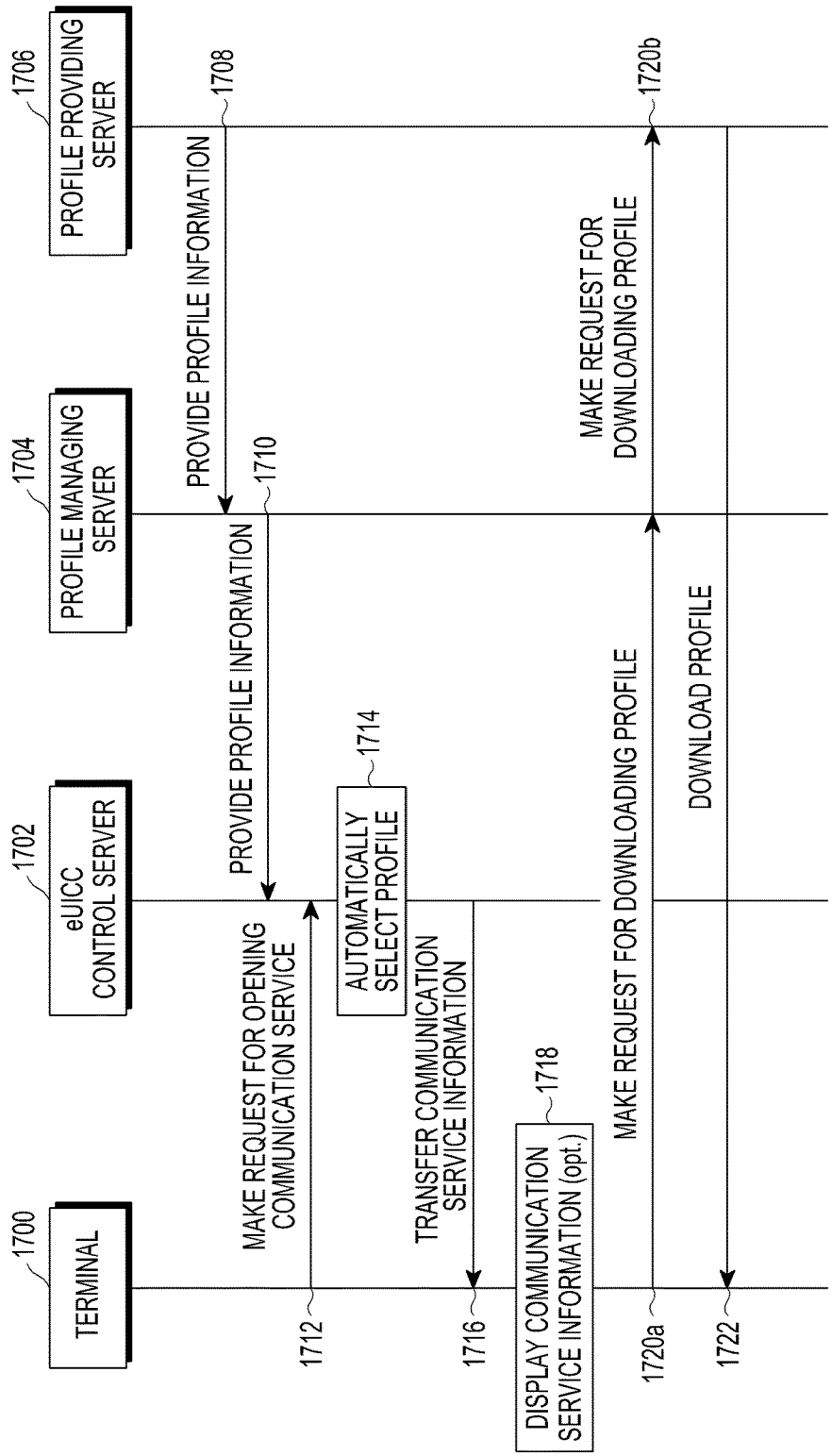
FIG. 17 is a flowchart illustrating an embodiment for selecting and installing a profile based on information stored in a profile providing server when a service is automatically selected and provided in a wireless communication network according to an embodiment of the present invention.

FIG. 17 is a flowchart illustrating an embodiment for selecting and installing a profile based on information stored in a profile providing server when a service is automatically selected and provided in a wireless communication network according to an embodiment of the present invention.

Referring to FIG. 17, in steps 1708 to 1712, an eUICC control server 1702 may receive profile information required for automatically selecting a profile from a profile managing server 1704. The profile managing server 1704 may receive profile information from one or more profile providing servers 1706 and transfer the profile information to the eUICC control server 1702.

The profile information may include a profile ID, an IMSI value or a PLMN IN, an MSISDN or phone number information corresponding to the MSISDN, rate information corresponding to call charges or data charges, and the like. Accordingly, since operations after the request for opening the communication service of the terminal in steps 1712 to 1722 are similar to the operations described in the embodiment of FIG. 12, a detailed description will be omitted.

Figure 18:
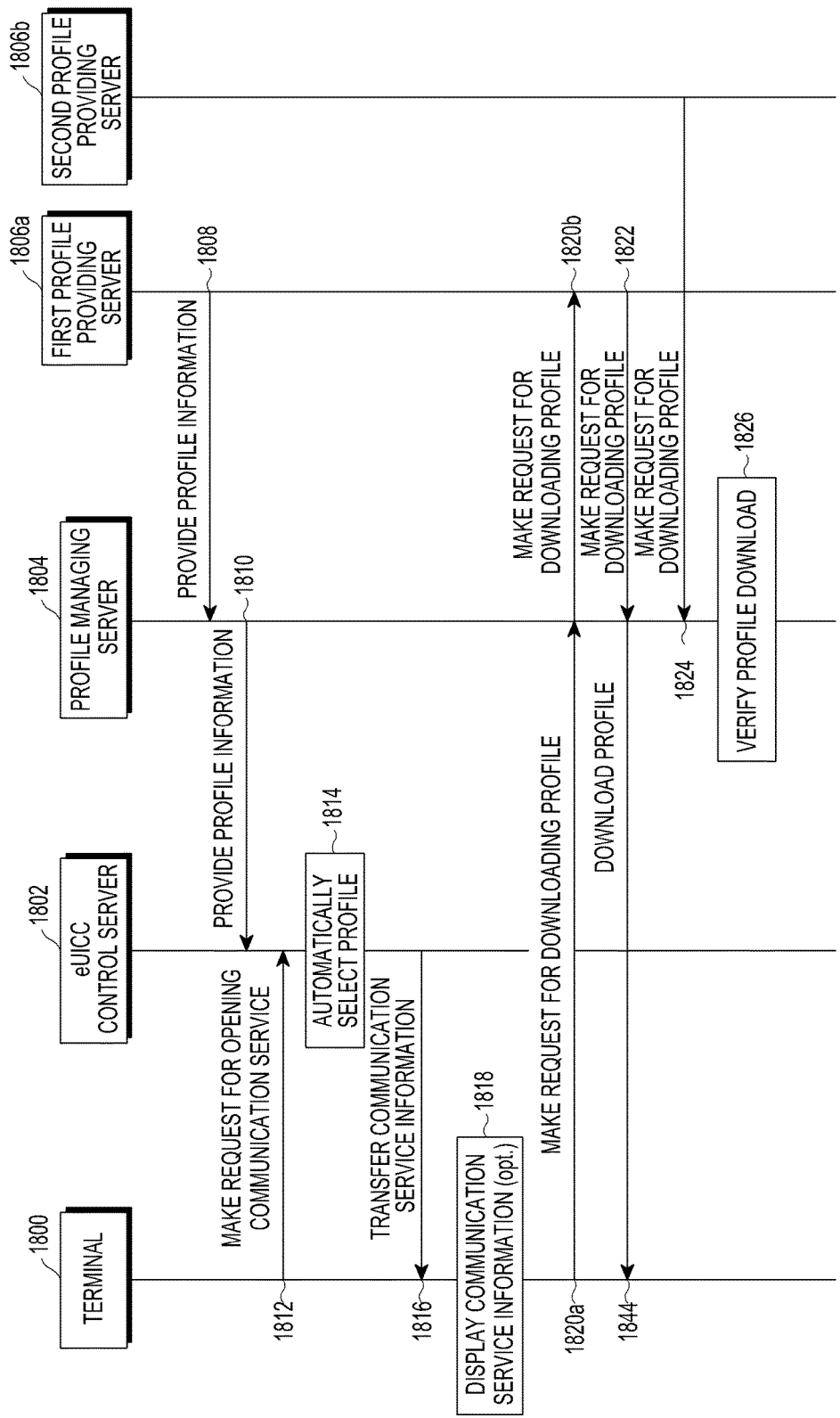
FIG. 18 is a flowchart illustrating an embodiment in which a profile managing server determines whether to accept a profile download request according to each profile providing server in a wireless communication network according to an embodiment of the present invention.

FIG. 18 is a flowchart illustrating an embodiment in which a profile managing server determines whether to accept a profile download request according to each profile providing server in a wireless communication network according to an embodiment of the present invention.

Referring to FIG. 18, a profile managing server 1804 may operate equally to the embodiment of FIG. 17, but the profile managing server 1804 may verify a profile download request from a particular profile providing server 1806a or 1806b as illustrated in steps 1822 to 1826 and determine whether to process the download. To this end, the profile managing server 1804 may store information for accepting or rejecting the profile download request from the particular profile providing server. Since operations of the remaining steps are similar to the above described embodiments, a detailed description will be omitted.

Figure 19:
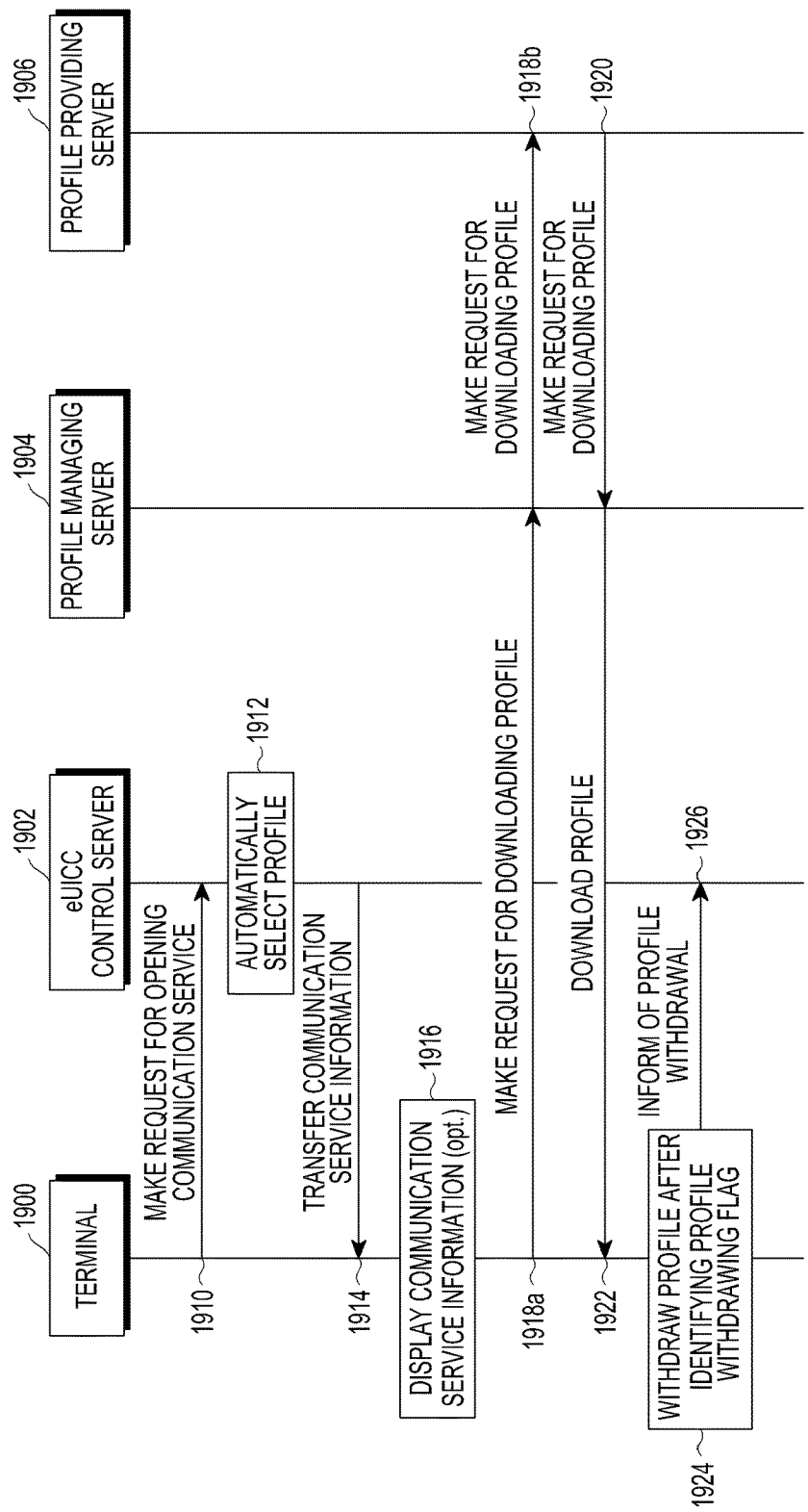
FIG. 19 illustrates an embodiment for automatically deleting a corresponding profile when a service is automatically selected and provided in a wireless communication network according to an embodiment of the present invention.

FIG. 19 is a flowchart illustrating an embodiment for automatically deleting a corresponding profile when a service is automatically selected and provided in a wireless communication system according to an embodiment of the present invention.

Referring to FIG. 19, a terminal 1900 may operate similar to the embodiment of FIG. 12 in order to download the profile. When there is a profile that meets a particular condition among the existing installed profiles after the profile download, the terminal 1900 deletes the profile that meets the condition in step 1924 and may inform an eUICC control server 1902 of a result thereof in step 1926. The condition for deleting the profile may be at least one of the following conditions 1) to 5).

1) after processing the profile download in step 1922, the terminal checks a flag value for determining whether to withdraw the profile stored in the terminal and, when the value corresponds to false, does not perform deletion.

2) after processing the profile download in step 1922, the terminal checks a flag value for determining whether to withdraw the profile stored in the terminal 1900 and, when the value corresponds to true, identifies a Mobile Country Code (MCC) value of the corresponding profile. The terminal 1900 searches for a frequency and, when the frequency is included in the MCC value included in the identified PLMN ID value, does not perform deletion.

3) after processing the profile download in step 1922, the terminal checks a flag value for determining whether to withdraw the profile stored in the terminal 1900 and, when the value corresponds to true, identifies a Mobile Country Code (MCC) value of the corresponding profile. The terminal 1900 searches for a frequency and, when the frequency is included in the MCC value included in the identified PLMN ID value, performs deletion.

4) when a particular time passes or a location is changed 5) when deletion is selected by the user Flag information for determining whether to withdraw the profile stored in the terminal 1900 may be included within the profile. Since operations of the remaining steps are similar to the above described embodiments, a detailed description will be omitted.

Figure 20:
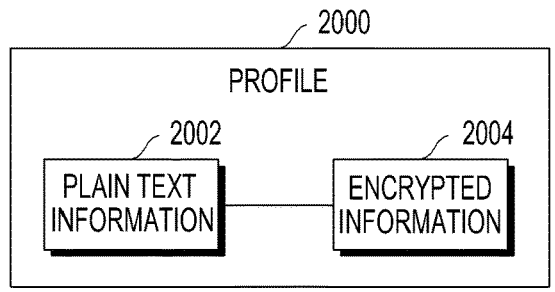
FIG. 20 illustrates an example of a configuration of profile information for automatically deleting the corresponding profile when a service is automatically selected and provided in a wireless communication network according to an embodiment of the present invention.

FIG. 20 illustrates an example of a configuration of profile information for automatically deleting the corresponding profile when a service is automatically selected and provided in a wireless communication network according to an embodiment of the present invention.

Referring to FIG. 20, a profile 2000 includes plain text information 2002 and encrypted information 2004. The terminal may receive and store the flag information included in the plain text information 2002 of the profile to use the flag information. Further, the IMSI, the PLMN ID, or the MSISDN information may also be included in the plain text information. The encrypted information 2004 may include a secret key value for a network authentication for network access. The value may be K or Ki.

Figure 21:
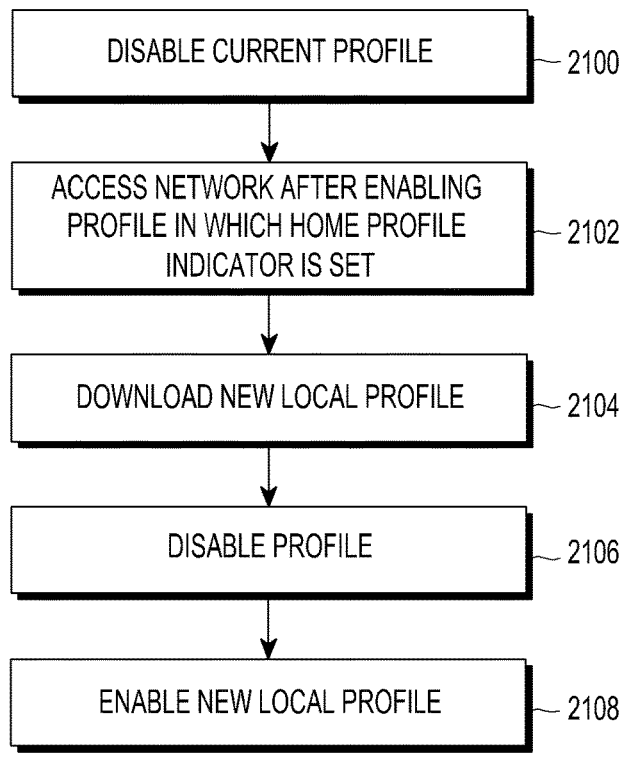
FIG. 21 is a flowchart illustrating an embodiment of an operation of a terminal when access to a network through an activated profile is not possible in a wireless communication network according to an embodiment of the present invention.

FIG. 21 is a flowchart illustrating an embodiment of an operation of the terminal when access to the network through an activated profile is not possible in a wireless communication network according to an embodiment of the present invention.

Referring to FIG. 21, when the terminal cannot access a current network through an activated profile, the terminal may disable the current profile in step 2100.

In step 2102, the terminal may access the network after enabling a profile in which a home profile indicator is set. Thereafter, in step 2104, the terminal may perform the operation described in the embodiment of FIG. 12 in order to automatically download a new profile. The terminal may disable the enabled profile in step 2106, and access the network by enabling the newly downloaded profile in step 2108.

Figure 26A:
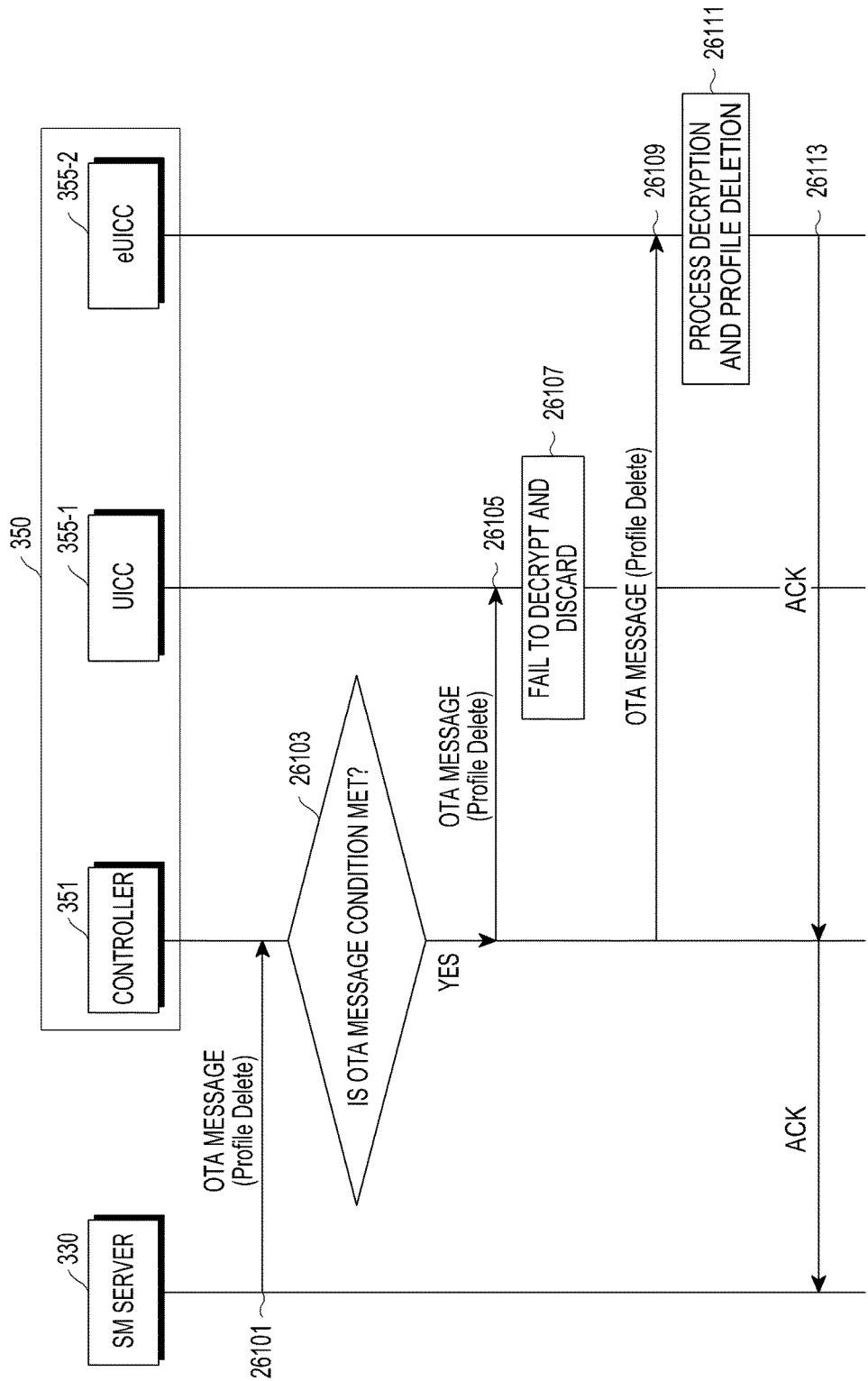
FIGS. 26A to 26D illustrate an example of remotely deleting a profile in a terminal having a plurality of UICCs installed therein or connected thereto according to an embodiment of the present invention.

FIG. 26A is a flowchart illustrating an example in which a terminal having a plurality of UICCs installed therein or connected thereto remotely deletes a profile according to an embodiment of the present invention, and steps 26101 to 26113 of FIG. 26A illustrates an example of an operation for deleting the profile included in the eUICC 355-2 by transferring an OTA message for deleting a profile included in the eUICC 355-2 to both the UICC 355-1 and the eUICC 355-2 through the controller 351 of the terminal 350.

Figure 26B:
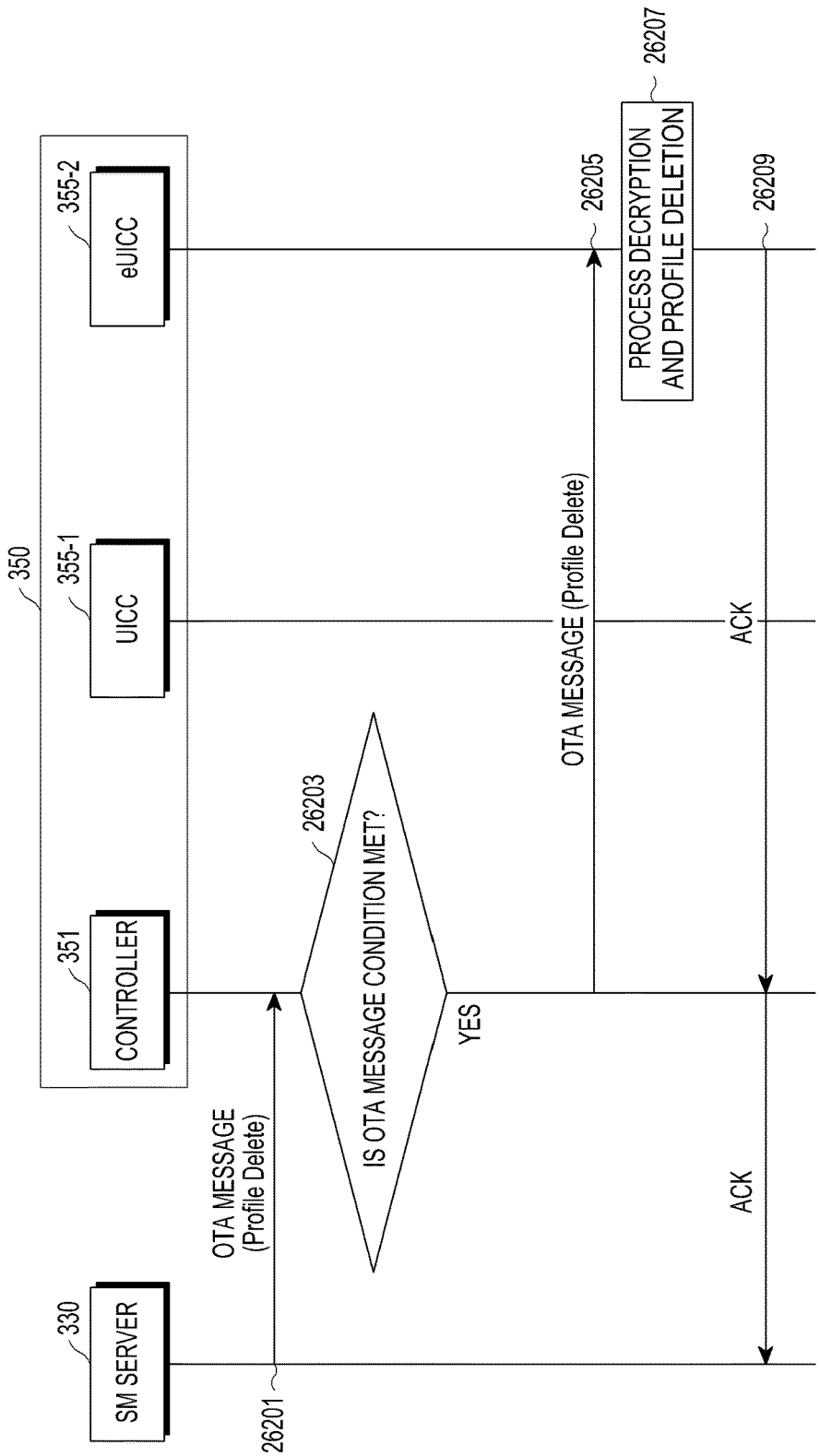

FIG. 26B is a flowchart illustrating an example in which a terminal having a plurality of UICCs installed therein or connected thereto remotely deletes a profile according to an embodiment of the present invention, and steps 26201 to 26209 of FIG. 26B illustrate an example of an operation for deleting the profile included in the eUICC 355-2 by transferring an OTA message for deleting a profile included in the eUICC 355-2 only to the eUICC 355-2 through the controller 351 of the terminal 350.

Figure 26C:
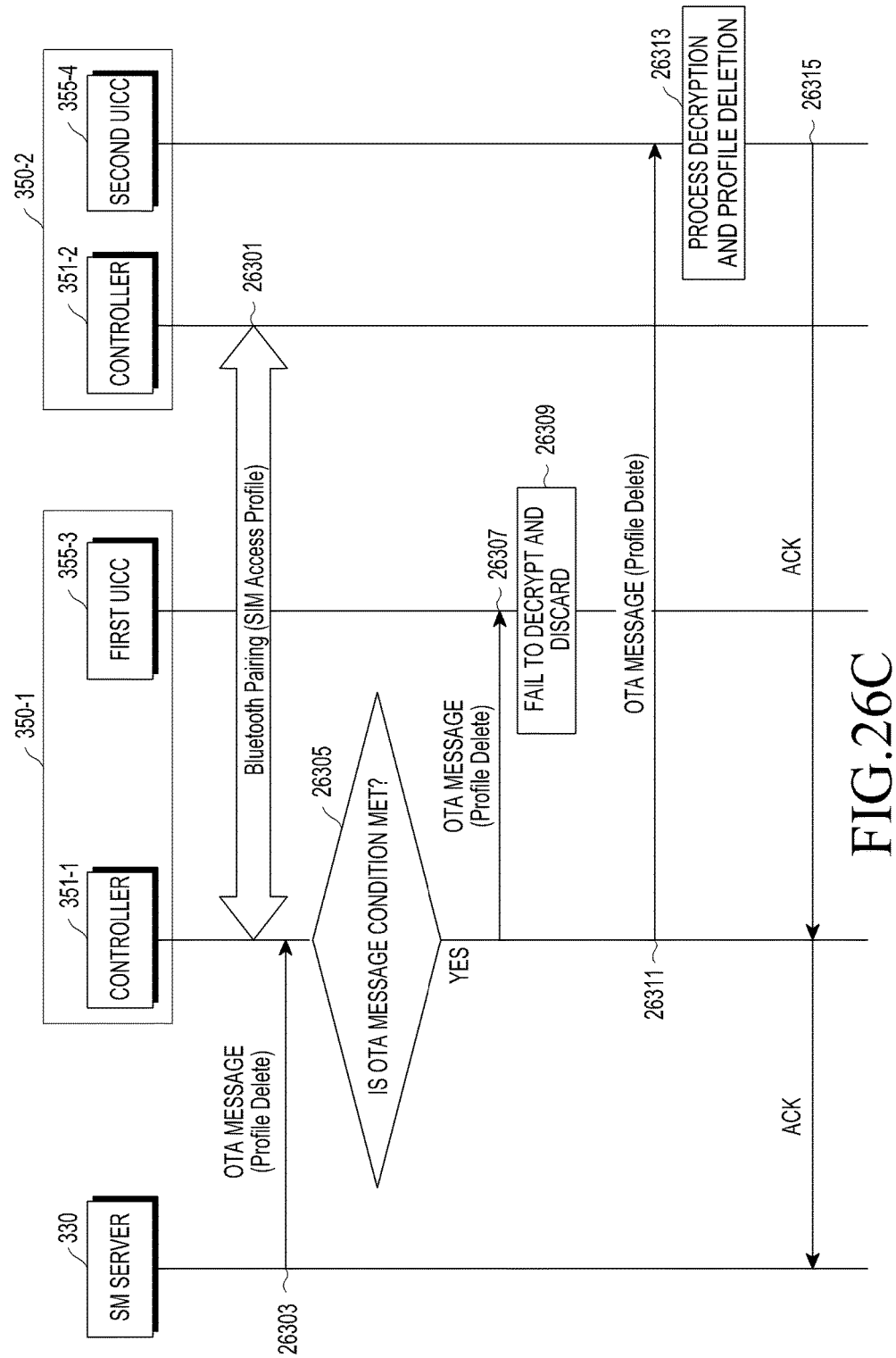

FIG. 26C is a flowchart illustrating an example in which a terminal having a plurality of UICCs installed therein or connected thereto remotely deletes a profile according to an embodiment of the present invention, and steps 26301 to 26115 of FIG. 26C illustrates a process in which the controller 351 of the first terminal 350-1 and the controller 351-2 of the second terminal 350-2 are paired through Bluetooth and then the second UICC 355-4 inserted into or fixed to be installed in the second terminal 350-2 deletes a profile through the controller 351 of the first terminal 350-1. An OTA message for deleting the profile included in the second UICC 355-2 through the controller 351 of the terminal 350-1 may be transferred to both the first UICC 355-3 and the second UICC 355-4 and thus the profile included in the second UICC 355-4 may be deleted.

Figure 26D:
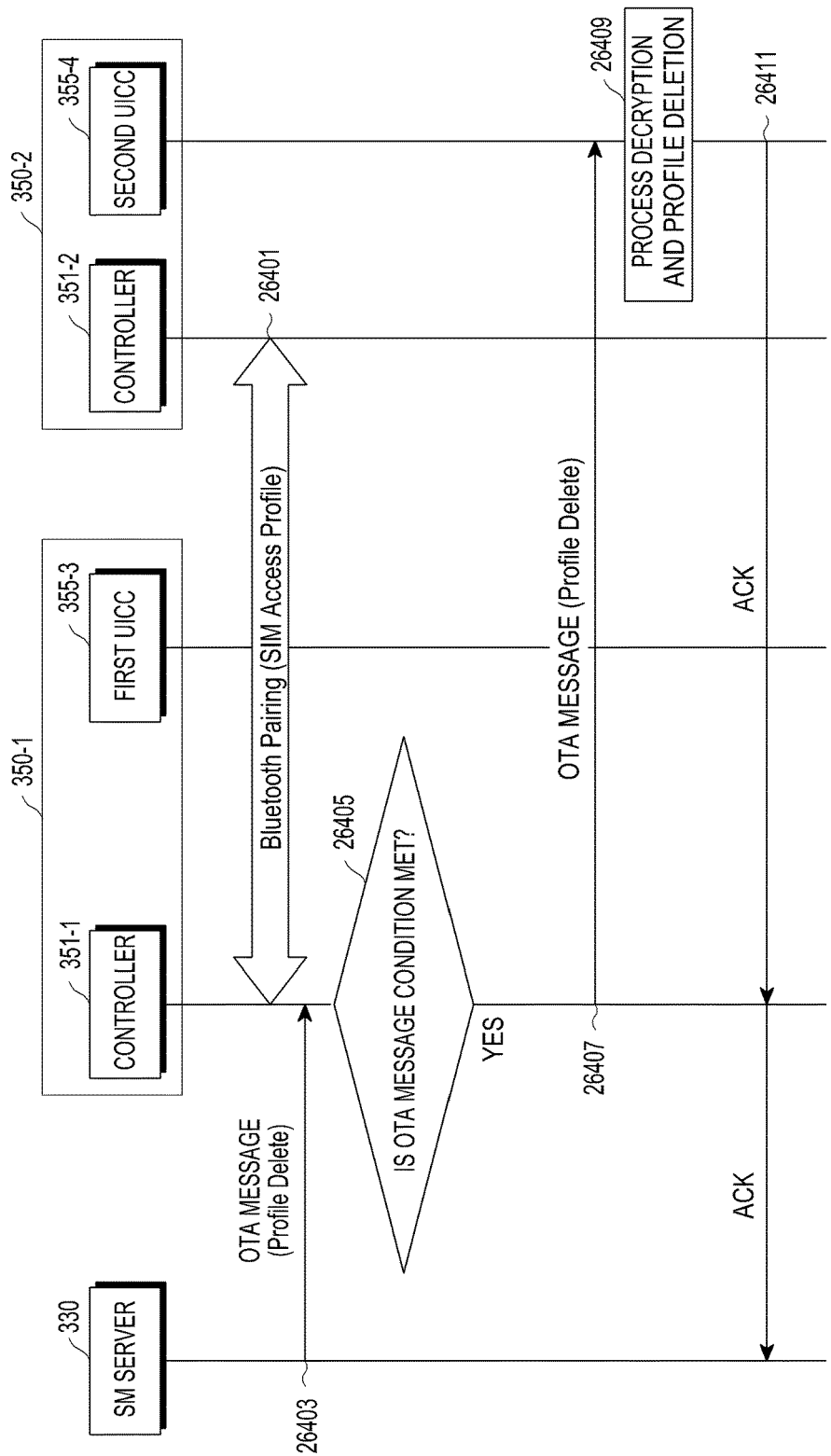

FIG. 26D is a flowchart illustrating an example in which a terminal having a plurality of UICCs installed therein or connected thereto remotely deletes a profile according to an embodiment of the present invention, and steps 26401 to 26411 of FIG. 26D illustrate a process in which the controller 351 of the first terminal 350-1 and the controller 351-2 of the second terminal 350-2 are paired through Bluetooth and then the second UICC 355-4 inserted into or fixed to be installed in the second terminal 350-2 deletes a profile through the controller 351 of the first terminal 350-1. An OTA message for deleting the profile included in the second UICC 355-2 through the controller 351 of the terminal 350-1 may be transferred only to the second UICC 355-4 and thus the profile included in the second UICC 355-4 may be deleted.

In steps 26103, 26203, 26305, and 26405 in the embodiments of FIGS. 26A to 26D, the OTA message conditions may use various OTA message conditions proposed by various embodiments for the profile download.

Figure 22:
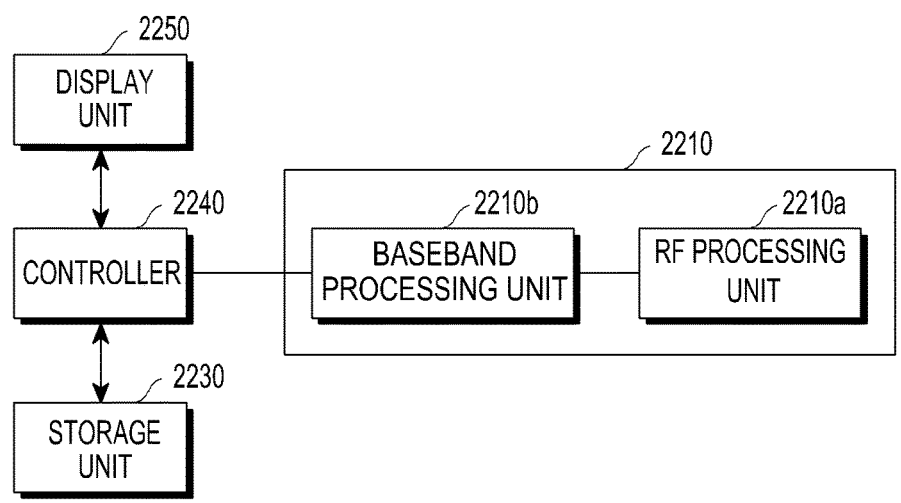
FIG. 22 is a block diagram illustrating an example of a configuration of a terminal apparatus in a wireless communication system according to an embodiment of the present invention.

FIG. 22 is a block diagram illustrating an example of a configuration of a terminal apparatus in a wireless communication system according to an embodiment of the present invention.

Referring to FIG. 22, the terminal includes a communication unit 2210 including a Radio Frequency (RF) processing unit 2210a and a baseband processing unit 2210b, a storage unit 2230, a controller 2240, and a display unit 2250.

The RF processing unit 2210a performs a function for transmitting and receiving a signal through a wireless channel, such as band conversion and amplification of a signal. That is, the RF processing unit 2210a up-converts a baseband signal provided from the baseband processing unit 2210b into an RF band signal and then transmits the converted signal through an antenna, and down-converts an RF band signal received through the antenna into a baseband signal. For example, the RF processing unit 2210a may include a transmission filter, a reception filter, an amplifier, a mixer, an oscillator, a Digital-to-Analog Converter (DAC), an Analog-to-Digital Converter (ADC), and the like. Further, the terminal may include one antenna or a plurality of antennas. In addition, the RF processing unit 2210a may include a plurality of RF chains. In order to transmit and receive information related to the eUICC, the RF processing unit 2210a may adjust the phase and magnitude of signals transmitted and received through a plurality of antenna or antenna elements.

The baseband processing unit 2210b performs a conversion between a baseband signal and a bit string according to a physical layer standard of a system. For example, the baseband processing unit 2210b, when transmitting data, generates complex symbols by encoding and modulating a transmission bitstream. In addition, the baseband processing unit 2210b, when receiving data, recovers a reception bit string through the demodulation and decoding of a baseband signal provided from the RF processing unit 1310. For example, in the case of following the OFDM scheme, the baseband processing unit 2210b, when transmitting data, generates complex symbols by encoding and modulating a transmission bit string, maps the complex symbols with sub-carriers, and then configures Orthogonal Frequency Division Multiplexing (OFDM) symbols through an Inverse Fast Fourier Transform (IFFT) operation and Cyclic Prefix (CP) insertion. In addition, the baseband processing unit 2210b, when receiving data, divides a baseband signal provided from the RF processing unit 2210a in units of OFDM symbols, recovers signals mapped with sub-carriers through an FFT operation, and then recovers a reception bit string through demodulation and decoding.

The baseband processing unit 2210b and the RF processing unit 2210a transmit and receive the signal as described above. Accordingly, the baseband processing unit 2210b and the RF processing unit 2210a may be called a transmitter, a receiver, a transceiver, or the communication unit 2210.

The storage unit 2230 stores data such as a basic program, an application program, and setting information for the operation of the terminal. In particular, the storage unit 2230 may store information related to information transmission for the eUICC in the wireless communication system. In addition, the storage unit 2230 provides stored data according to a request of the controller 2240.

The controller 2240 controls overall operations of the terminal. For example, the controller 2240 transmits and receives a signal through the baseband processing unit 2210b and the RF processing unit 2210a. Further, the controller 2240 records data in the storage unit 2230 and reads the recorded data. According to an embodiment of the present invention, the controller 2240 controls the whole of the device to allow the terminal to perform operations according to embodiments of FIGS. 5 to 21 and FIG. 26.

Figure 23:
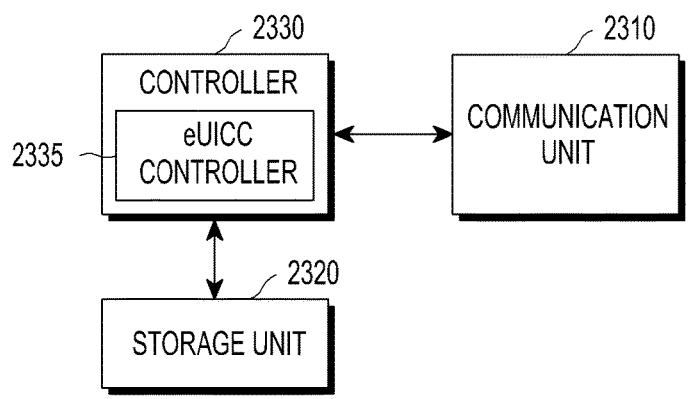
FIG. 23 is a block diagram illustrating an example of a configuration of a server apparatus for controlling an eUICC in a wireless communication network according to an embodiment of the present invention.

FIG. 23 is a block diagram illustrating an example of a configuration of an eUICC control server for controlling an eUICC in a wireless communication network according to an embodiment of the present invention.

Referring to FIG. 23, the eUICC control server includes a communication unit 2310, a storage unit 2320, a controller 2330, and an eUICC controller 2335.

The communication unit 2310 allows the eUICC control server to communicate with a UE, a profile providing server, and a profile managing server. The communication unit 2310 may transmit and receive a signal and, accordingly, may be called a transmitter, a receiver, or a transceiver.

The storage unit 2320 stores data such as a basic program, an application program, and setting information for the operation of the terminal. In particular, the storage unit 2320 may store information related to information transmission for the eUICC in the wireless communication system. In addition, the storage unit 2320 provides stored data according to a request of the controller 2330.

The controller 2330 controls the overall operations of the eUICC control server apparatus according to embodiments of FIGS. 5 to 21 and FIG. 26. The controller 2330 performs a control to provide information according to the condition of the terminal to the terminal based on information received from the terminal. Through the control of the controller 2330, the eUICC control server may provide communication service information to the terminal, automatically selects a profile, and makes a request for downloading the profile to the terminal, a profile managing server, or a profile providing server.

Figure 24:
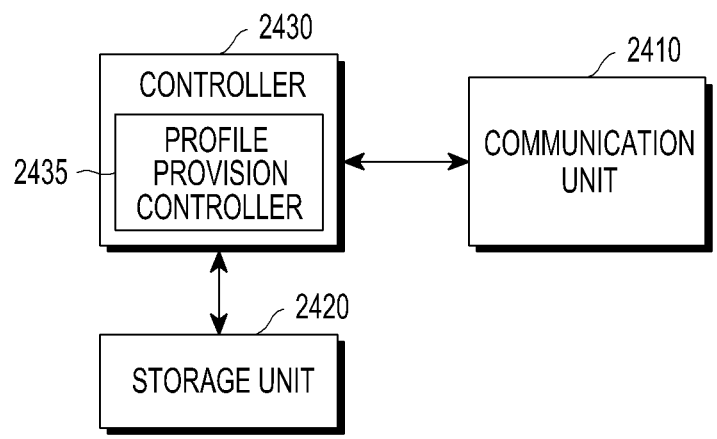
FIG. 24 is a block diagram illustrating an example of a configuration of a server apparatus for providing an eUICC profile in a wireless communication system according to an embodiment of the present invention.

FIG. 24 is a block diagram illustrating an example of a configuration of a server apparatus for providing an eUICC profile in a wireless communication system according to an embodiment of the present invention.

Referring to FIG. 24, the server apparatus includes a communication unit 2410, a storage unit 2420, a controller 2430, and a profile provision controller 2435.

The communication unit 2410 allows the server apparatus to communicate with an eUICC control server, a profile managing server, and a mobile network operator. The communication unit 2410 transmits and receives a signal and, accordingly, may be called a transmitter, a receiver, or a transceiver.

The storage unit 2420 stores data such as a basic program, an application program, and setting information for the operation of the server. In particular, the storage unit 2420 may store information related to information transmission for the eUICC in the wireless communication system. In addition, the storage unit 2420 provides stored data according to a request of the controller 2430.

The controller 2430 controls the overall operations of the server apparatus according to embodiments of FIGS. 5 to 21 and FIG. 26. When the server apparatus receives a profile transmission request from the eUICC control server, the profile managing server, or the terminal including the eUICC, the controller 2430 may make a control to transmit the profile to the profile managing server.

Figure 25:
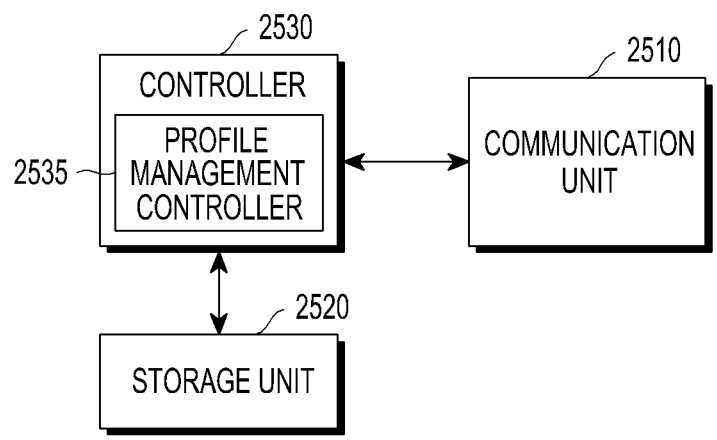
FIG. 25 is a block diagram illustrating an example of a configuration of a server apparatus for managing an eUICC profile in a wireless communication system according to an embodiment of the present invention.

FIG. 25 is a block diagram illustrating an example of a configuration of a server apparatus for managing an eUICC profile in a wireless communication system according to an embodiment of the present invention.

Referring to FIG. 25, the server includes a communication unit 2510, a storage unit 2520, a controller 2530, and a profile provision controller 2535.

The communication unit 2510 allows the server to communicate with the eUICC control server and the profile providing server. The communication unit 2510 transmits and receives a signal and, accordingly, may be called a transmitter, a receiver, a transceiver, or a communication unit.

The storage unit 2520 stores data such as a basic program, an application program, and setting information for the operation of the server. In particular, the storage unit 2520 may store information related to information transmission for the eUICC in the wireless communication system. In addition, the storage unit 2520 provides stored data according to a request of the controller 2530.

The controller 2530 controls the overall operations of the server apparatus according to embodiments of FIGS. 5 to 21 and FIG. 26. When the server receives a profile transmission request from the eUICC control server, the profile providing server, or the terminal including the eUICC, the controller 2530 makes a control to transmit the profile to the terminal.

Methods stated in claims and/or specifications according to various embodiments may be implemented by hardware, software, or a combination of hardware and software.

In the implementation of software, a computer-readable storage medium for storing one or more programs (software modules) may be provided. The one or more programs stored in the computer-readable storage medium may be configured for execution by one or more processors within the electronic device. The at least one program may include instructions that cause the electronic device to perform the methods according to various embodiments of the present invention as defined by the appended claims and/or disclosed herein.

The programs (software modules or software) may be stored in non-volatile memories including a random access memory and a flash memory, a Read Only Memory (ROM), an Electrically Erasable Programmable Read Only Memory (EEPROM), a magnetic disc storage device, a Compact Disc-ROM (CD-ROM), Digital Versatile Discs (DVDs), or other type optical storage devices, or a magnetic cassette. Alternatively, any combination of some or all of the may form a memory in which the program is stored. Further, a plurality of such memories may be included in the electronic device.

In addition, the programs may be stored in an attachable storage device which may access the electronic device through communication networks such as the Internet, Intranet, Local Area Network (LAN), Wide LAN (WLAN), and Storage Area Network (SAN) or a combination thereof. Such a storage device may access the electronic device via an external port. Further, a separate storage device on the communication network may access a portable electronic device.

In the above-described detailed embodiments of the present invention, a component included in the present invention is expressed in the singular or the plural according to a presented detailed embodiment. However, the singular form or plural form is selected for convenience of description suitable for the presented situation, and various embodiments of the present invention are not limited to a single element or multiple elements thereof. Further, either multiple elements expressed in the description may be configured into a single element or a single element in the description may be configured into multiple elements. Although the above embodiments have been separately described herein, two or more of them may be implemented in combination.

Further, the above embodiments of the present invention may be implemented by a computer-readable code in a computer-readable recording medium. The computer-readable recording medium may be any data storage device capable of storing data which can be read by a computer system. Examples of record-mediums readable by the computer may include a Read-Only Memory (ROM), a Random-Access Memory (RAM), a Compact Disc-Read Only Memory (CD-ROM), magnetic tapes, floppy disks, optical data storage devices, carrier waves (such as data transmission through the Internet). Further, functional programs, codes and code segments for achieving the present invention may be easily interpreted by programmers skilled in the art which the present invention pertains to.

It will be appreciated that an apparatus and a device according to embodiments of the present invention can be implemented in a form of hardware, software, or a combination of hardware and software. Any such software may be stored, for example, in a volatile or non-volatile storage device such as a ROM, a memory such as a RAM, a memory chip, a memory device, or a memory IC, or a recordable optical or magnetic medium such as a CD, a DVD, a magnetic disk, or a magnetic tape, regardless of its ability to be erased or its ability to be re-recorded. It can be also appreciated that the software may be stored in a machine (for example, a computer)-readable storage medium. It will be appreciated that the method according to embodiments of the present invention may be implemented by a computer, various portable terminals, or a network entity managed by a communication provider in a wireless communication system, which includes/include a controller and a memory, and the memory is an example of a machine-readable storage medium that is suitable to store a program or programs including instructions for implementing the embodiments of the present invention.

Accordingly, the present invention includes a program for a code implementing the apparatus and method described in the appended claims of the specification and a machine (a computer or the like)-readable storage medium for storing the program.

Although the embodiment has been described in the detailed description of the present invention, the present invention may be modified in various forms without departing from the scope of the present invention. Thus, the scope of the present invention shall not be determined merely based on the described exemplary embodiments and rather determined based on the accompanying claims and the equivalents thereto.

The invention claimed is:

1. A method of supporting remote reception of a profile by a user equipment (UE) including a plurality of universal integrated circuit cards (UICCs), in a wireless communication system, the method comprising:
   receiving, from a server for managing the profile, a second message including a first message, the first message for downloading the profile;
   determining whether a header information of the second message satisfies a criterion, the header information including at least one of a protocol identifier, a data coding scheme, an originator address, or information indicating whether the first message is encrypted;
   transferring, to a first UICC and a second UICC among the plurality of UICCs, the first message if the header information of the second message satisfies the criterion,
      wherein the first UICC is a UICC physically attachable to and detachable from the UE, and the second UICC is an embedded UICC (eUICC),
      wherein the first UICC discards the first message, and wherein the second UICC decrypts the first message using an over-the-air (OTA) key; and
   receiving the profile based on the decrypted first message.

2. The method of claim 1, wherein the transferring the first message comprises:
   transferring the second message including the first message to another UE connected to the UE through a predetermined communication scheme.

3. The method of claim 2, wherein the UE and the other UE are connected through bluetooth pairing.

4. The method of claim 1, wherein the second message is a short message service (SMS) message, and wherein transferring the first message comprises:
   transferring, to the first UICC and the second UICC, the first message when the header information of the SMS message includes a first value indicating a data download and a second value indicating a particular terminal category.

5. The method of claim 1, wherein the first message uses an over-the-air (OTA) message.

6. A terminal for supporting remote reception of a profile in a wireless communication system, the terminal comprising:
   a plurality of universal integrated circuit cards (UICCs);
   a transceiver; and
   a processor configured to:
      control the transceiver to receive, from a server for managing the profile, a second message including a first message, the first message for downloading the profile,
      determine whether a header information of the second message satisfies a criterion, the header information including at least one of a protocol identifier, a data coding scheme, an originator address, or information indicating whether the first message is encrypted,
      transfer, to a first UICC and a second UICC among the plurality of UICCs, the first message if the header information of the second message satisfies the criterion, wherein the first UICC is a UICC physically attachable to and detachable from the UE, and the second UICC is an embedded UICC (eUICC), wherein the first UICC discards the first message, and wherein the second UICC decrypts the first message using an over-the-air (OTA) key, and
      receive the profile based on the decrypted first message.

7. The terminal of claim 6, wherein the processor is further configured to:
   control the transceiver to transfer the second message including the first message to another terminal connected to the terminal through a predetermined communication scheme.

8. The terminal of claim 7, wherein the terminal and the other terminal are connected through bluetooth pairing.

9. The terminal of claim 6, wherein the second message is a short message service (SMS) message, and wherein the processor is further configured to:
   determine whether header information of the SMS message includes a first value indicating a data download and a second value indicating a particular terminal category, and
   transfer, to the first UICC and the second UICC among the plurality of UICCs, the first message when the header information includes the first value and the second value.

10. The terminal of claim 6, wherein the first message uses an over-the-air (OTA) message.

* * * * *